US012088046B2

(12) United States Patent
Laurx et al.

(10) Patent No.: US 12,088,046 B2
(45) Date of Patent: Sep. 10, 2024

(54) BACKPLANE CONNECTOR FOR PROVIDING ANGLED CONNECTIONS AND SYSTEM THEREOF

(71) Applicant: Molex, LLC, Lisle, IL (US)

(72) Inventors: John C. Laurx, Aurora, IL (US); Chien-Lin Wang, Naperville, IL (US); Vivek Shah, Buffalo Grove, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/304,381

(22) Filed: Apr. 21, 2023

(65) Prior Publication Data

US 2023/0253736 A1 Aug. 10, 2023

Related U.S. Application Data

(63) Continuation of application No. 17/327,817, filed on May 24, 2021, now Pat. No. 11,652,321, which is a continuation of application No. 16/866,158, filed on May 4, 2020, now Pat. No. 11,018,454, which is a continuation of application No. 15/778,176, filed as (Continued)

(51) Int. Cl.

| | |
|---|---|
| ***H01R 13/6461*** | (2011.01) |
| ***H01R 12/72*** | (2011.01) |
| ***H01R 12/73*** | (2011.01) |
| ***H01R 13/518*** | (2006.01) |
| ***H01R 13/6587*** | (2011.01) |
| *H01R 13/516* | (2006.01) |

(52) U.S. Cl.

CPC ....... *H01R 13/6461* (2013.01); *H01R 12/724* (2013.01); *H01R 12/737* (2013.01); *H01R 13/518* (2013.01); *H01R 13/6587* (2013.01); *H01R 13/516* (2013.01)

(58) Field of Classification Search

CPC .... H01R 13/6585-6588; H01R 13/516; H01R 13/518; H01R 13/6461; H01R 13/6471; H01R 12/724; H01R 12/735; H01R 12/737; H01R 12/727

USPC ....... 439/607.05-607.07, 607.09, 607.1, 108

See application file for complete search history.

(56) References Cited

U.S. PATENT DOCUMENTS 6,743,057 B2 6/2004 Davis et al.
7,267,515 B2 * 9/2007 Lappohn ............ H01R 13/6587 439/607.07

(Continued)

FOREIGN PATENT DOCUMENTS

JP 2003522386 A 7/2003
JP 2005135667 A 5/2005

OTHER PUBLICATIONS

International Preliminary Report on Patentability received for PCT Application No. PCT/US2016/066522, mailed on Jun. 28, 2018, 09 Pages.

(Continued)

*Primary Examiner* — Marcus E Harcum

(57) ABSTRACT

A backplane connector includes a shielded design that has wafers with signal terminals supported as edge-coupled terminal pairs for differential signaling. A ground shield is mounted on each wafer and provides a U-channel that partially shields each terminal pair. An insert can be provided to help connect the ground shield to a U-shield to provide U-shaped shielding structure substantially the entire way from a tail to a contact.

18 Claims, 51 Drawing Sheets

Related U.S. Application Data application No. PCT/US2016/066522 on Dec. 14, 2016, now Pat. No. 10,644,453.

(60) Provisional application No. 62/305,968, filed on Mar. 9, 2016, provisional application No. 62/266,924, filed on Dec. 14, 2015.

(56) References Cited

U.S. PATENT DOCUMENTS

| | | | | |
|---|---|---|---|---|
| 7,871,296 | B2 | 1/2011 | Fowler et al. | |
| 7,931,500 | B2 | 4/2011 | Knaub et al. | |
| 7,967,637 | B2 | 6/2011 | Fedder et al. | |
| 8,002,581 | B1 | 8/2011 | Whiteman, Jr. et al. | |
| 8,267,721 | B2 | 9/2012 | Minich | |
| 8,366,485 | B2 | 2/2013 | Johnescu et al. | |
| 8,419,472 | B1 | 4/2013 | Swanger et al. | |
| 8,444,435 | B2 | 5/2013 | Lee et al. | |
| 8,449,330 | B1 | 5/2013 | Schroll et al. | |
| 8,662,924 | B2 | 3/2014 | Davis et al. | |
| 8,690,604 | B2 | 4/2014 | Davis | |
| 8,715,005 | B2 | 5/2014 | Pan | |
| 8,771,017 | B2 * | 7/2014 | Vino, IV | H01R 13/6587 439/607.56 |
| 8,888,530 | B2 | 11/2014 | Trout et al. | |
| 8,888,531 | B2 | 11/2014 | Jeon | |
| 8,992,252 | B2 | 3/2015 | Mcclellan et al. | |
| 8,992,253 | B2 | 3/2015 | Mcclellan et al. | |
| 9,331,407 | B2 | 5/2016 | Laurx et al. | |
| 9,401,563 | B2 | 7/2016 | Simpson et al. | |
| 9,520,689 | B2 | 12/2016 | Cartier, Jr. et al. | |
| 9,548,570 | B2 | 1/2017 | Laurx et al. | |
| 9,812,817 | B1 | 11/2017 | Shirai et al. | |
| 9,917,406 | B1 | 3/2018 | Iwasaki et al. | |
| 10,186,810 | B2 | 1/2019 | Morgan et al. | |
| 10,276,984 | B2 | 4/2019 | Trout et al. | |
| 10,644,453 | B2 | 5/2020 | Laurx et al. | |
| 10,720,735 | B2 | 7/2020 | Provencher et al. | |
| 2001/0012730 | A1 | 8/2001 | Ramey et al. | |
| 2003/0203665 | A1 | 10/2003 | Ohnishi et al. | |
| 2005/0020135 | A1 | 1/2005 | Whiteman et al. | |
| 2007/0155241 | A1 | 7/2007 | Lappohn | |
| 2009/0035955 | A1 | 2/2009 | Mcnamara | |
| 2009/0068888 | A1 | 3/2009 | Miki et al. | |
| 2010/0144168 | A1 | 6/2010 | Glover et al. | |
| 2011/0143591 | A1 | 6/2011 | Davis et al. | |
| 2011/0212632 | A1 | 9/2011 | Stokoe et al. | |
| 2011/0212650 | A1 | 9/2011 | Amleshi et al. | |
| 2012/0214343 | A1 | 8/2012 | Buck et al. | |
| 2012/0264334 | A1 | 10/2012 | Laurx et al. | |
| 2013/0034978 | A1 | 2/2013 | Lemke et al. | |
| 2013/0102192 | A1 | 4/2013 | Davis | |
| 2013/0109232 | A1 | 5/2013 | Paniaqua | |
| 2013/0178107 | A1 | 7/2013 | Costello et al. | |
| 2013/0280957 | A1 | 10/2013 | Davis et al. | |
| 2013/0309910 | A1 | 11/2013 | Gulla | |
| 2014/0024256 | A1 | 1/2014 | Davis et al. | |
| 2014/0057492 | A1 | 2/2014 | Lange et al. | |
| 2014/0057493 | A1 | 2/2014 | De Geest et al. | |
| 2014/0106583 | A1 | 4/2014 | Vino, IV et al. | |
| 2014/0148054 | A1 | 5/2014 | Annis et al. | |
| 2014/0242841 | A1 | 8/2014 | Trout et al. | |
| 2014/0370723 | A1 | 12/2014 | Laurx et al. | |
| 2015/0004813 | A1 | 1/2015 | Heppner et al. | |
| 2015/0236451 | A1 | 8/2015 | Cartier, Jr. et al. | |
| 2015/0303618 | A1 | 10/2015 | Lee et al. | |
| 2015/0351160 | A1 | 12/2015 | Phan et al. | |
| 2016/0013594 | A1 | 1/2016 | Costello et al. | |
| 2016/0072231 | A1 | 3/2016 | Sypolt et al. | |
| 2016/0093985 | A1 | 3/2016 | Zhang et al. | |
| 2016/0134057 | A1 | 5/2016 | Buck et al. | |
| 2016/0141807 | A1 | 5/2016 | Gailus et al. | |
| 2016/0240946 | A1 | 8/2016 | Evans et al. | |
| 2016/0308309 | A1 | 10/2016 | Stokoe et al. | |
| 2017/0085034 | A1 | 3/2017 | De Geest et al. | |
| 2021/0281016 | A1 * | 9/2021 | Laurx | H01R 13/6587 |

OTHER PUBLICATIONS

International Search Report and Written Opinion received for PCT Application No. PCT/US2016/066522, mailed on Mar. 20, 2017, 11 Pages.

Non-Final rejection received for U.S. Appl. No. 15/778,176, mailed on Mar. 8, 2019, 14 pages.

Non-Final Rejection received for U.S. Appl. No. 17/327,817, mailed on Jun. 21, 2022, 15 pages.

* cited by examiner

BACKPLANE CONNECTOR FOR PROVIDING ANGLED CONNECTIONS AND SYSTEM THEREOF

CROSS-REFERENCE TO RELATED APPLICATIONS

This application claims priority to continuing U.S. application Ser. No. 17/327,817, filed May 24, 2021 which in turn claims priority to Ser. No. 16/866,158, filed May 4, 2020, now U.S. Pat. No. 11,018,454, which in turn claims priority to U.S. application Ser. No. 15/778,176, filed May 22, 2018, now U.S. Pat. No. 10,644,453, which is a national phase of PCT Application No. PCT/US2016/066522, filed Dec. 14, 2016, which in turn claims priority to U.S. Provisional Application No. 62/305,968, filed Mar. 9, 2016 and U.S. Provisional Application No. 62/266,924, filed Dec. 14, 2015, all of which are incorporated herein by reference in their entirety.

TECHNICAL FIELD

This disclosure relates to field of connectors suitable for use in high data rate applications.

BACKGROUND

Backplane connectors, which are not limited to use in backplane applications, are generally designed to provide certain mechanical features. Common features include high numbers of pins per linear inch, mechanical robustness, and the ability to support high data rates. While there are a number of applications where older connectors are suitable, new connectors designed for backplane applications now are expected to support at least 25 Gbps data rates and certain applications are looking to extend to data rates as high as 56 Gbps.

A backplane connector, while possible to be provided in a variety of different configurations, often will be provided in either a mezzanine configuration (supporting two parallel circuit boards) or an orthogonal configuration (supporting two circuit boards that are orthogonal to each other). The orthogonal configuration is more common because it allows for a bottom main circuit board and a number of secondary circuit boards (often referred to as daughter cards) that are positioned parallel to each other but orthogonal to the main circuit board. Each daughter card can support one or more integrated circuits (IC) that provides the desired processing functionality.

One issue with orthogonal configurations is that there is a need to translate from a first right angle connector to a second right angle connector that is rotated 90 degrees from the first right angle connector. This has typically been accomplished by using an adaptor piece between two right angle connectors. One common configuration has been to have the adaptor piece consist of a circuit board with two header connectors mounted on both sides of the circuit board. The header connectors each provide a 45-degree rotation and collectively provide the desired 90-degree rotation. Due to the issues related to signal integrity (which becomes more problematic as data rates increase), the use of a circuit board in an adaptor is less desirable. Consequentially, improved adaptors have been developed that offer improved performance. However, it turns out that each mating interface provides the potential for signal reflections and further signal loss and therefore further improvements would be appreciated.

SUMMARY

A connector system can be configured so that it provides desirable signal integrity. The connector system includes a first connector that can provide a 90-degree right angle configuration and includes a second connector that includes a right-angle configuration with a 90-degrees twist at a mating interface. When mated together, the first and second connectors provide an orthogonal arrangement that offers performance and cost improvements while allowing signal pairs to communicate from one board to another with a single interface junction. As can be appreciated, a U-shaped ground shield can be provided for each signal terminal pair. A shield can further be provided on each wafer to improve electrical performance. The depicted configuration allows for high data rates in a dense package while minimizing the number of components and providing for desirable signal integrity.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
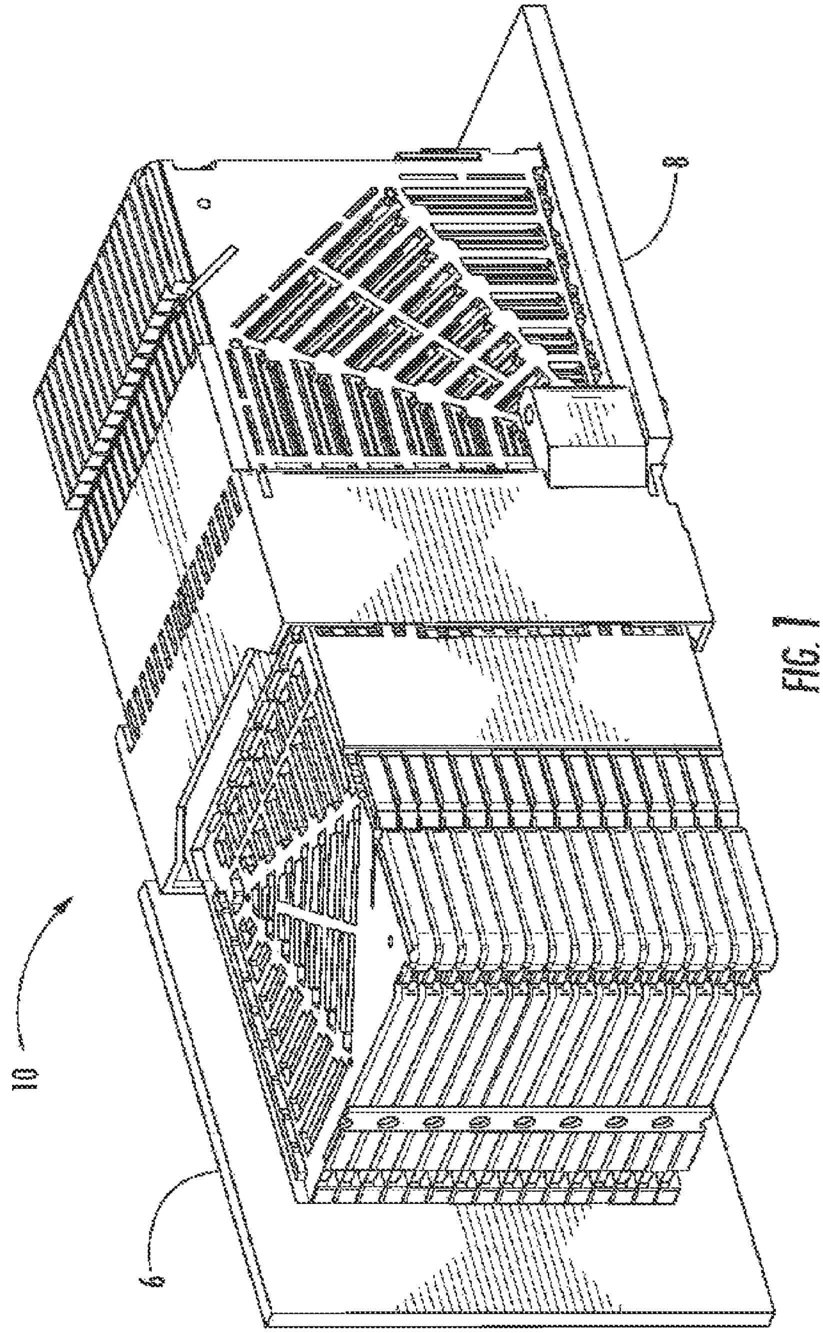
FIG. 1 illustrates a perspective view of a connector system.
Figure 2:
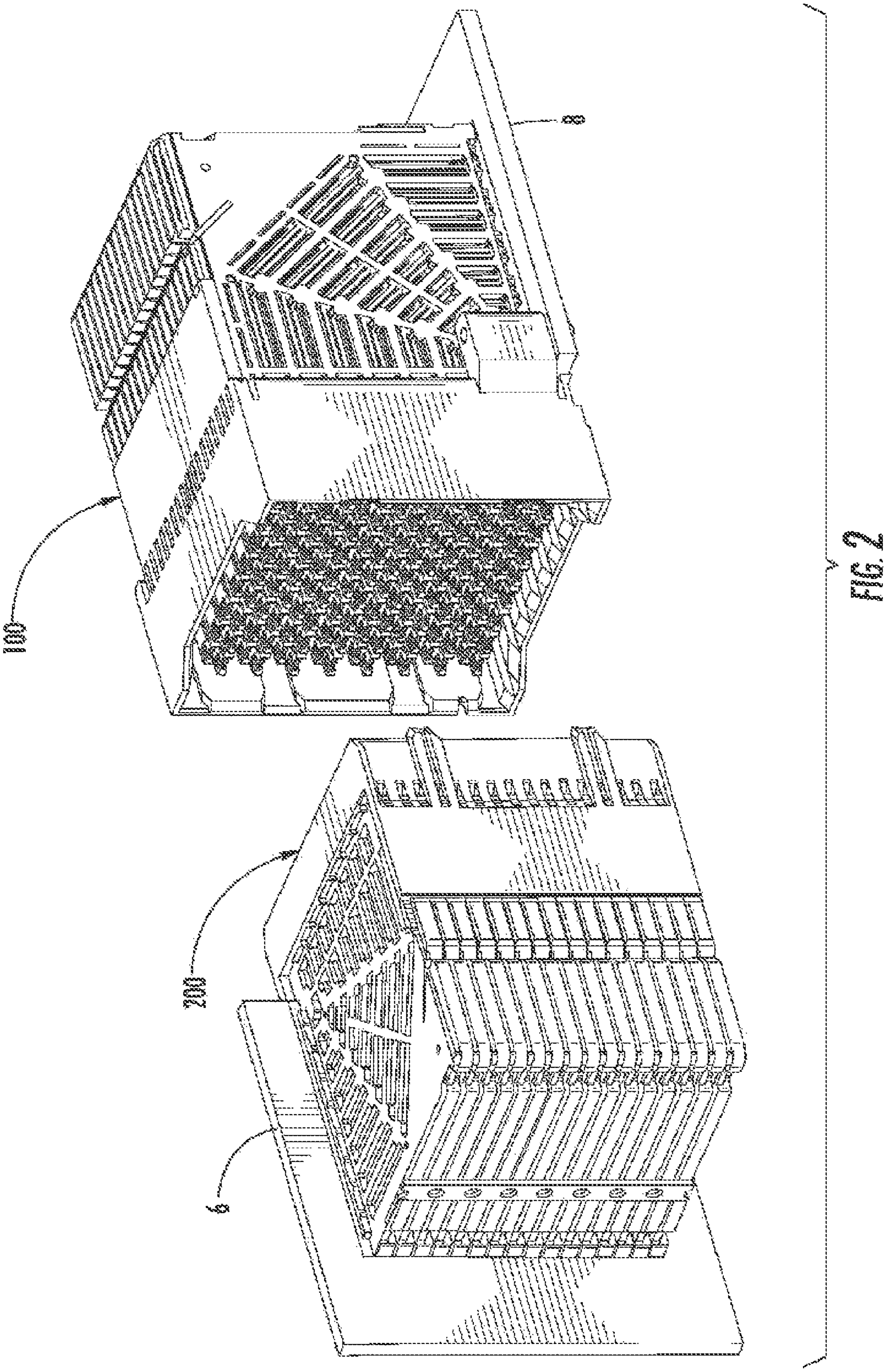
FIG. 2 illustrates a partially exploded perspective view of the embodiment depicted in FIG. 1.
Figure 3:
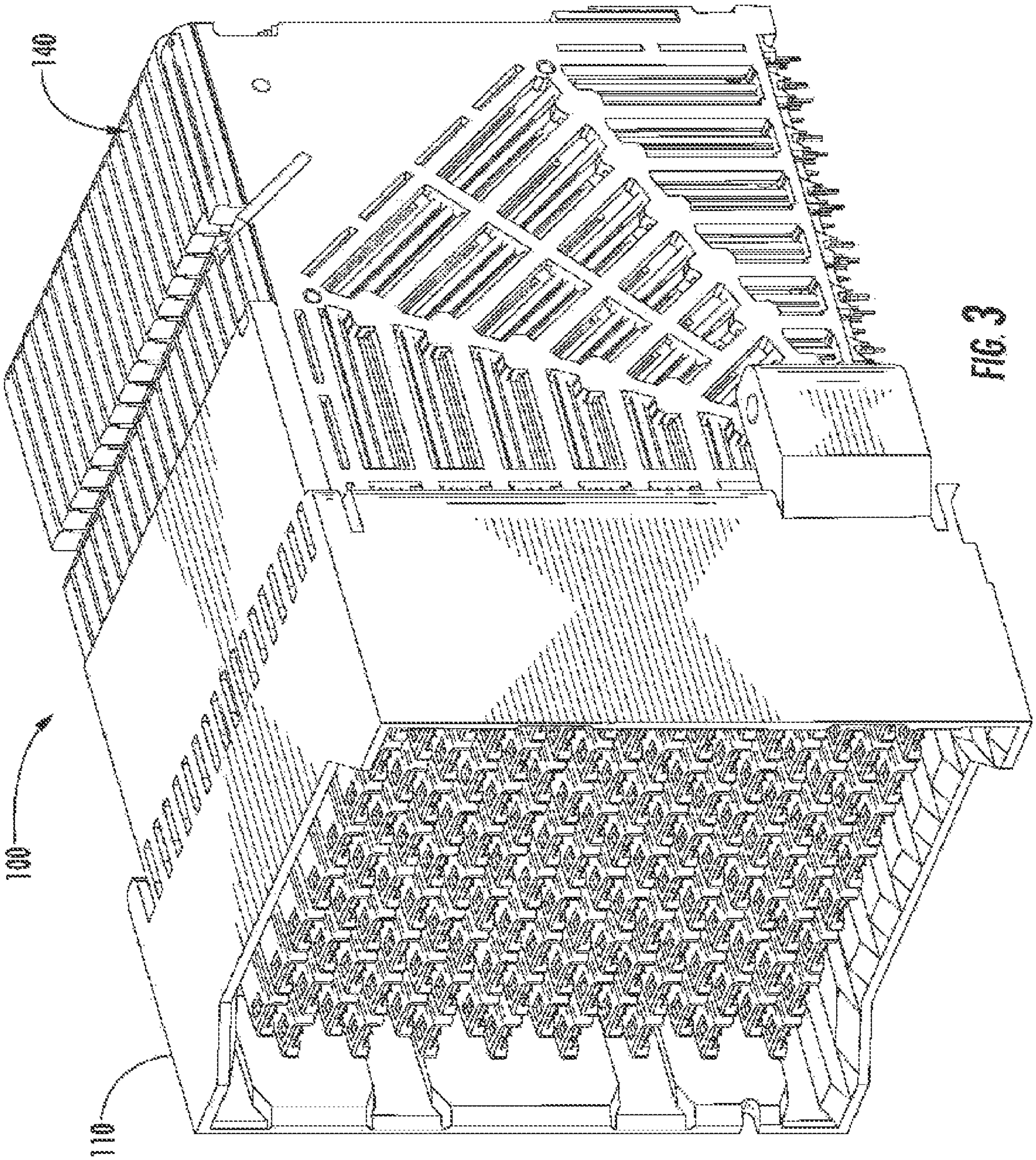
FIG. 3 illustrates a perspective view of one of the connectors depicted in FIG. 2.
Figure 4:
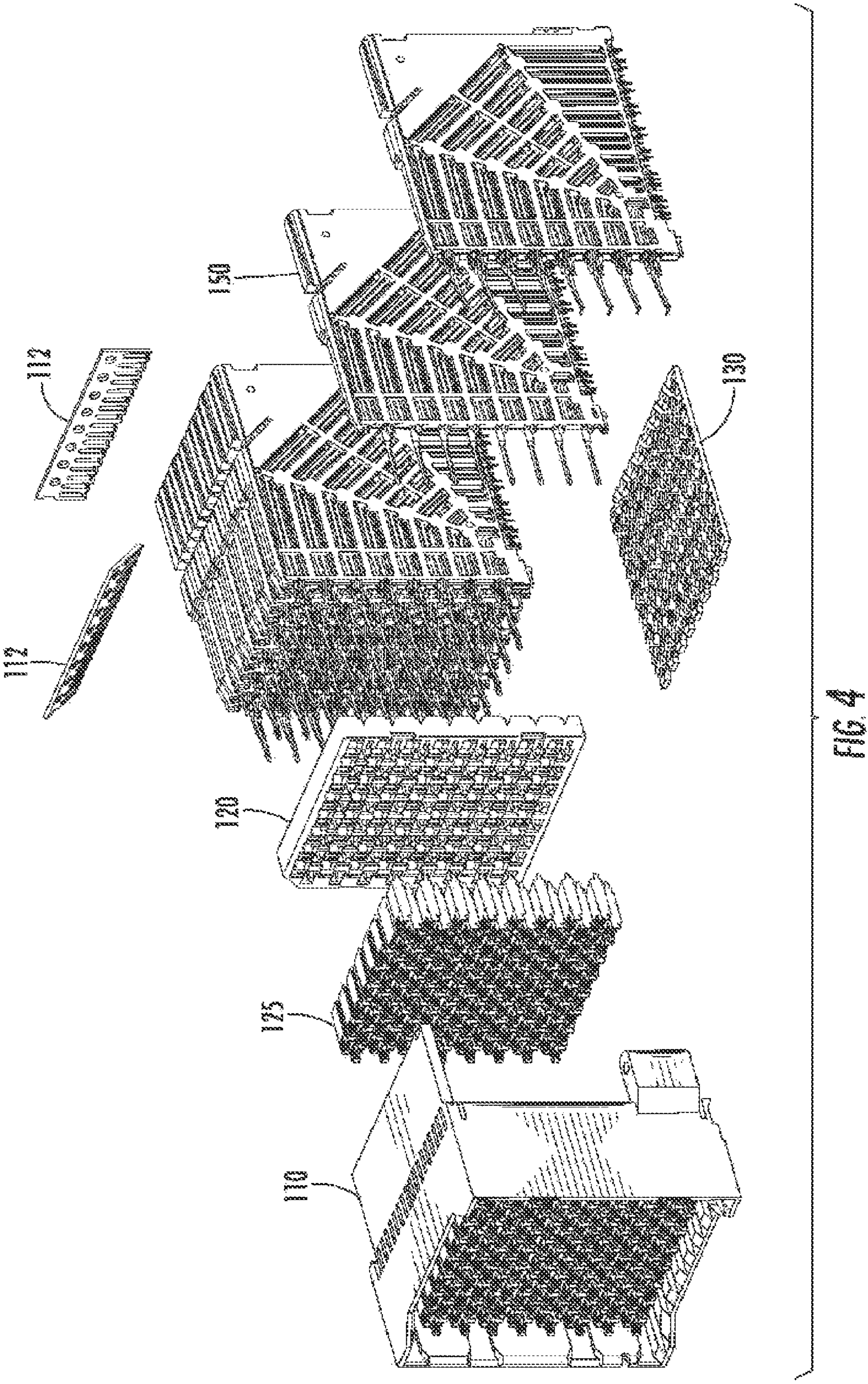
FIG. 4 illustrates a partially exploded perspective of the embodiment depicted in FIG. 3.
Figure 5:
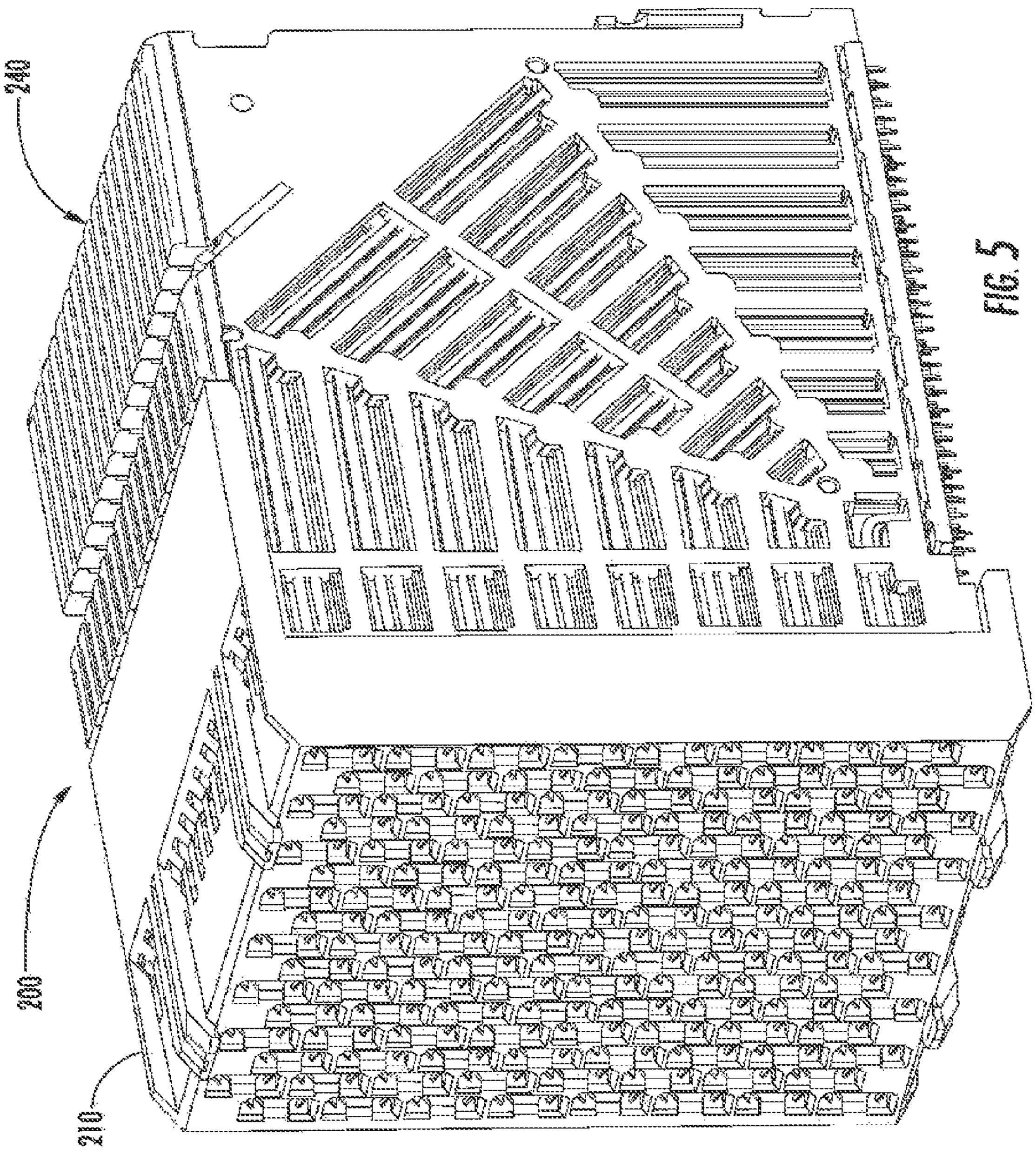
FIG. 5 illustrates a perspective view of another of the connectors depicted in FIG. 2.
Figure 6:
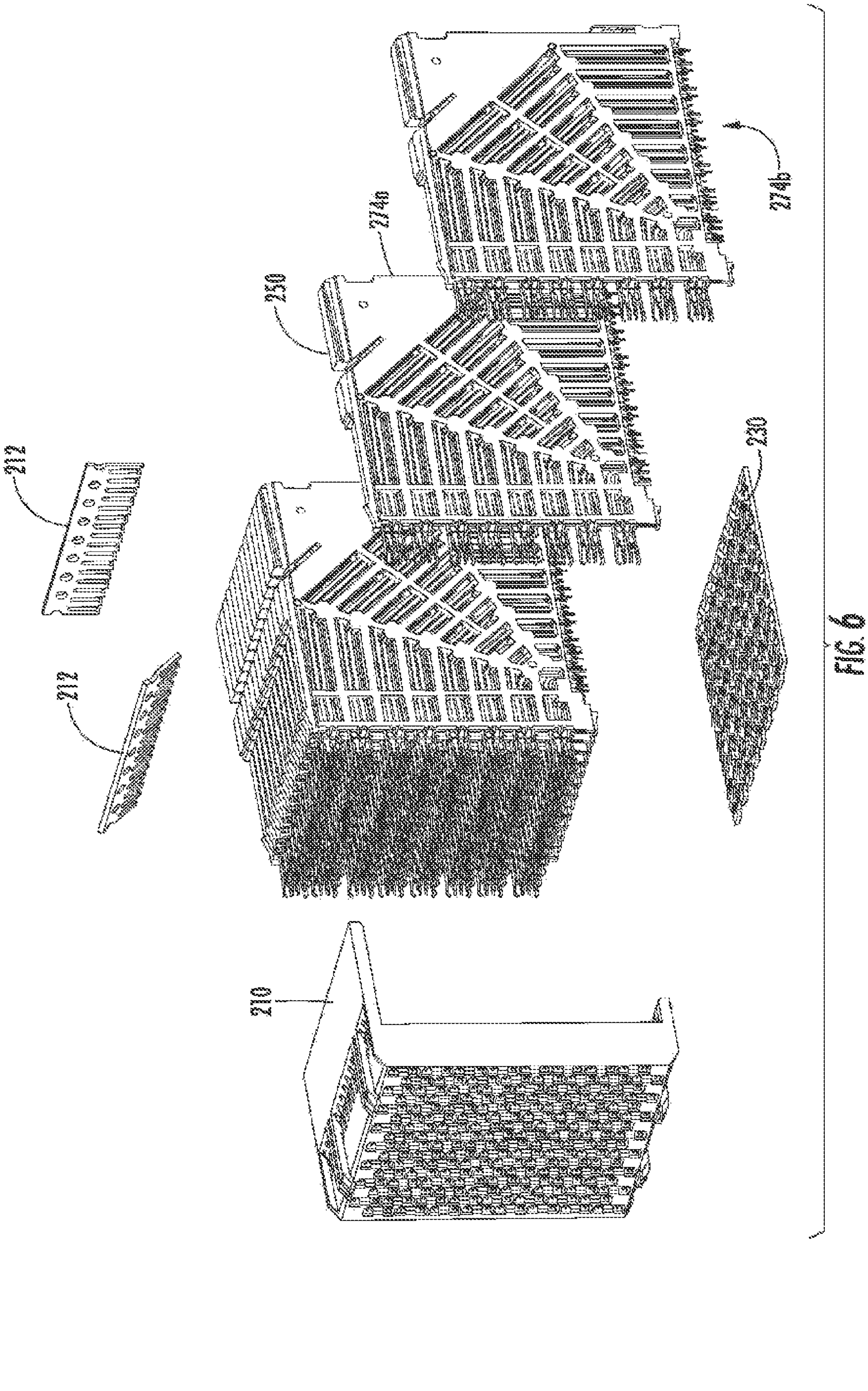
FIG. 6 illustrates a partially exploded perspective of the embodiment depicted in FIG. 5.
Figure 7:
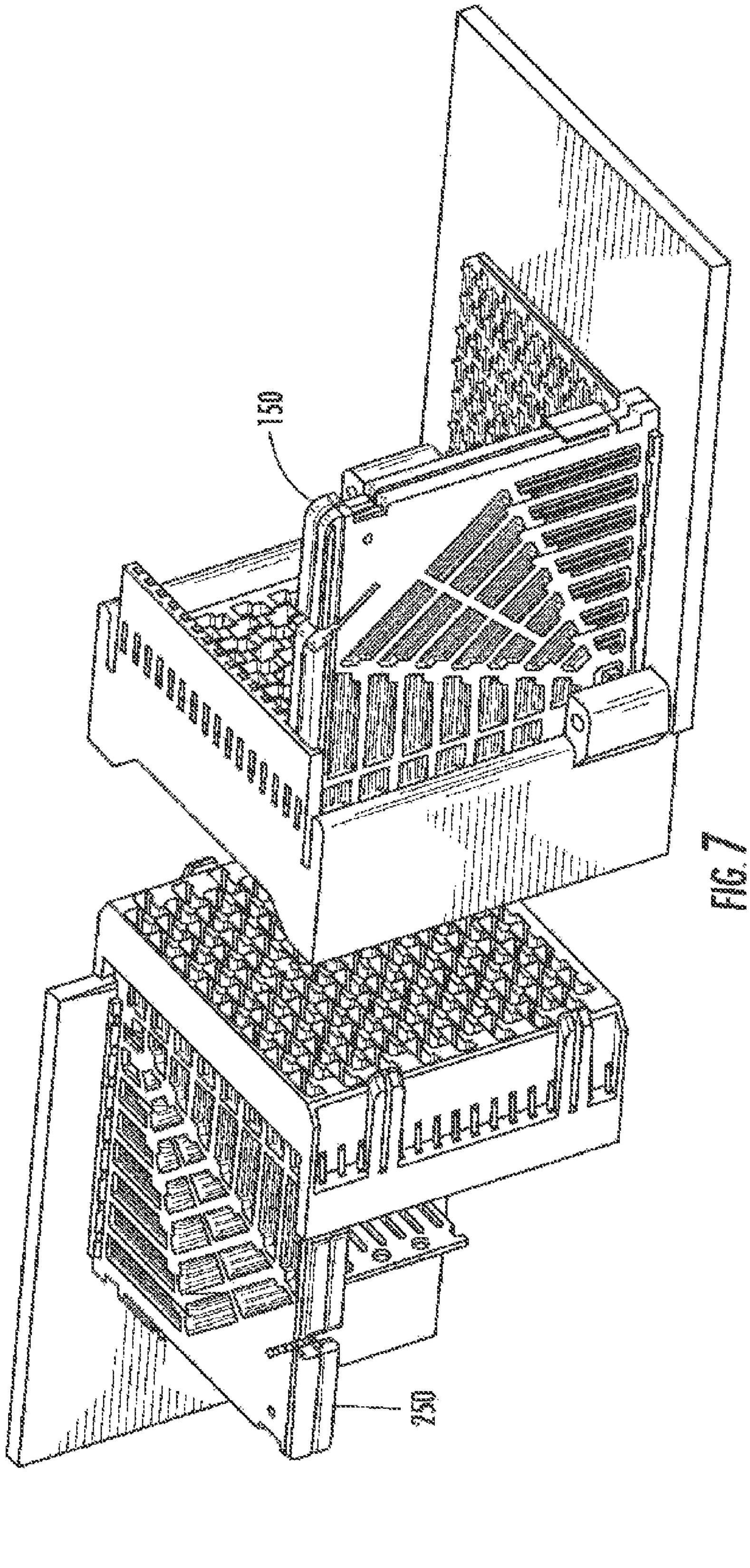
FIG. 7 illustrates a simplified perspective view of an embodiment of the connector system of FIG. 1 in an unmated condition.
Figure 8:
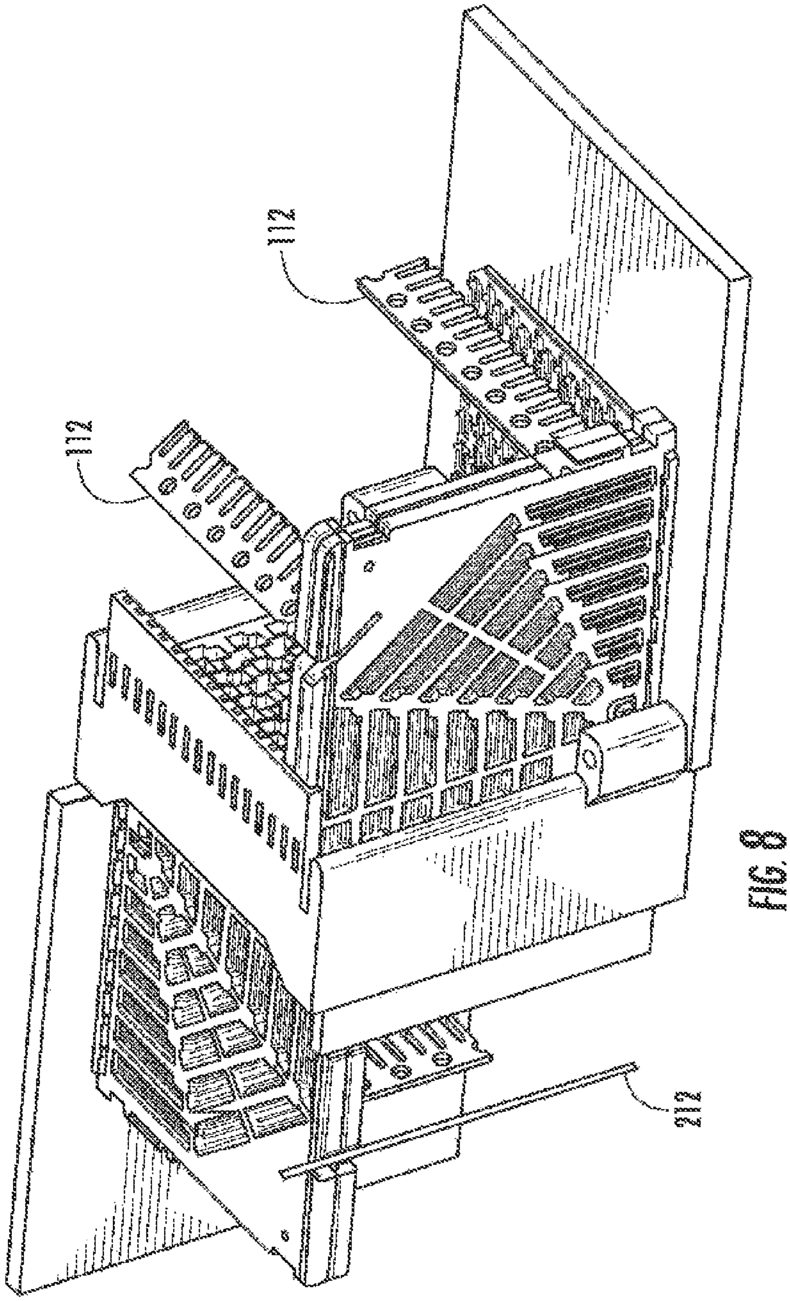
FIG. 8 illustrates a perspective view of the embodiment depicted in FIG. 7 with the connectors mated.
Figure 9:
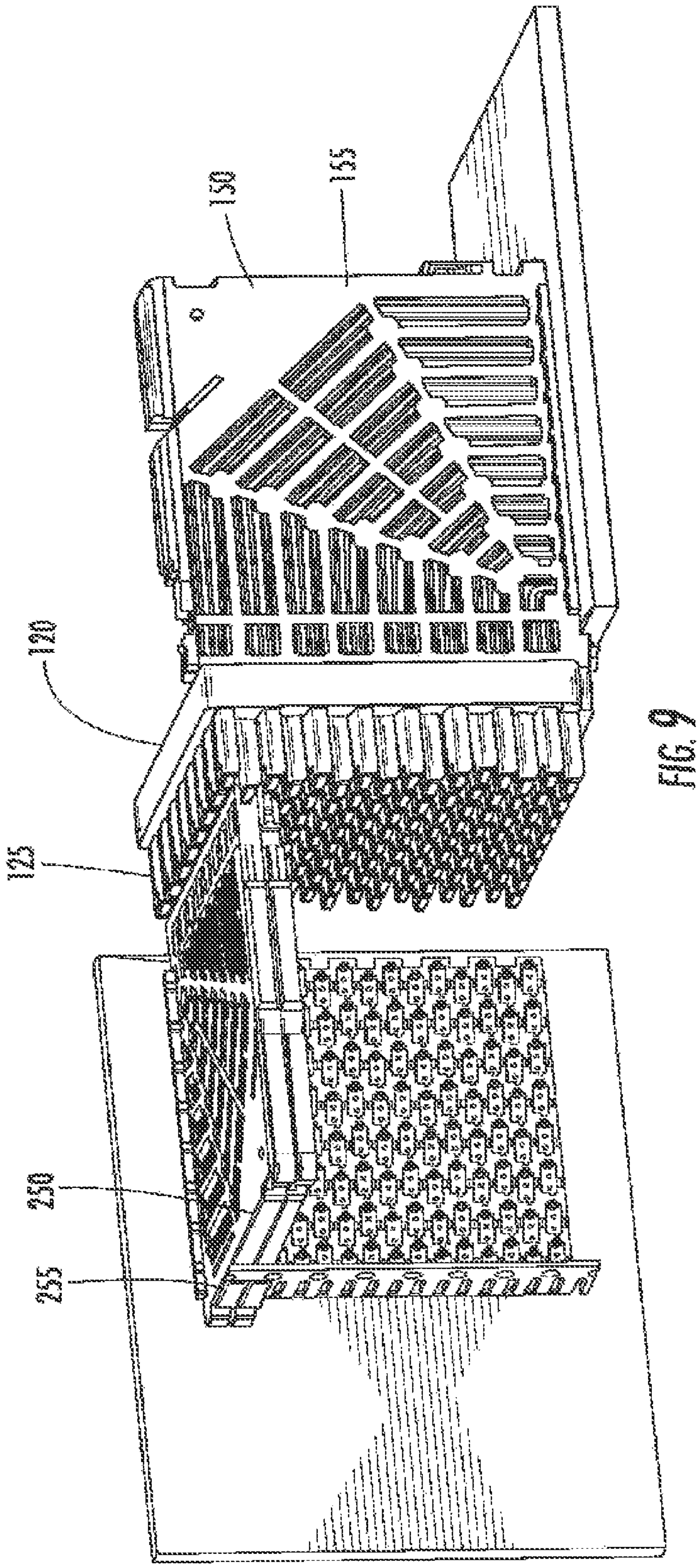
FIG. 9 illustrates a simplified perspective view of the embodiment depicted in FIG. 8.
Figure 10:
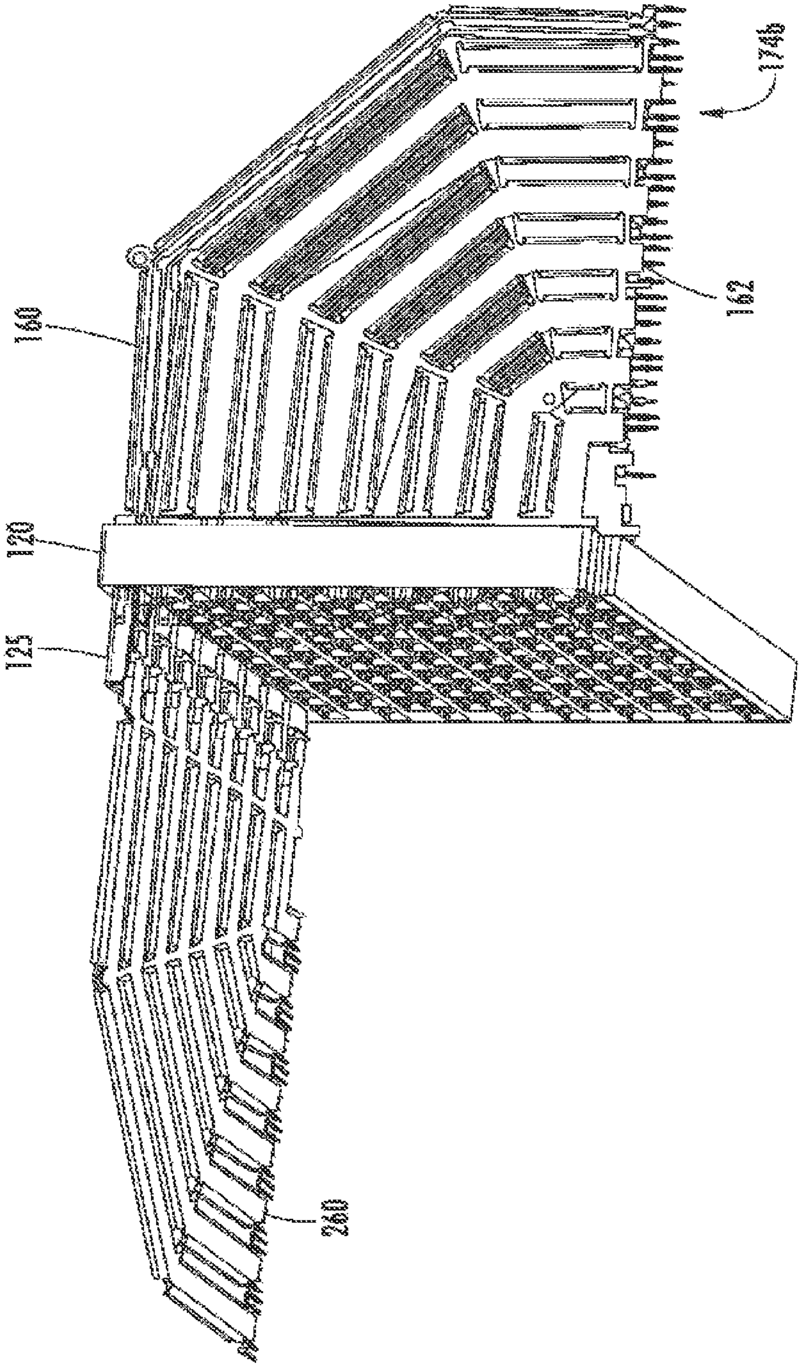
FIG. 10 illustrates a simplified perspective view of the embodiment depicted in FIG. 9.
Figure 11:
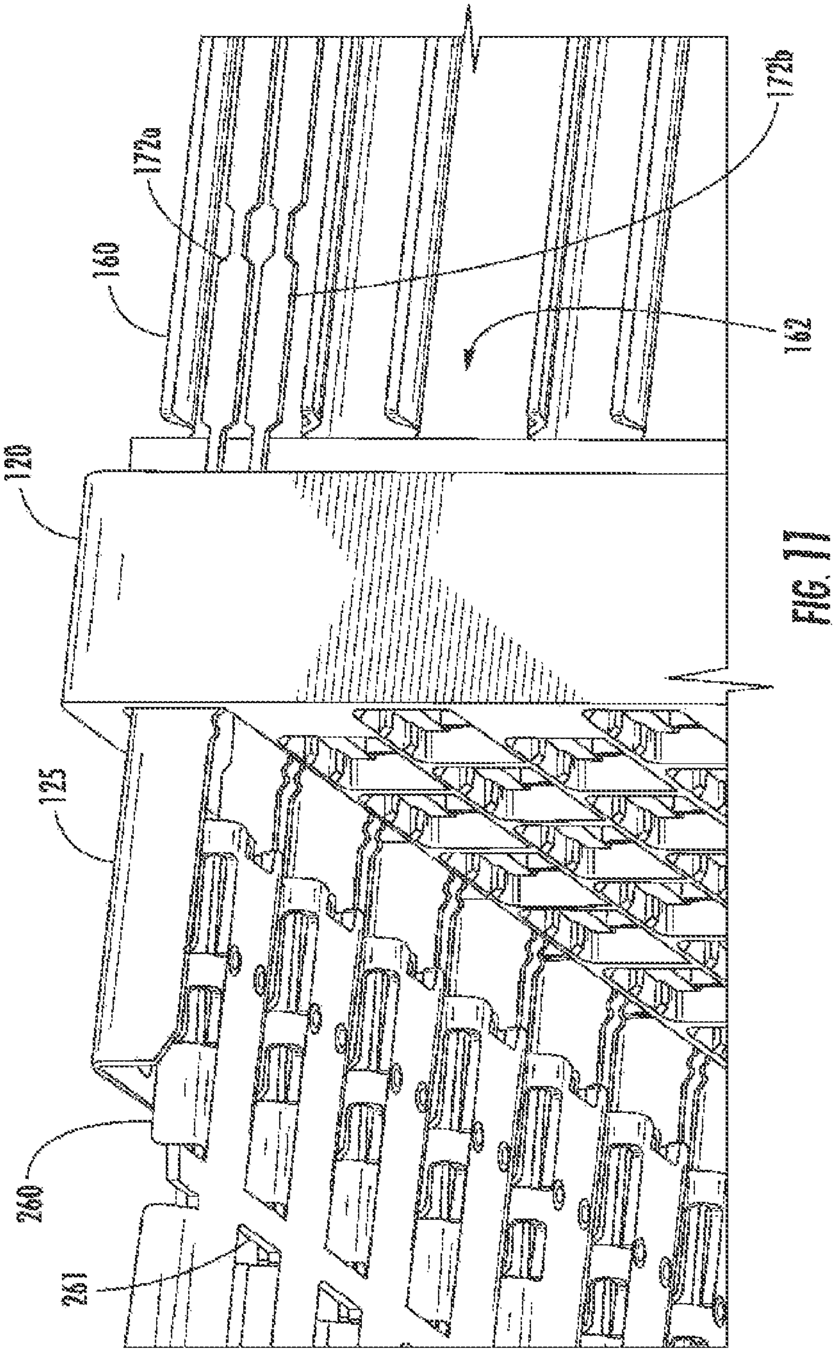
FIG. 11 illustrates an enlarged perspective view of the embodiment depicted in FIG. 10.
Figure 12:
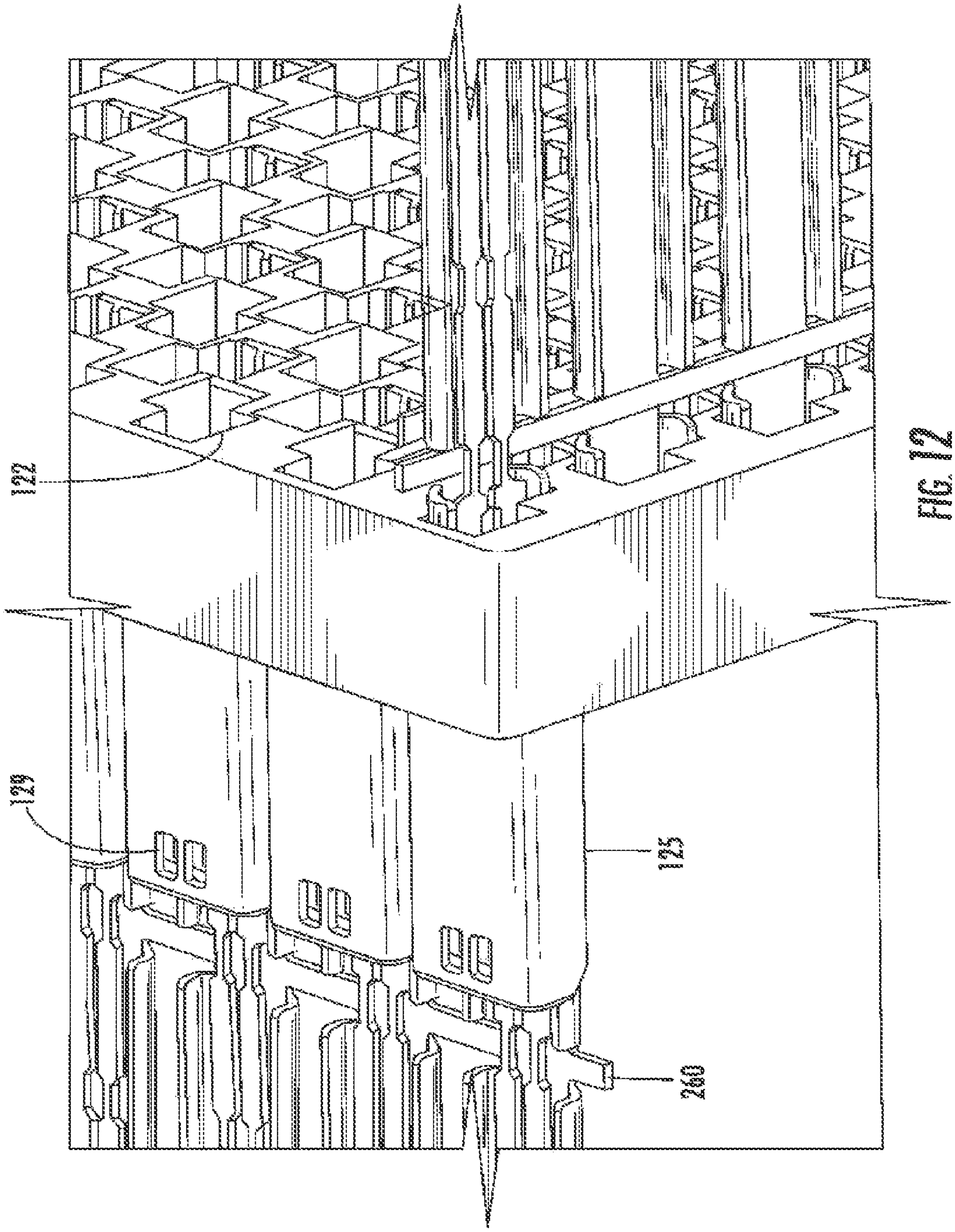
FIG. 12 illustrates another perspective view of the embodiment depicted in FIG. 11.
Figure 13:
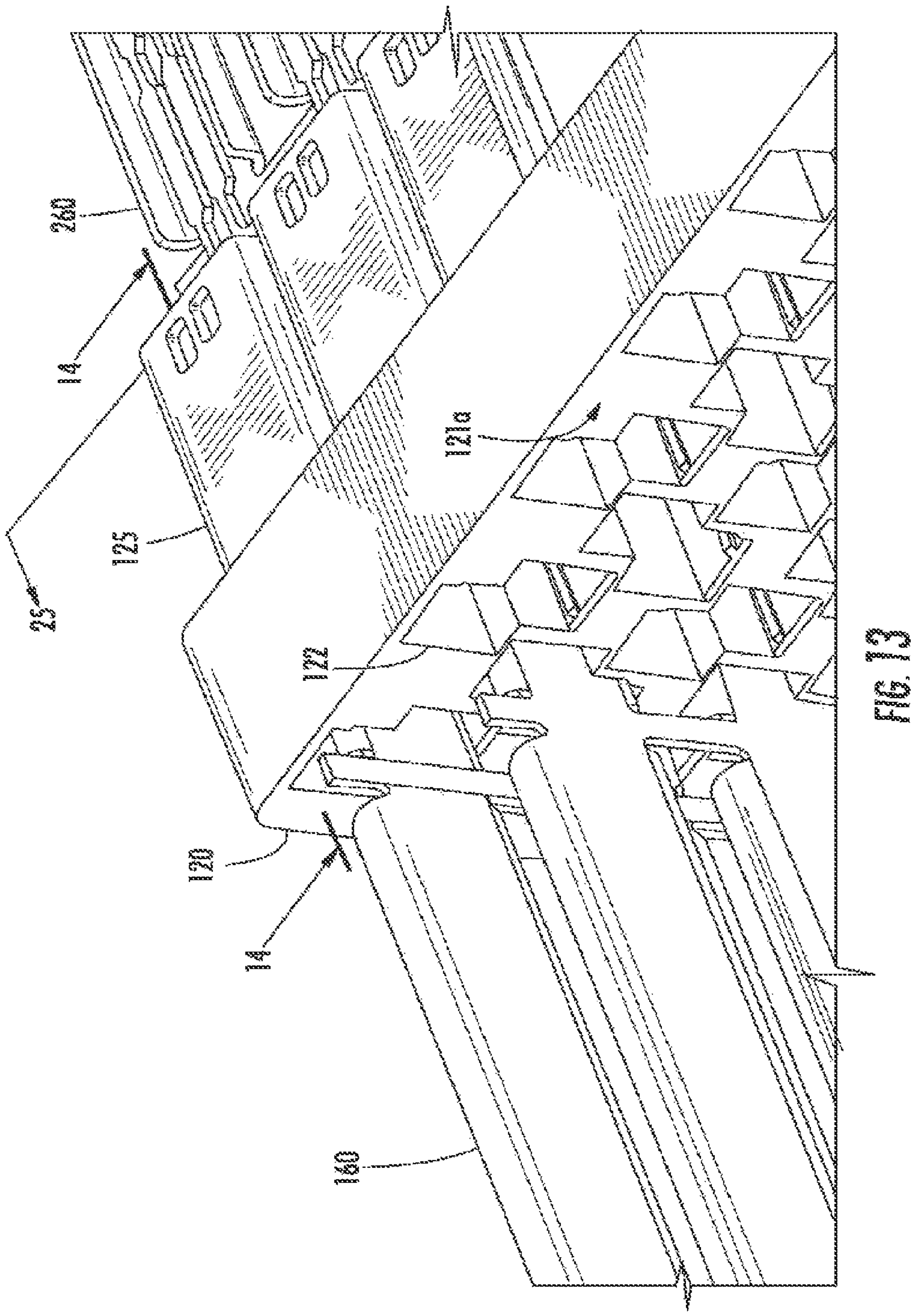
FIG. 13 illustrates another perspective view of the embodiment depicted in FIG. 12.
Figure 14:
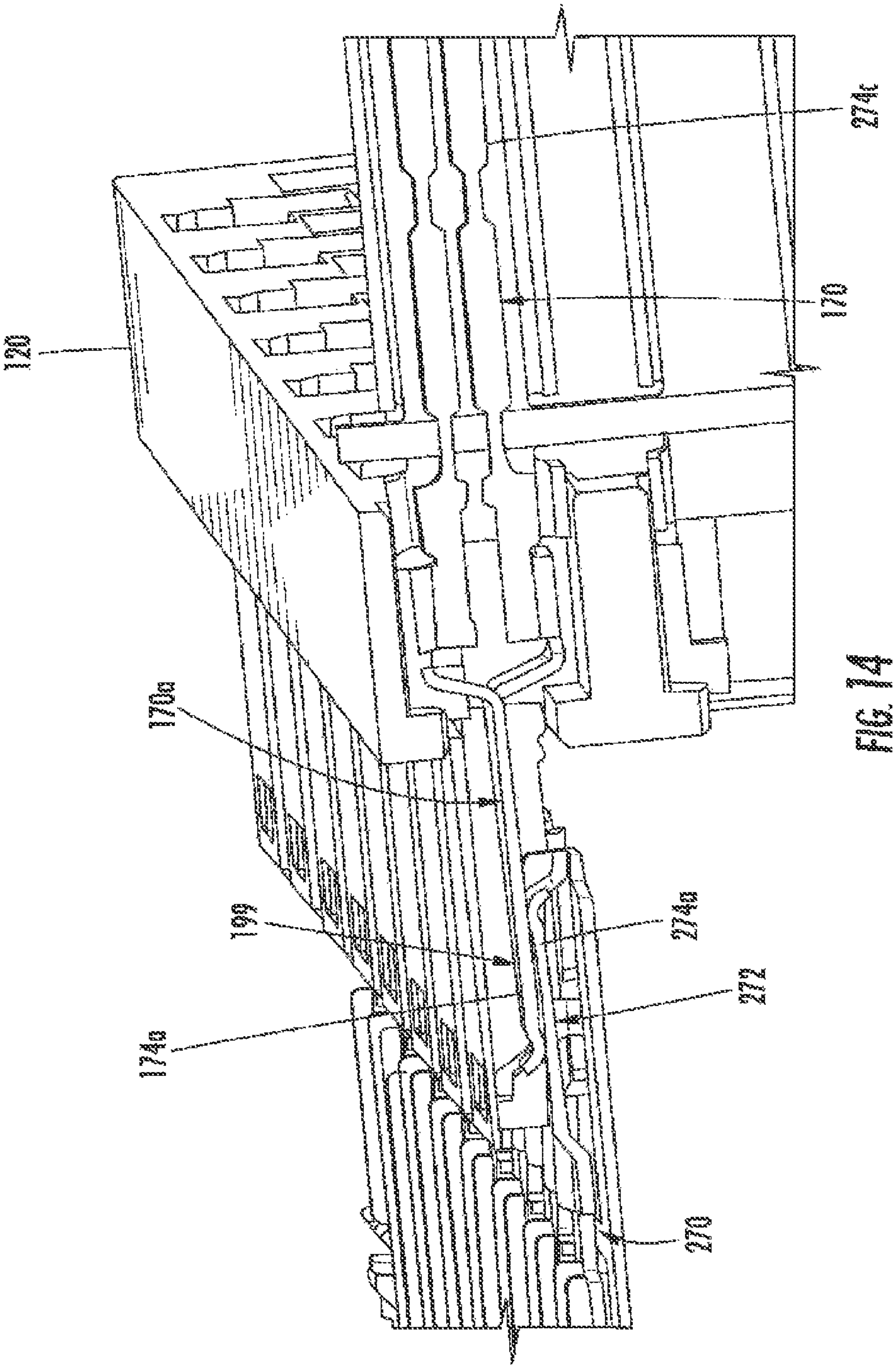
FIG. 14 illustrates a perspective cross-sectional view taken alone line 14-14 in FIG. 13.
Figure 15:
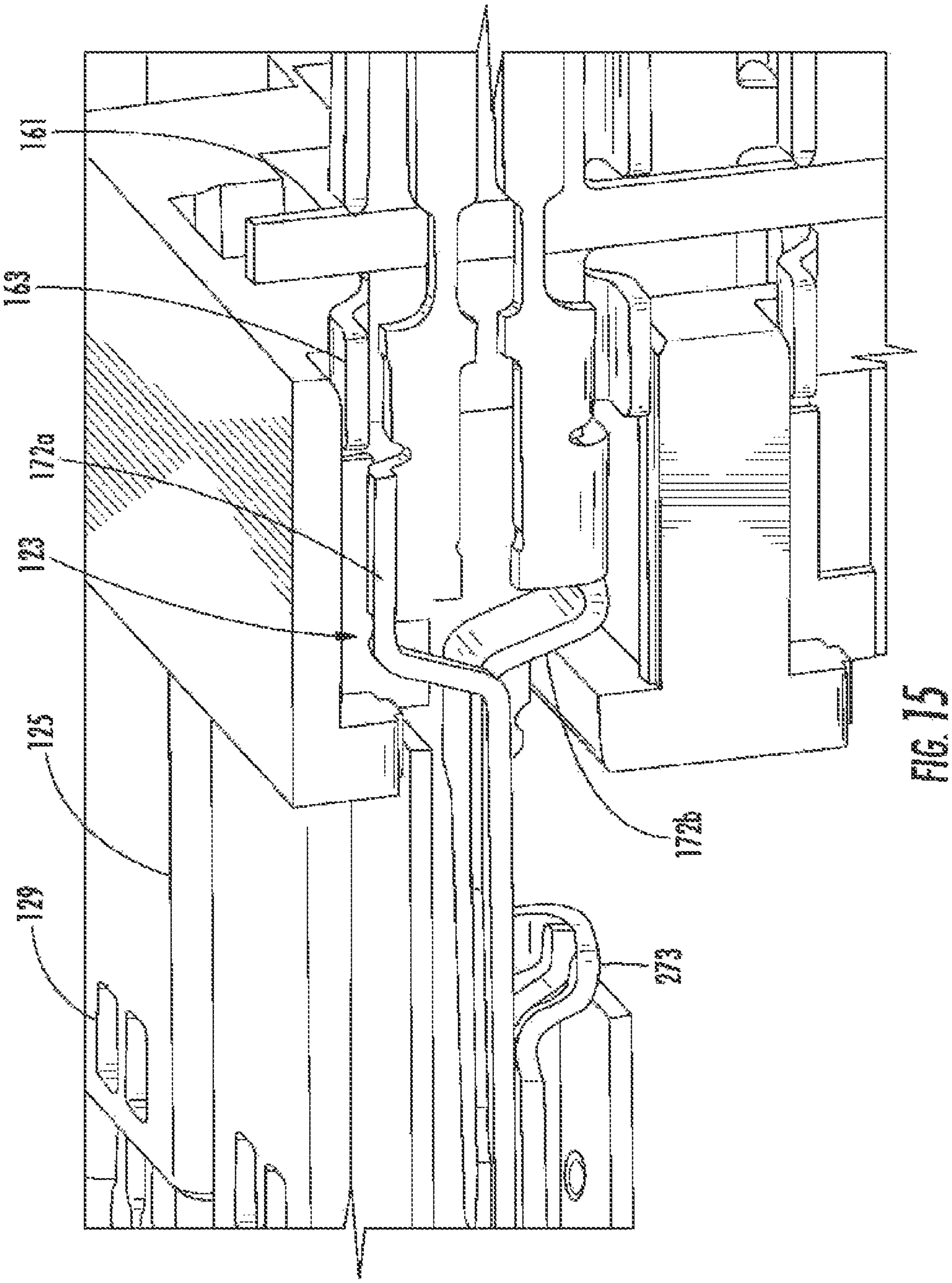
FIG. 15 illustrates an enlarged perspective view of the embodiment depicted in FIG. 14.
Figure 16:
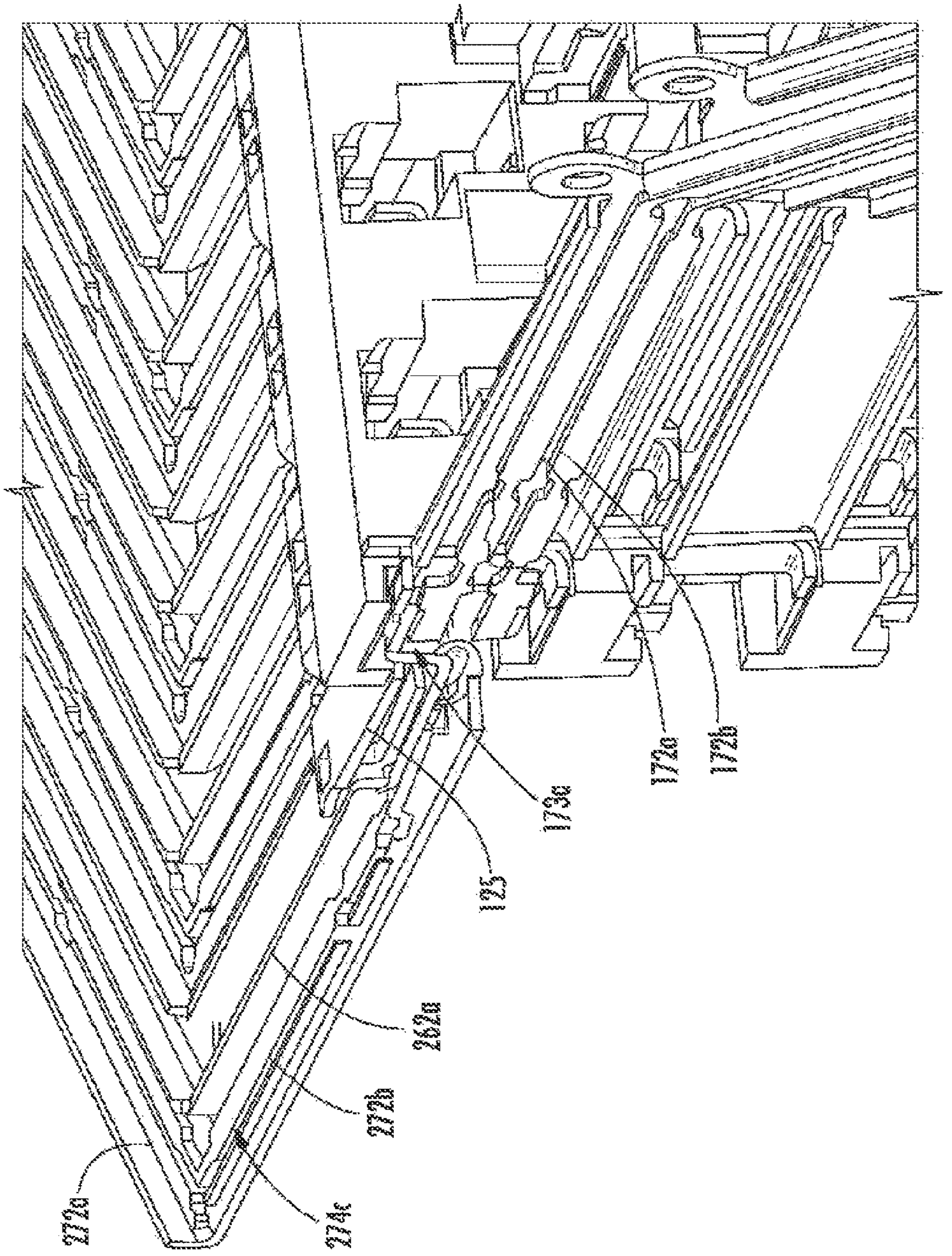
FIG. 16 illustrates another perspective view of the embodiment depicted in FIG. 14.
Figure 17:
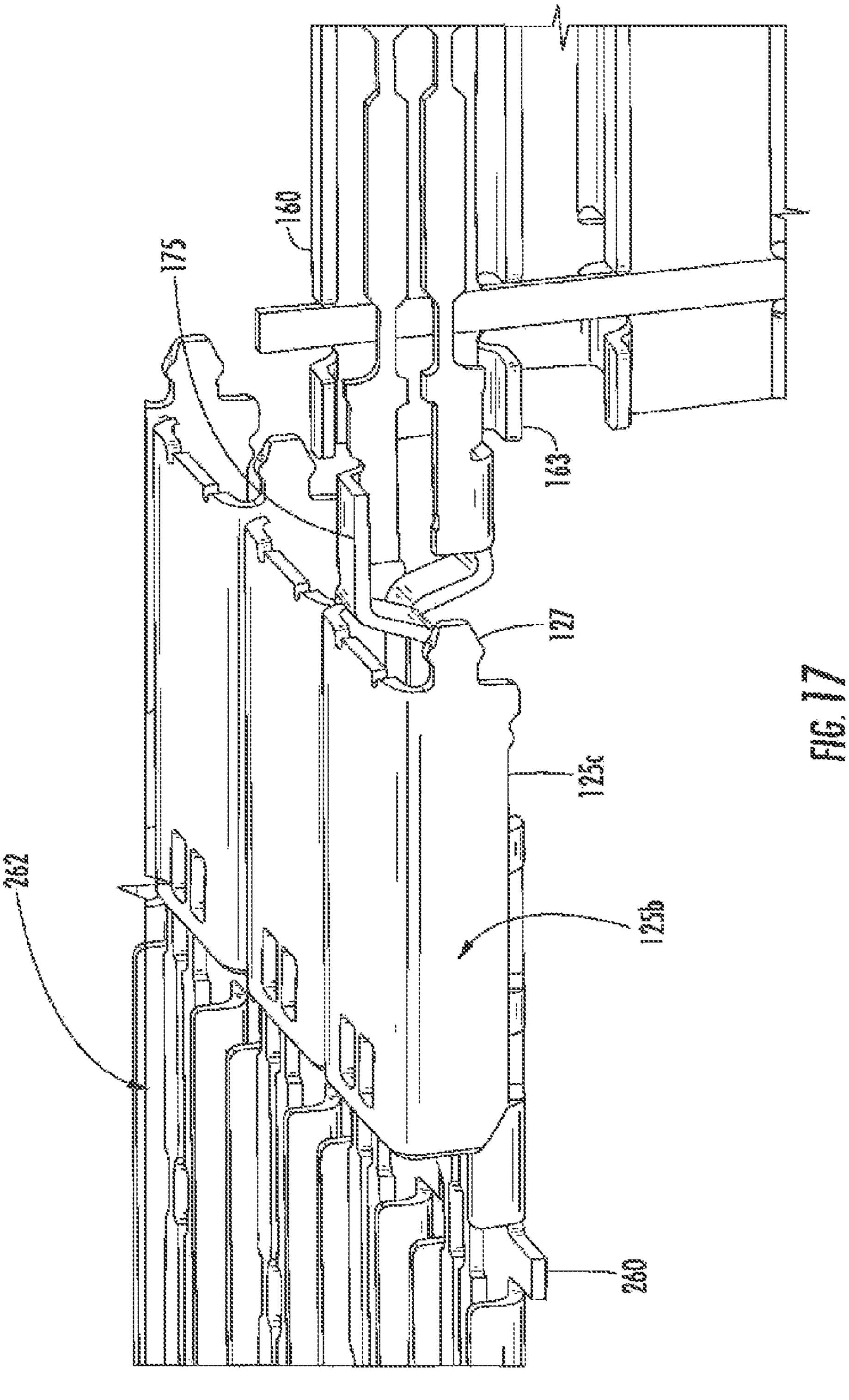
FIG. 17 illustrates a perspective view of features associated with an embodiment of a mating interface.
Figure 18:
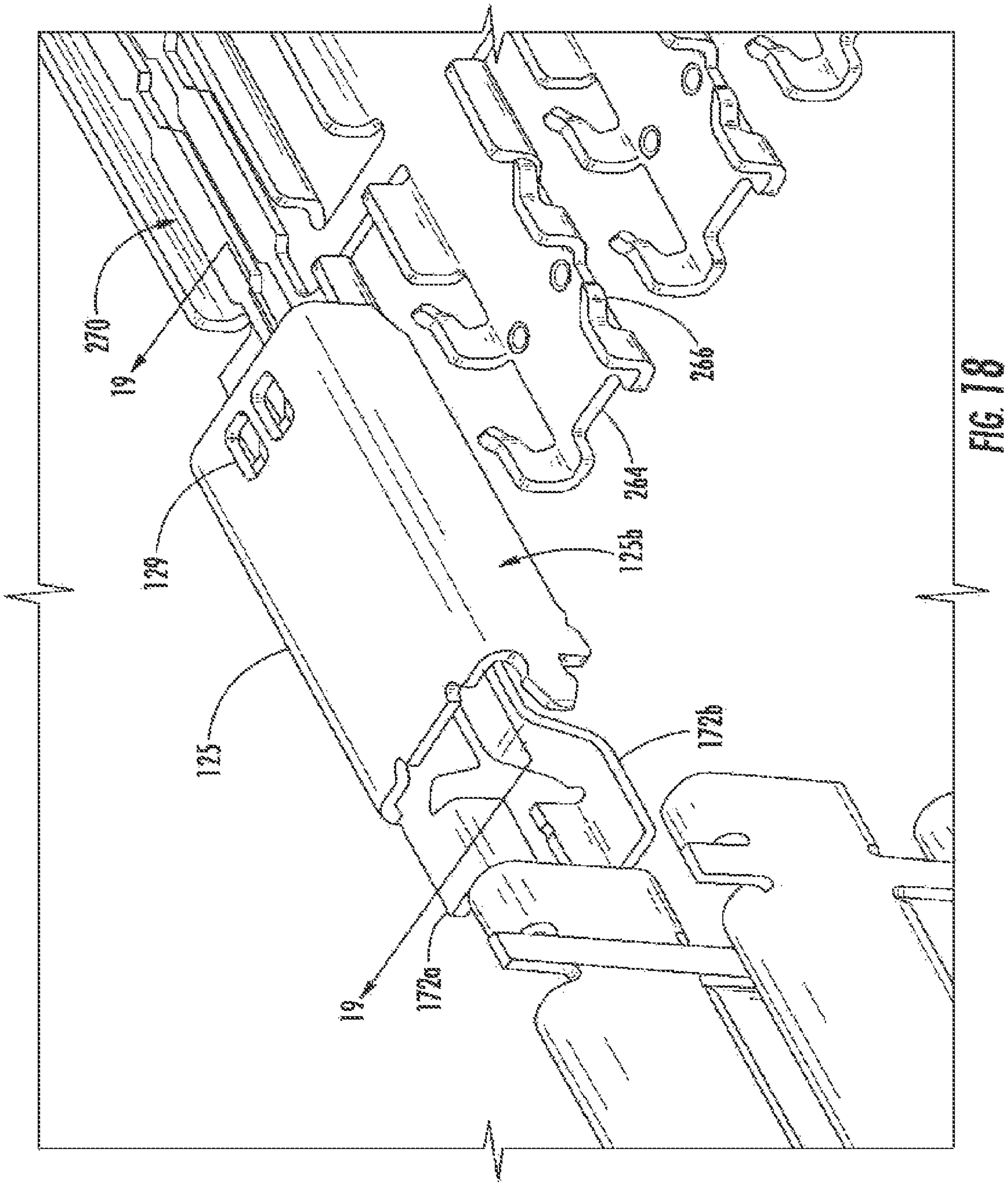
FIG. 18 illustrates a simplified perspective view of the embodiment depicted in FIG. 17.
Figure 19:
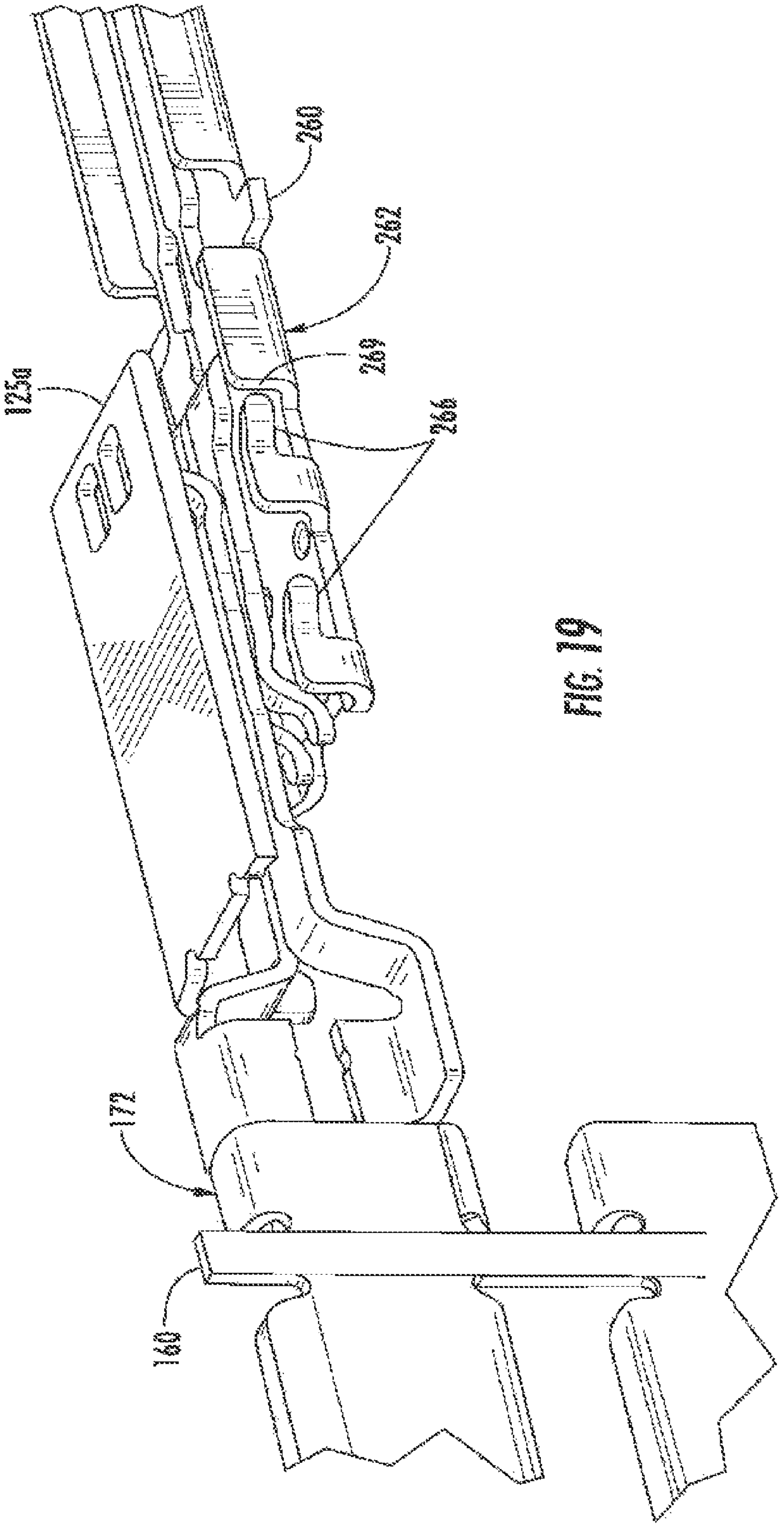
FIG. 19 illustrates a perspective cross-sectional view taken alone line 19-19 in FIG. 18.

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

The depicted configurations illustrate features that can be used to provide a connector system that can be used in a backplane configuration with a first connector and a second connector. The first connector can be a right-angle connector. The second connector can be a right-angle connector with a 90-degree twist. As can be appreciated, the twist is possible due to the fact that the second connector includes signal terminals that have a contact that is blanked and formed. As can be further appreciated, the ground shield is provided in a U-shaped shielding arrangement that at least partially encloses a pair of signal terminals to help provide shielding. In the depicted embodiment the U-shaped shielding configuration is provided substantially along an entire length of the terminals path from the first circuit board to a mating interface and from the mating interface to a second circuit board and there is also shielding in the mating interface between the signal terminals of the first connector and signal terminals of the second connector, thus allowing for shielding on three sides of a particular terminal pair. Thus, the depicted configuration provides a potentially high performing and suitably dense configuration.

Turning to the FIGS., an embodiment of a connector system 10 includes a connection between a first circuit board 6 and a second circuit board 8 that are positioned orthogonally to each other. Specifically, a connector 100 is mounted on the circuit board 8 and is configured to mate with a connector 200 mounted on the circuit board 6. The connector 100 includes a shroud 110 that helps support a wafer set 140 that includes a plurality of wafers 150, which each include a frame 155, formed of an insulative material, that supports terminals as will be discussed below. To help provide additional stability and performance, the connector 100 includes an insert 120 that supports a plurality of U-shields 125. The insert 120 includes a first face **121*a* and a second face 121*b*. A tail aligner 130, which can be plated plastic and have electrical commoning features between ground shields, can be provided to help support the tails while a plurality of combs 112 can be used to help hold the wafer set 140** in a desired alignment and orientation.

As can be appreciated, the shroud 110 can be configured to be connected to the supporting circuit board and may be fastened to the circuit board if desired. The structure of the shroud 110, in combination with the use of the combs 112, allows for the elimination of an additional housing to support the wafer set 140.

In should be noted that the insert 120 is depicted as a separate component mounted in the shroud 110. The insert 120 can be formed of an insulative material and includes a conductive path (which can be formed in a desired manner via separate terminals or plating) that allows the insert 120 to electrically connect the U-shields 125 to a ground shield 160, as discussed below. Due to manufacturing limitations associated with preferred high-volume construction methods, it is expected that the insert 120 will be a separate piece from the shroud 110, but such a construction is not required and thus the insert 120 can also be formed integrally with the shroud 110 if desired. Thus, the shroud 110 can include a conductive path that electrically connects the U-shield to the ground shield.

The U-shield 125 includes a top wall 125*a*, two opposing side walls 125*b*, and a mating end 127, with the side walls 125*b* having edges 125*c*. As depicted, the mating end 127 is configured to engage the insert 120 through aperture 124, which is on the second face 121*b*, and can be configured differently than the aperture 122 on the first face 121*a*. Specifically, the aperture 124 can include pockets 126 that receive the mating ends 127.

The connector 200 can be constructed in a manner similar to connector 100 and includes a shroud 210 that helps support a wafer set 240. The connector 200 further includes a tail aligner 230, which can be plated plastic and have commoning features, that helps hold the plurality of wafers 250 in the wafer set 240 together while a plurality of combs 212 can be used to hold the wafer set 240 in a desired alignment and configuration. Each wafer 250 includes an insulative frame 255 for supporting terminals, as will be discussed below.

As both the connectors 100, 200 are both right angled connectors, the connectors allow for a connection between circuit boards 6 and 8 via the wafers 150, 250. It can be appreciated that circuit boards 6 and 8 are aligned in an orthogonal manner. Typically, two right angle connectors that are configured to join two orthogonally orientated circuit boards would require some sort of intermediary connector that 0 would map the alignment of the contacts in one right angle connector to the contacts of the other right angle connector. The depicted system works without such an intermediary connector.

As can be appreciated, the signal terminals 172*a*, 172*b* form a terminal pair 170 that is supported by the insulative frame 155. The signal terminals each include a contact 174*a*, a tail 174*b*, and a body 174*c* that extends therebetween. The bodies 174*c* of the signal terminals 172*a*, 172*b* are coupled together to form a differential pair and as depicted, are arranged to provide a vertical edge-coupled configuration. Each signal terminal 172*a*, 172*b* includes a folded section 175 that provides the transition from vertical to horizontal orientation that is still edge-coupled. Each insulative frame 155 will typically be configured to support a plurality of terminal pairs 170 (typically four or more such pairs, it being understood that an upper limit will be reached as manufacturing tolerances and issues with warpage are expected to prevent excessively high numbers of pairs such as 15 or 20 terminal pairs). As noted above, each terminal pair 170 has the body 174*c* of the two terminals aligned in an edge-to-edge configuration so that spacing of the terminals can be carefully controlled when the terminals are insert-molded into the wafer 150. Naturally, in a right-angle connector, the top terminal pair will tend to be longer than a bottom terminal pair but such arrangements are well known in the art.

The terminals pairs 170 are configured to mate with terminals pairs 270 that are provided by signal terminals 272*a* and 272*b*. Specifically, the terminal pairs 170 extend through apertures 122 in the insert 120 so that they can connect with the terminal pairs 270. Each of the signal terminals 272*a*, 272*b* include a contact 274*a*, a tail 274*b*, and a body 274*c* extended therebetween. The terminal pairs 270 thus provide a differential pair of the signal terminals 272*a*, 272*b* where the bodies 274*a* of these signal terminals are edge coupled.

In a typical edge-to-edge coupled terminal configuration suitable for higher performance (above 15 Gbps and more preferably above 20 Gbps using non-return to zero (NRZ) encoding), each adjacent terminal pair in a wafer will be separated by a ground terminal. The ground terminal acts as a shield between adjacent pairs of terminals in a wafer and can also provide a return path, thus the use of a ground terminal is generally accepted as being highly desirable at higher date rates (rates above 15 Gbps) as it helps prevent crosstalk between those adjacent pairs. While such a configuration is effective, it takes up additional space as both the ground terminals and the signal terminals need to be connected to the mating connector (otherwise unmated terminals would provide highly undesirable electrical performance). This turns out to be limiting when attempting to increase the density of the mating interface.

The depicted embodiment avoids the use of ground terminals between adjacent terminals pairs in a wafer while still supporting high data rates of at least 20 Gbps using NRZ encoding. Instead, a ground shield 160, 260 is mounted to the frame 155, 255 and the ground shield 160, 260 provides a U-channel 162, 262 around the terminal pairs 170, 270 (respectively). As can be appreciated, the ground shields 160, 260 provide broad-side coupling to the terminal pairs 170, 270 and provide a return path while also helping to shield the terminal pairs 170, 270 from adjacent terminal pairs in the same wafer and in an adjacent wafer.

The ground shield 160 includes an end 163 that is inserted into the insert 120 and a connection frame 161 that provides an electrical connection between adjacent U-channels 162. The ground shield 260 also includes connection frames 261 to provide similar electrical connections between adjacent U-channels 262. Thus, the U-channels 162, 262 can be commoned together at one or more locations to reduce the electrical length between points of commoning. Such a feature tends to reduce shift any resonances that can form between commoned locations to a high frequency, which in turn causes resonances to shift out of the frequency range of interest. Depending on the intended frequency of signaling, additional connector frame locations can be provided.

As can be appreciated, therefore, the U-channel 162 and U-shield provide a three-sided shield for a terminal pair 170 from the tail to the contact in a substantially continuous manner.

Figure 20:
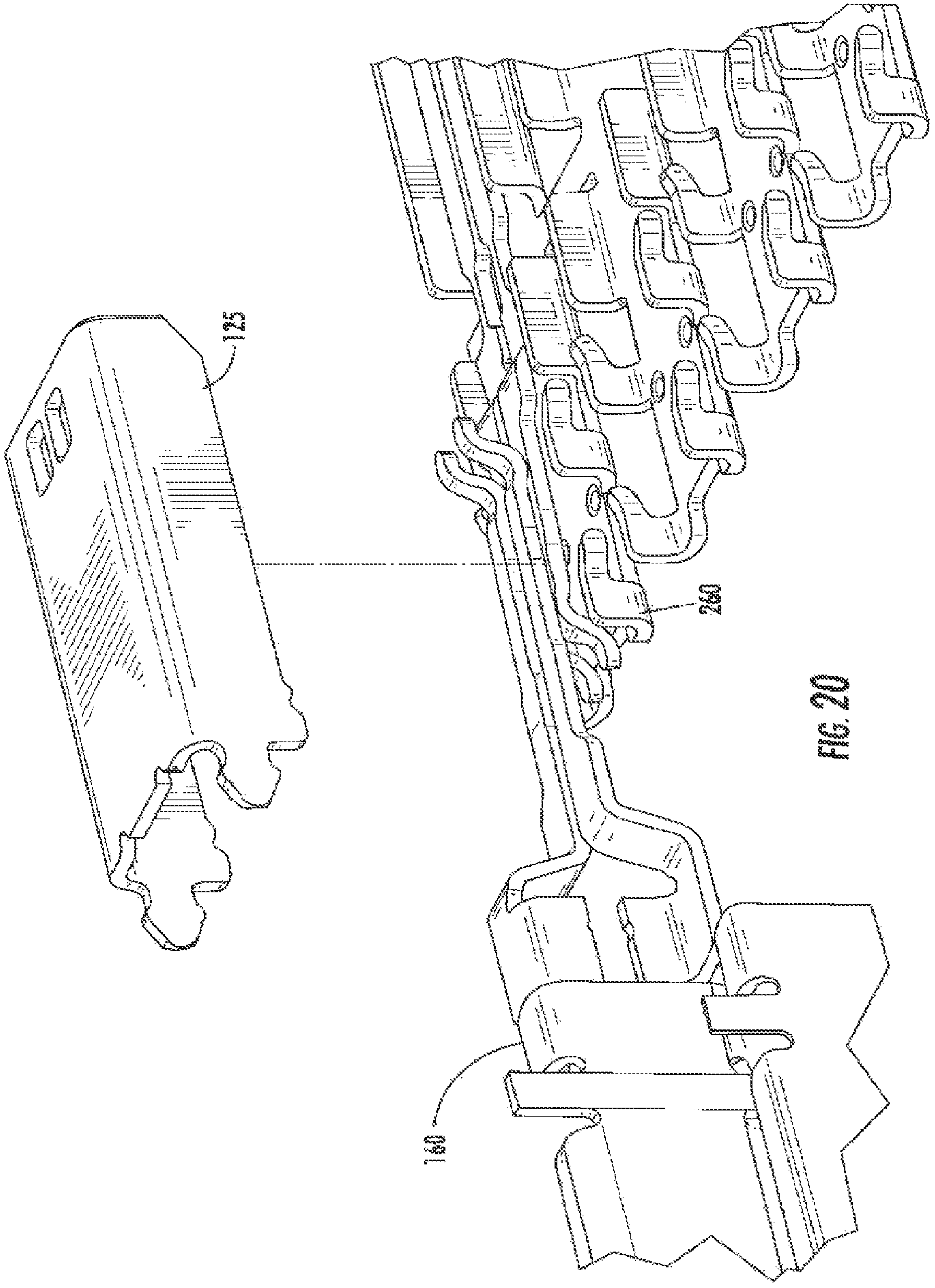
FIG. 20 illustrates a partially exploded perspective of the embodiment depicted in 18.
Figure 21:
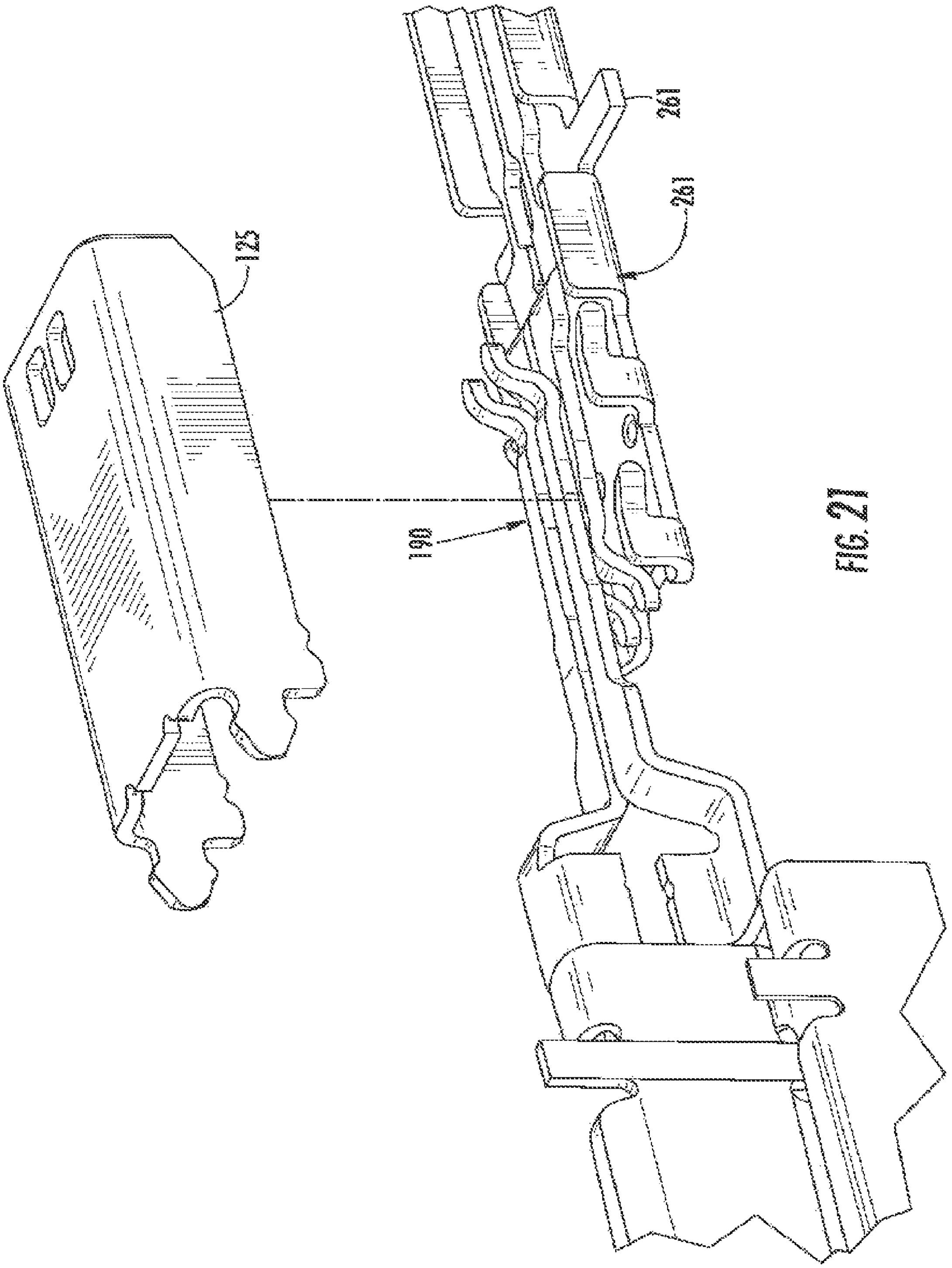
FIG. 21 illustrates a simplified perspective view of the embodiment depicted in FIG. 20.
Figure 22:
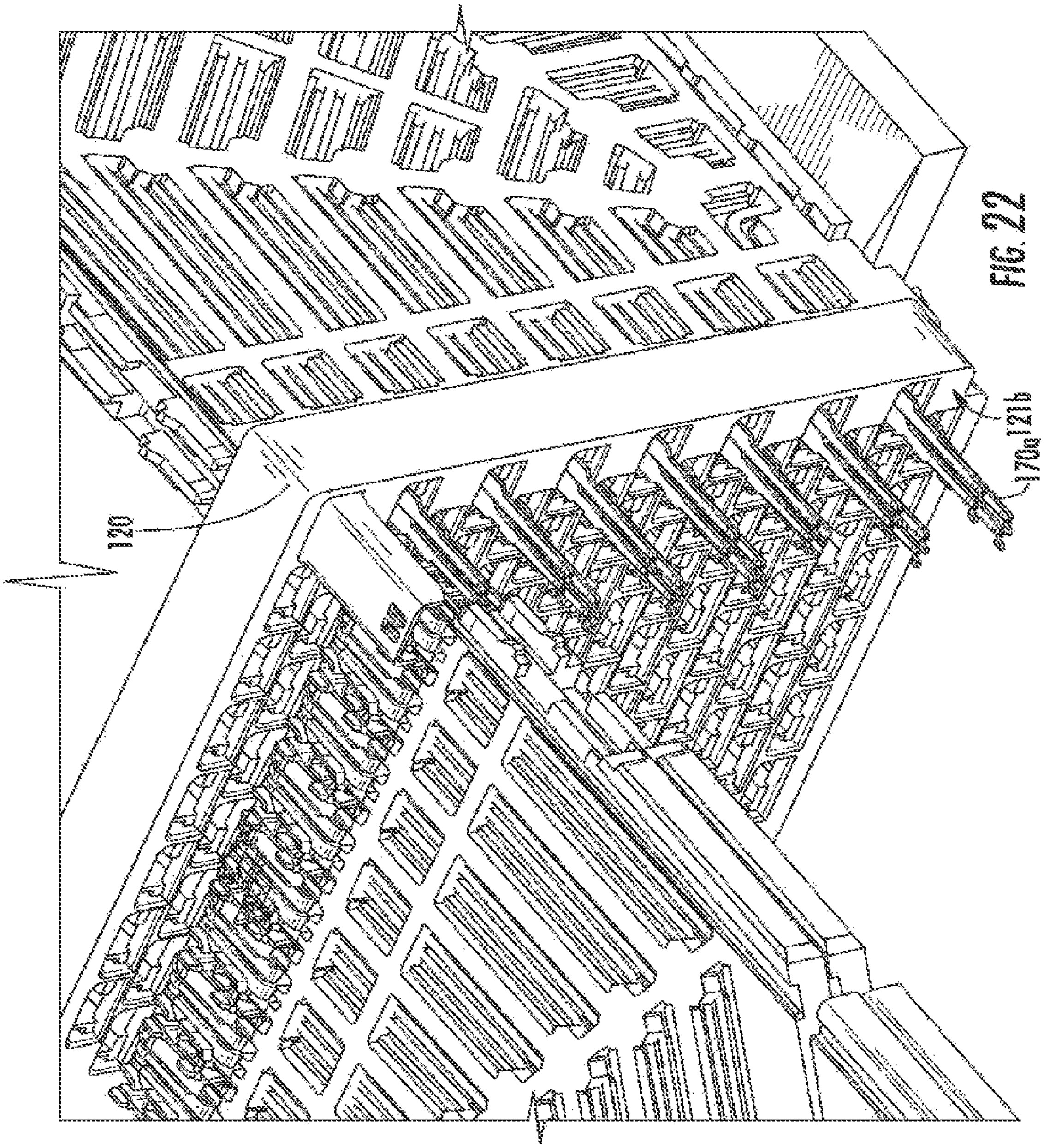
FIG. 22 illustrates a simplified perspective view of an assembly of connector system.
Figure 23:
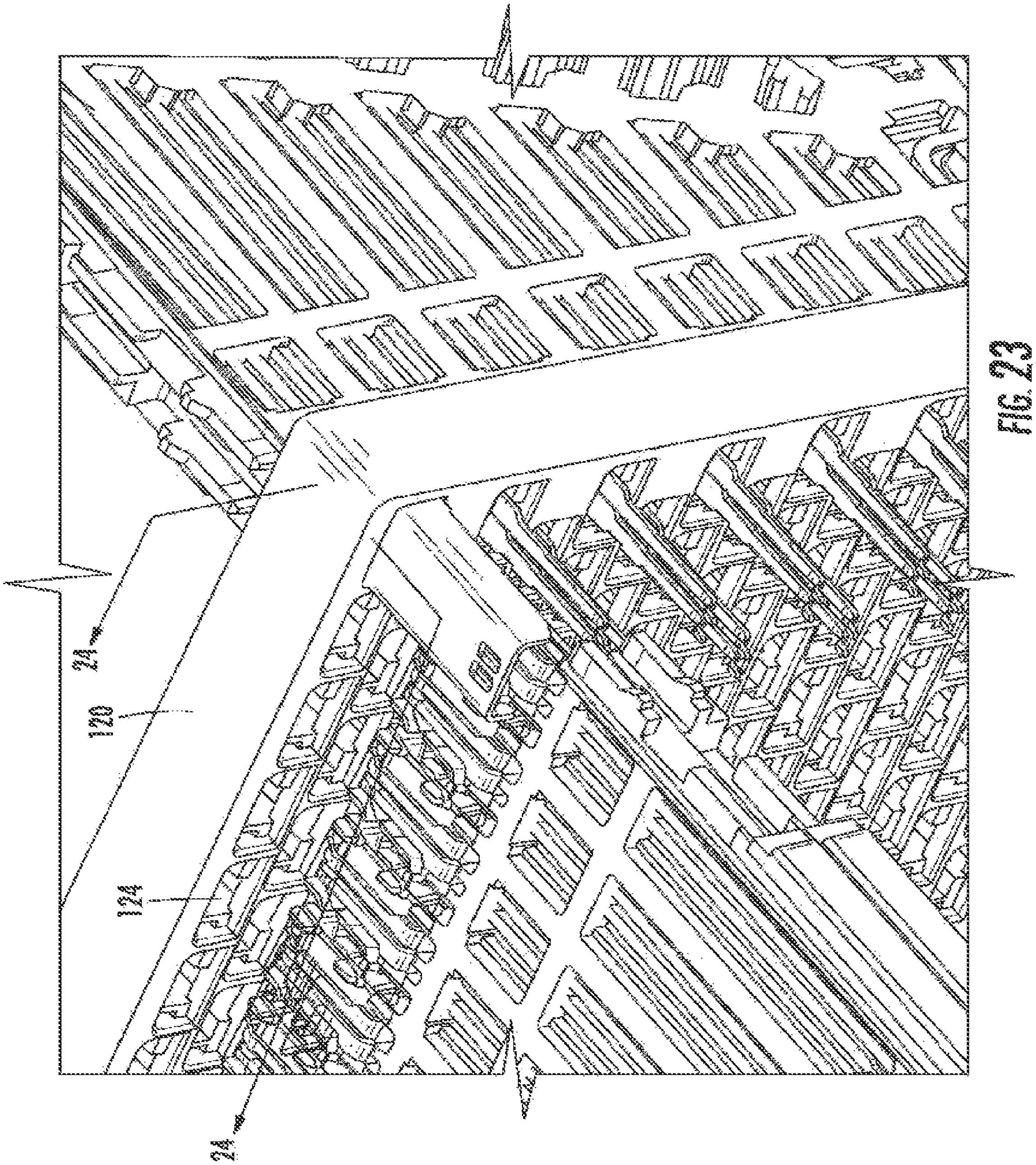
FIG. 23 illustrates an enlarged perspective view of the embodiment depicted in FIG. 22.
Figure 24:
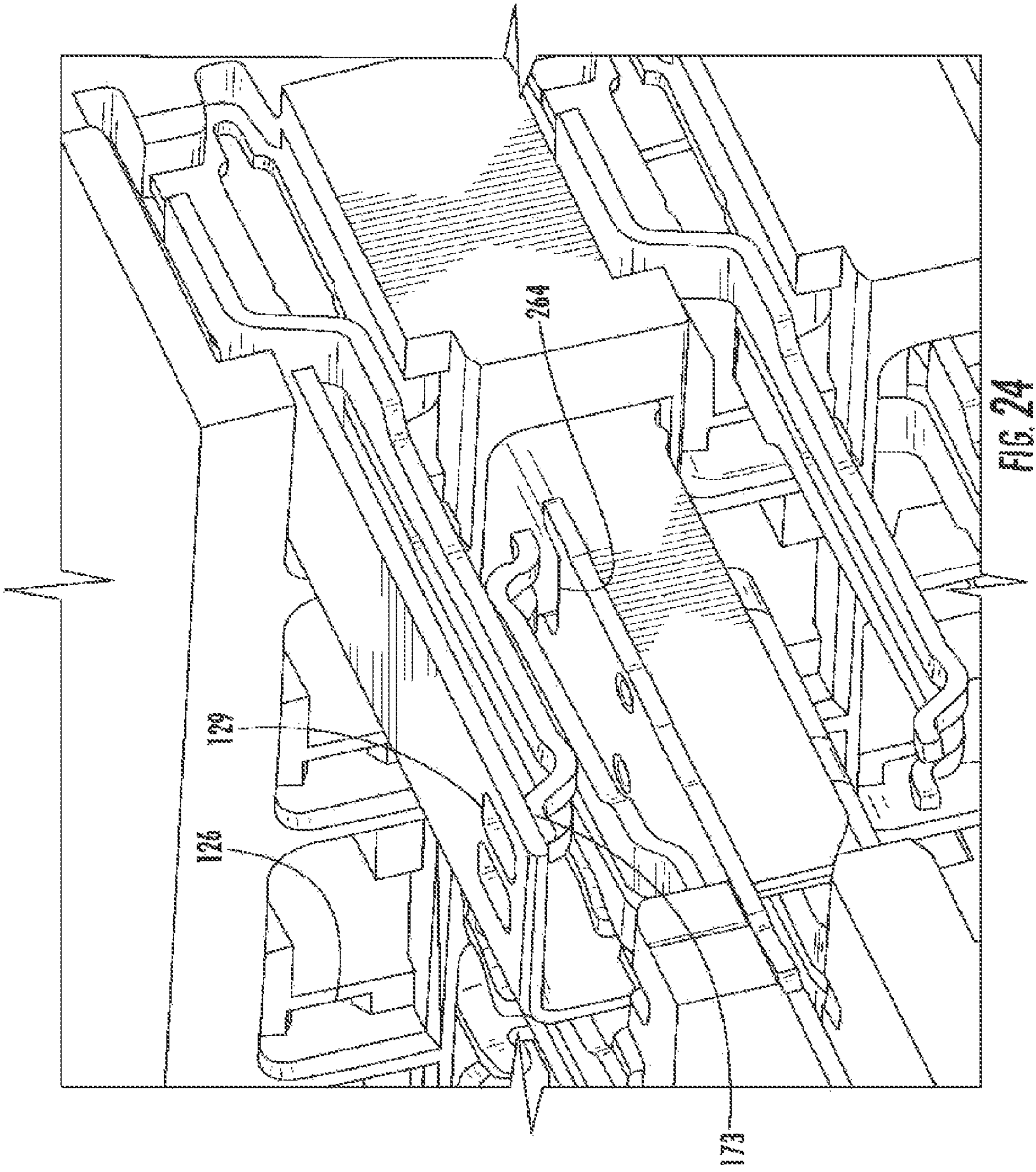
FIG. 24 illustrates a perspective view of a cross section taken along line 24-24 in FIG. 23.
Figure 25:
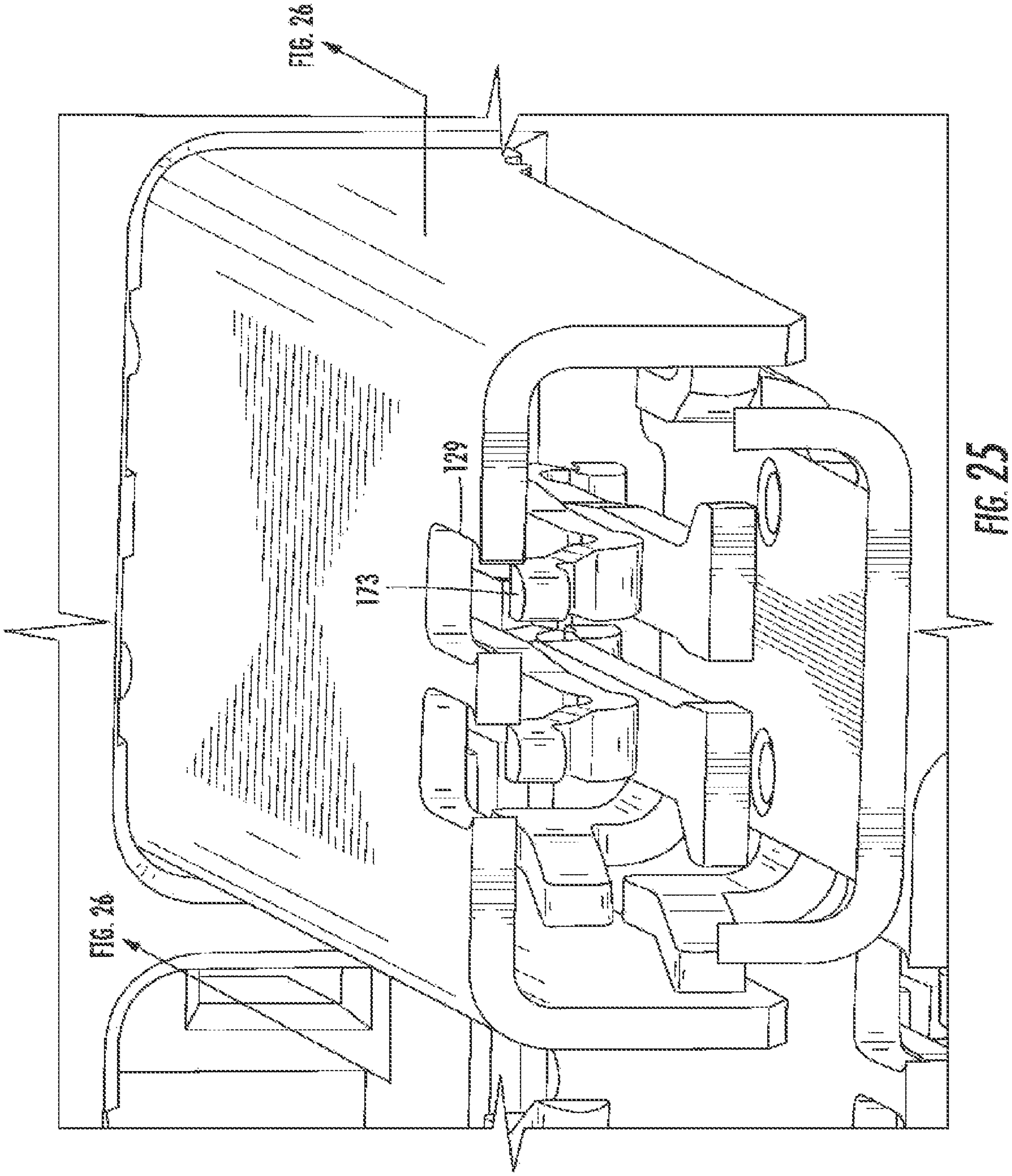
FIG. 25 illustrates a perspective cross-sectional view taken along line 25-25 in FIG. 13.
Figure 26:
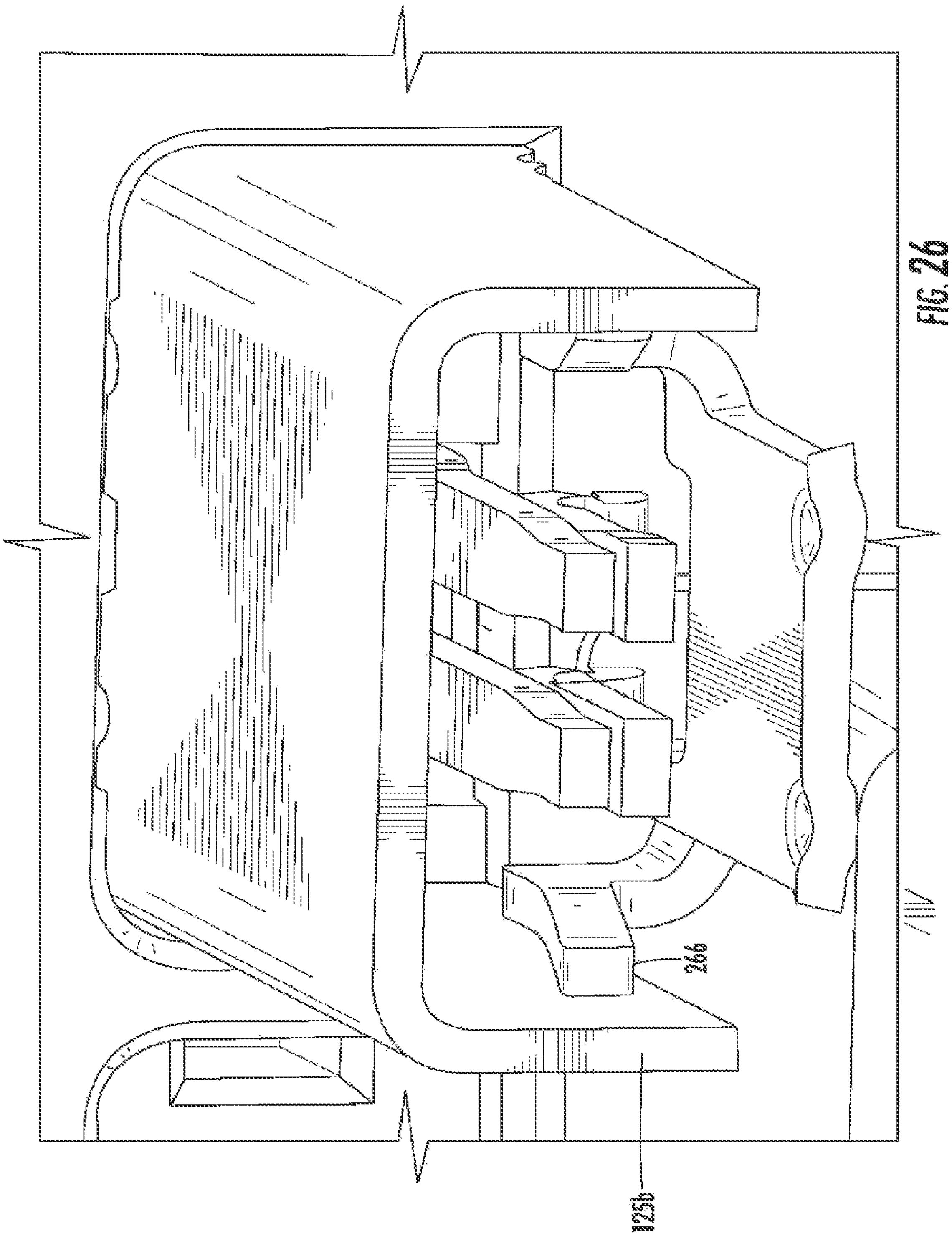
FIG. 26 illustrates a perspective cross-sectional view taken along line 25-25 in FIG. 25.
Figure 27:
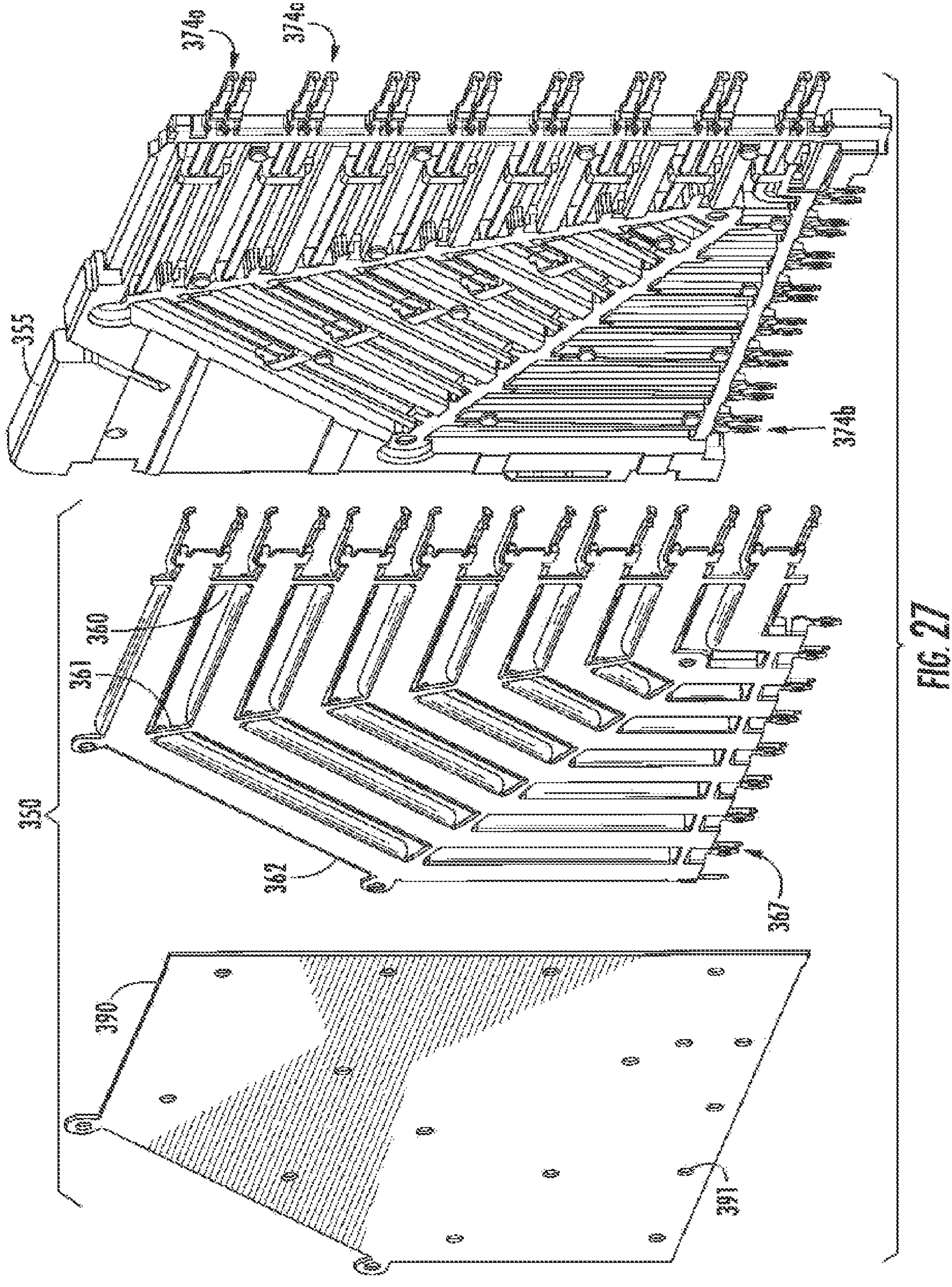
FIG. 27 illustrates a partially exploded perspective view of an embodiment of a wafer.
Figure 28:
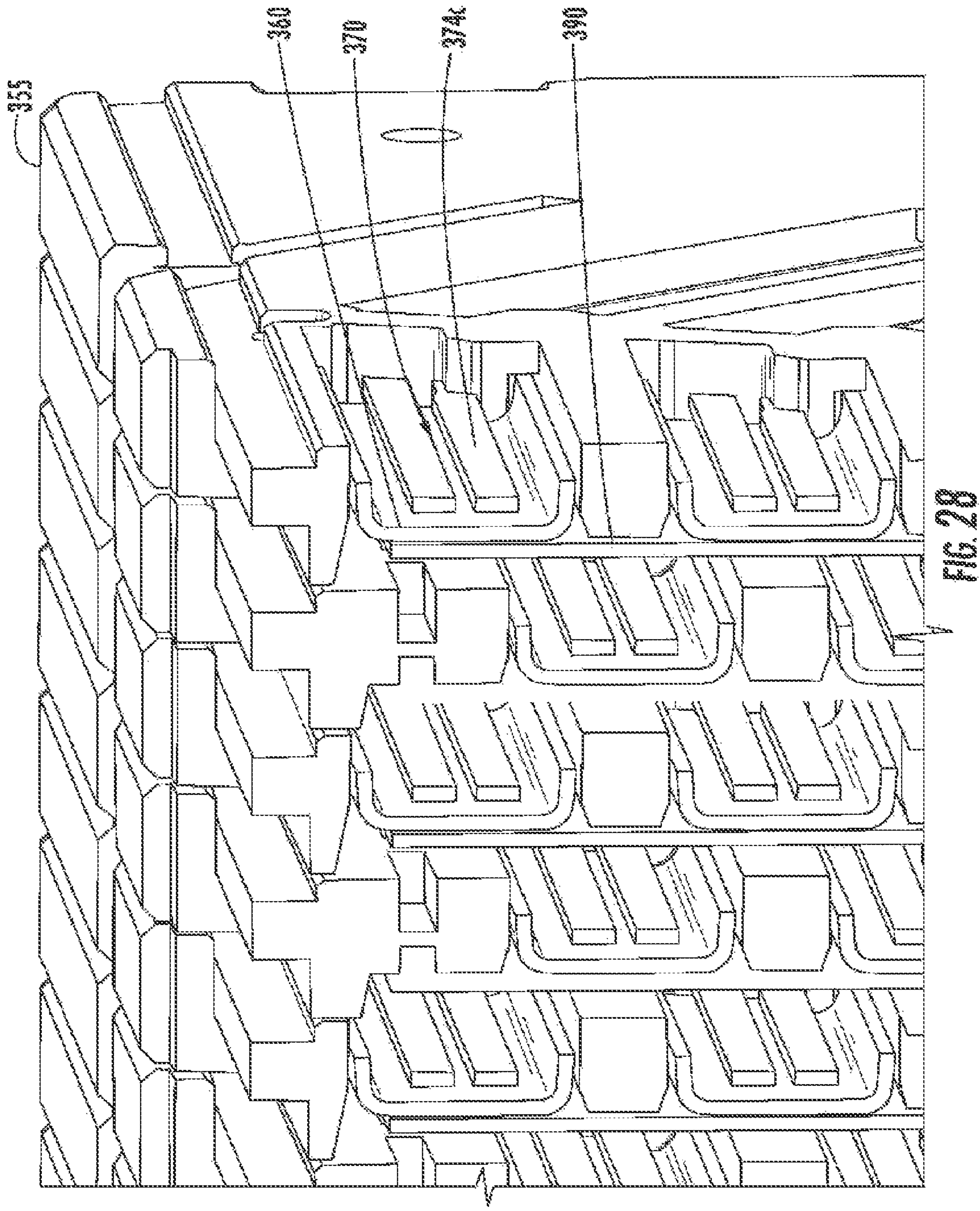
FIG. 28 illustrates a perspective cross-sectional view of an embodiment of a connector formed from wafers similar to the wafer depicted in FIG. 27.
Figure 29:
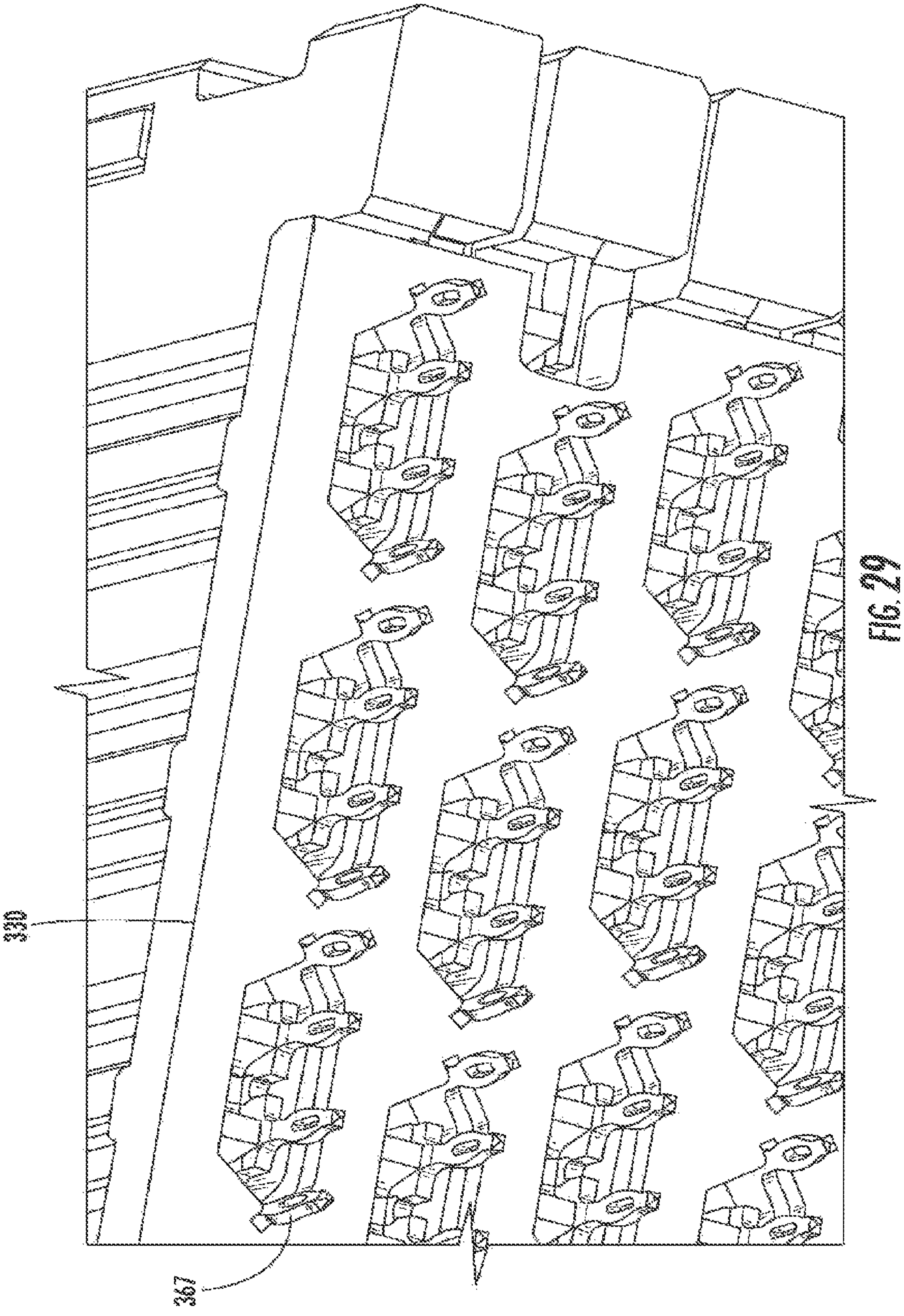
FIG. 29 illustrates a perspective view of an embodiment of a connector with a ground shield having angled tails.
Figure 30:
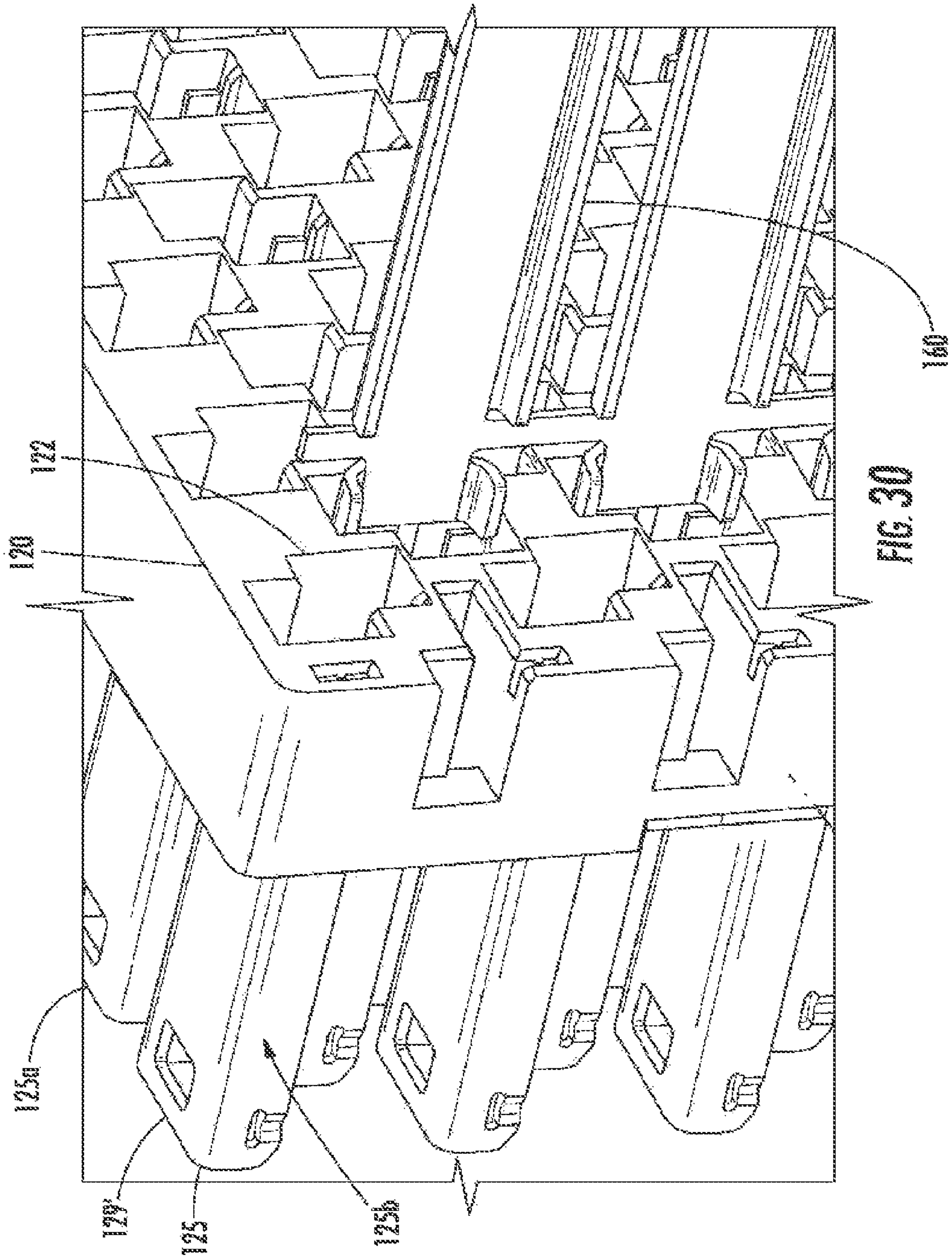
FIG. 30 illustrates a partially exploded and simplified perspective view of an embodiment of a wafer.

As depicted, the mating interface includes a double deflecting contact so that the signal terminals of the first connector 100 and second connector 200 both have a stub 173, 273 (as can be appreciated from FIG. 20). While such a configuration is beneficial for electrical performance, alternative configurations that have configurations with a single deflecting contact (and corresponding stub) are also contemplated. When using a double contact configuration, such as is depicted, for a portion of the mating interface there is a dual signal path region 199 and the dual signal path region 199 is protected by the U-shield 125. The U-shield 125 can include one or more notches 129 to help provide clearance for terminal stubs 173.

As noted above, the U-channel 162 uses the end 163 to connect the U-shield 125 via a conductive element 123 provided in the insert 120 (or shroud 110). The conductive element 123 can be a separate terminal supported by the insert 120 (in an embodiment it can be insert molded into the insert 120) or it can be a conductive plating formed on the insert 120 using additive manufacturing techniques. Thus, any desirable method of forming the conductive element 123 is suitable. The conductive element 123 can directly contact the U-shield 125 and thus electrical continuity between the ground shield 160 and the U-shield 125 is ensured.

The ground shield 260 is configured to make electrical contact with the U-shield 125. Fingers 266 are provided to engage the U-shield 125, for instance, on opposing sides walls 125*b* of the U-shield 125 so that a reliable electrical connection can be formed. If desired, multiple contact points on each side wall 125*b* can be provided. The ground shield 260 can also include a cutout 264 to provide space for the stubs 273. To provide improved electrical performance, the U-channel 262 can have an end 269 that extends past a front edge 125*a* of the ground shield 125 so that there is a partial overlap between the U-shield 125 and the U-channel 262.

As can be appreciated from FIGS. 27-48, alternative and optional features can be used to provide variations on the connector and connector system depicted in FIGS. 1-26.

Specifically, a wafer 350 (which can replace wafer 250) can include a frame 355 that supports terminal pairs 370 formed of signal terminal 372*a* and signal terminal 372*b*. The signal terminals will each include a contact 374*a*, a tail 374*b*, and a body 374*a* extending therebetween. The wafer 350 includes a ground shield 360 that has U-channels 362 that are commoned with the use of connection frames 361.

It turns out that a secondary shield 390 can be added to the wafer 350 to provide an improvement in crosstalk and can be press directly against the ground shield 360. While the use of the secondary shield 390 does not provide significant improvements in shielding as the ground shield 160 already provides excellent shielding, it has been determined that the secondary shield 390 can reduce resonances that might otherwise exist. In addition, the secondary shield 390 can be readily fastened to the frame 355 of the wafer with a projection 359 that can be formed by a staking operation in securing apertures 391, thus providing desirable stiffening to the wafer. The secondary shield 390 can be connected to the ground shield 360 with conventional techniques such as, but not limited to, soldering, welding and conductive adhesives, and can cover a majority of the ground shield 360.

The ground shield 360 can extend from tails 367 on the mounting face of the connector to contacts on the mating face of the connector. The tails 367 of the ground shield 360 can be arranged in a substantially linear manner with the tails 274*b* that for a corresponding terminal pair 270 and can positioned on two sides of a terminal pair 270 but with the ground tails 367 can be arranged at about a 45-degree angle compared to the signal tails to help provide improved electrical performance in the footprint while allowing for desirable routing of signal traces in the corresponding circuit board. A plated plastic frame 330 can help common the various ground shields 360 (which also act as reference grounds for the edge-coupled differential pairs of signal terminals).

Figure 31:
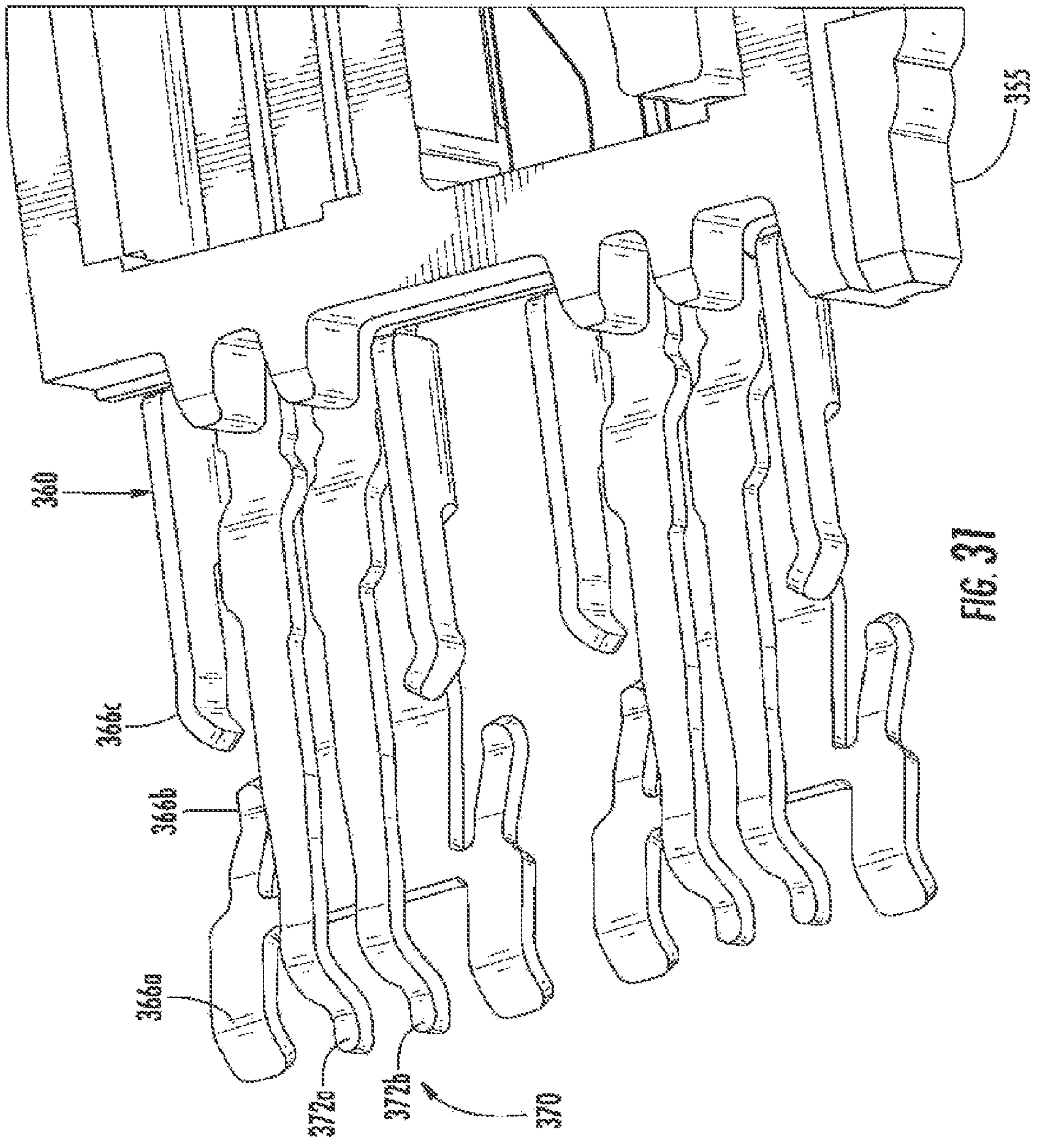
FIG. 31 illustrates a perspective simplified view of a portion of a wafer, depicting contacts.
Figure 32:
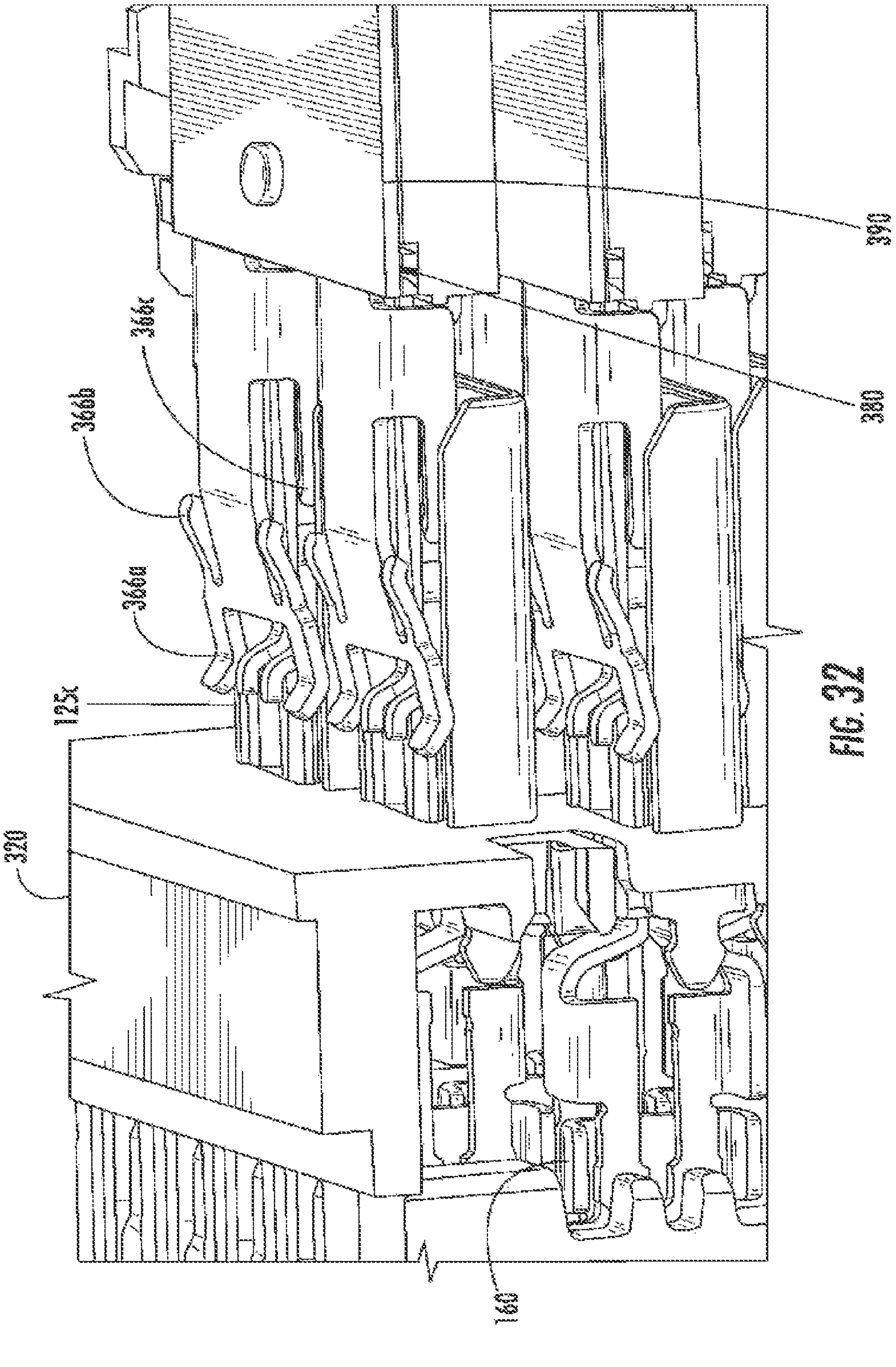
FIG. 32 illustrates a perspective cross-sectional view of a mating interface of an embodiment of a connector system that includes wafers with contacts as depicted in FIG. 31.
Figure 33:
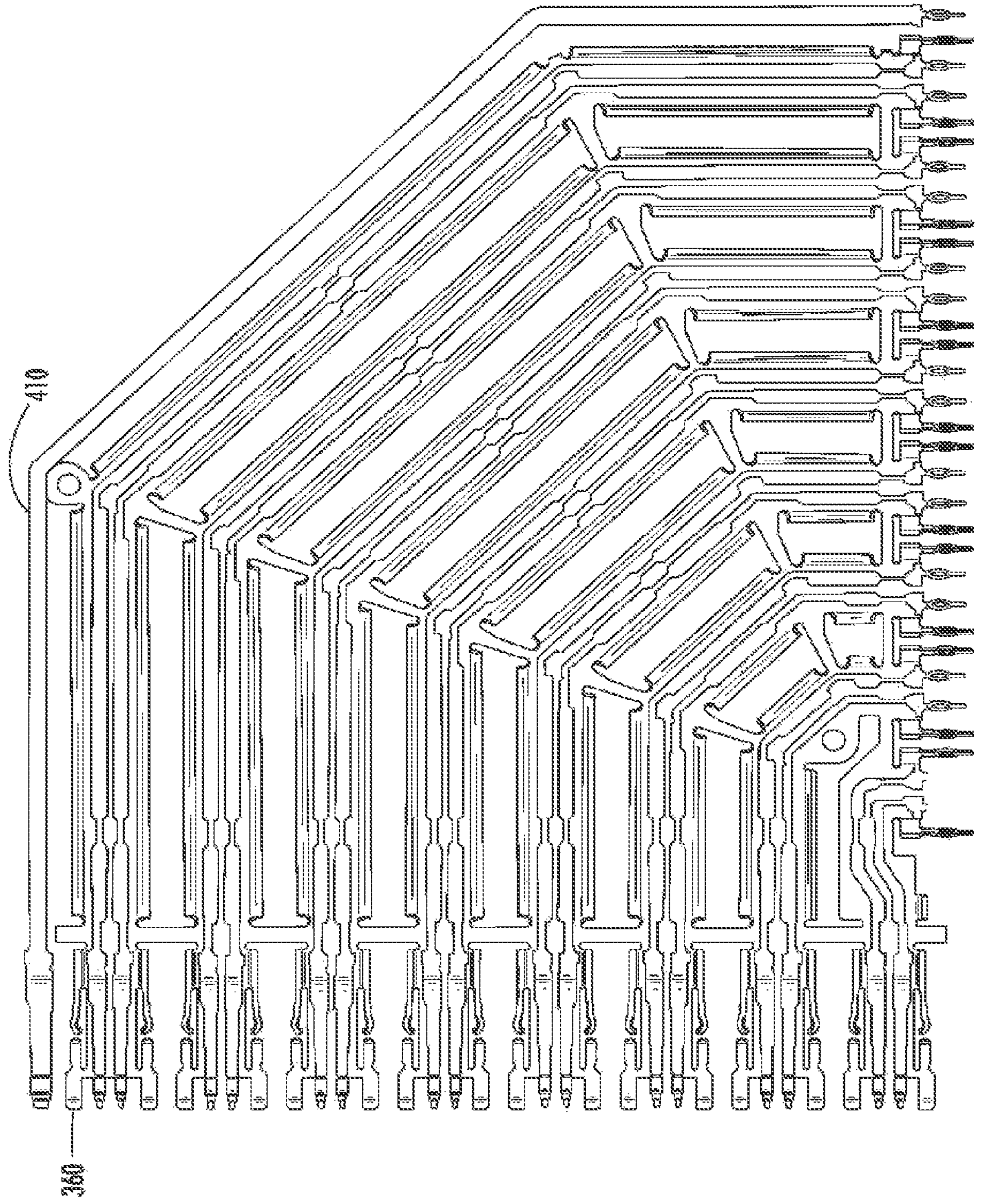
FIG. 33 illustrates a simplified elevated side view of an embodiment of a wafer.

As can be appreciated, the ground shield 360 has a plurality of fingers 366*a*, 366*b*, 366*c* that preferably extend in directions so that the fingers 366 are configured to mate with surfaces that that are opposite and/or in orthogonal directions to each other. Naturally, the angles may not be perfectly opposite or orthogonal depending on the corresponding U-shield configuration. In an embodiment as depicted in FIG. 31, the contacts 366*c* are configured to engage side walls 125*b* of a first U-shield while contacts 366*a* are configured to engage edges 125*c* of the first U-shield and contacts 366*b* are configured to engage the top wall(s) 125*a* of one or more different U-shields 125. While not required, having the fingers 366 of the ground shield 360 connect to multiple U-shields helps common the U-shields in the mating interface and provides improved electrical performance.

Figure 34:
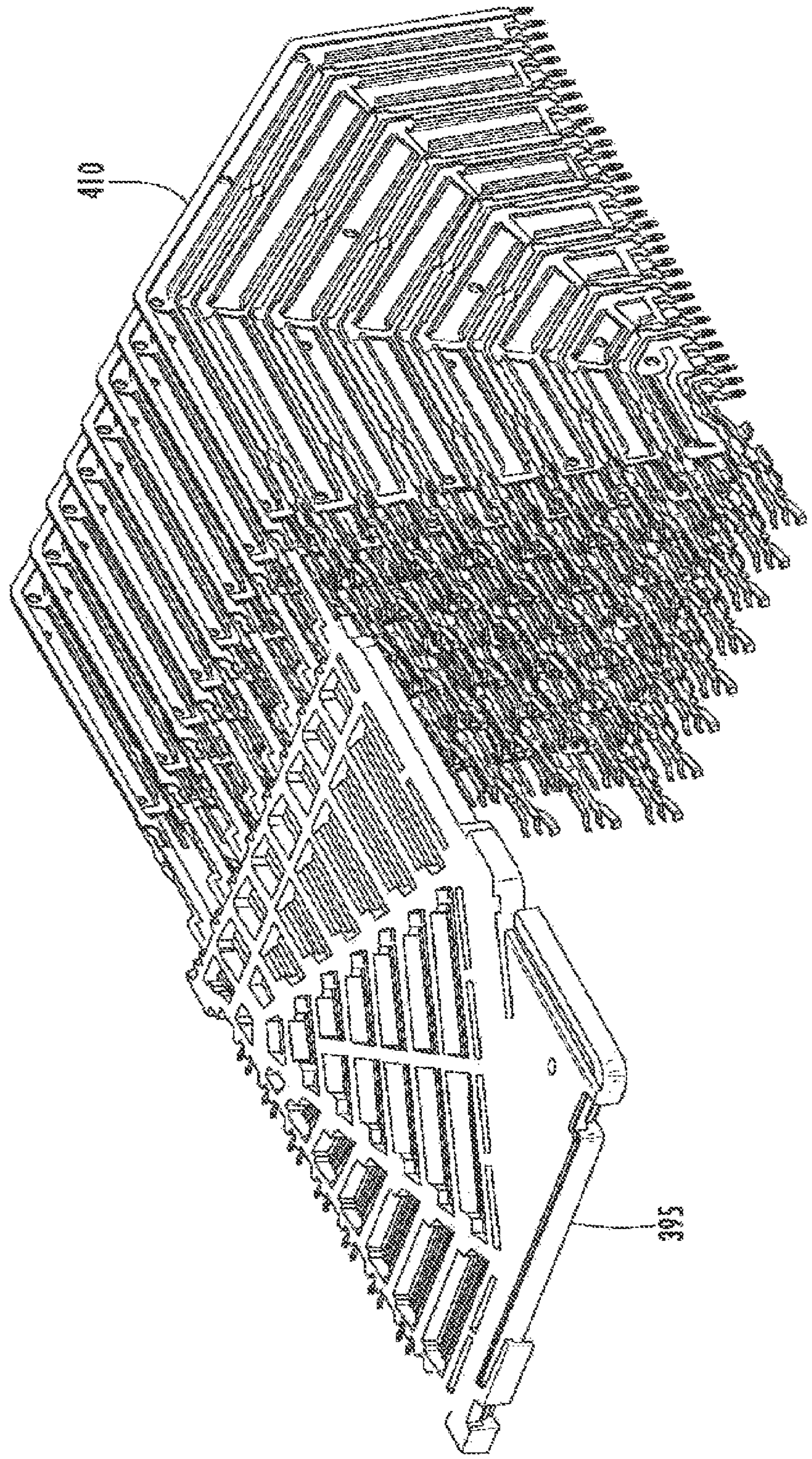
FIG. 34 illustrates a simplified perspective view of low-speed wafer engaging low speed terminals.
Figure 35:
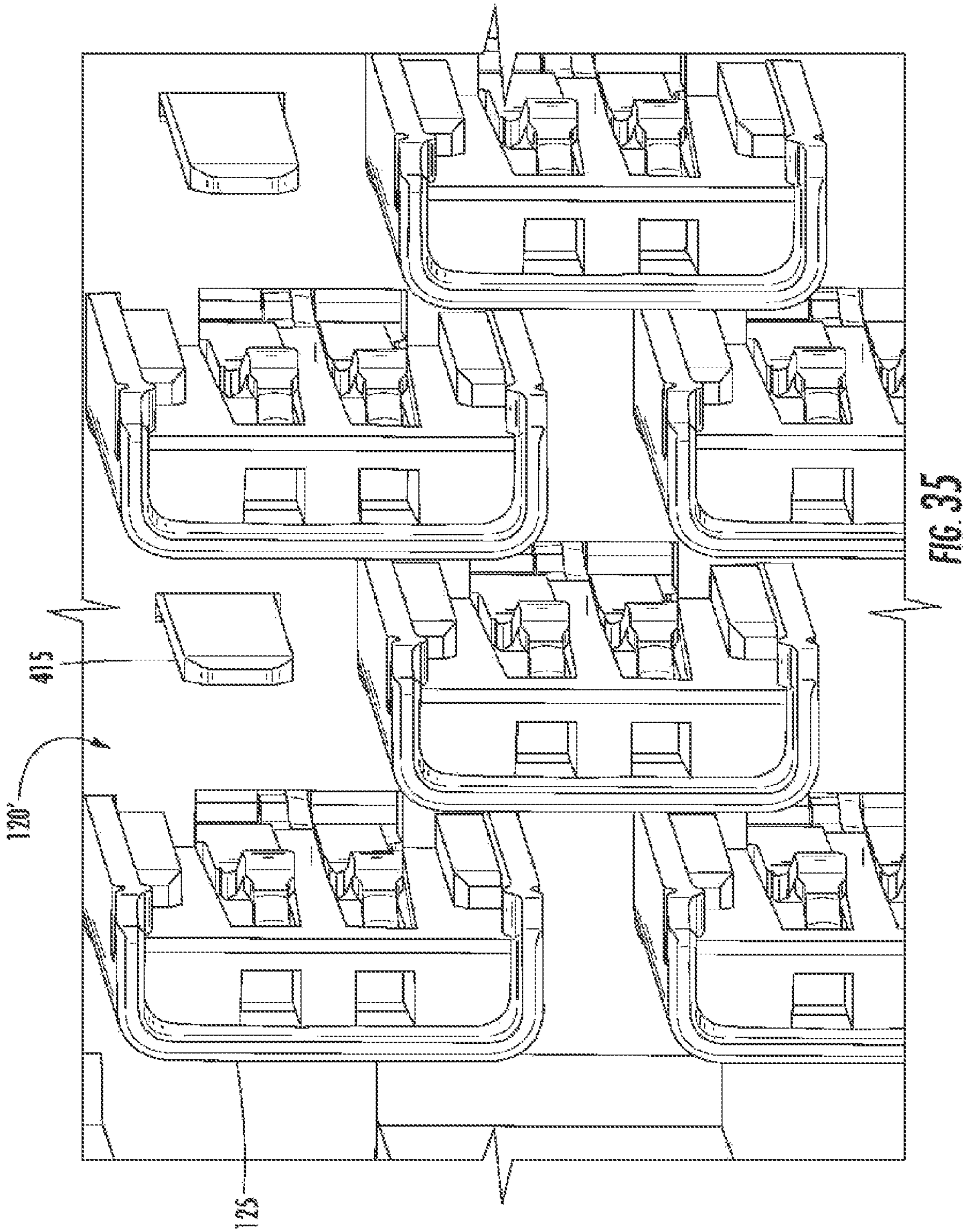
FIG. 35 illustrates a perspective view of a mating interface of an embodiment of a connector.
Figure 36:
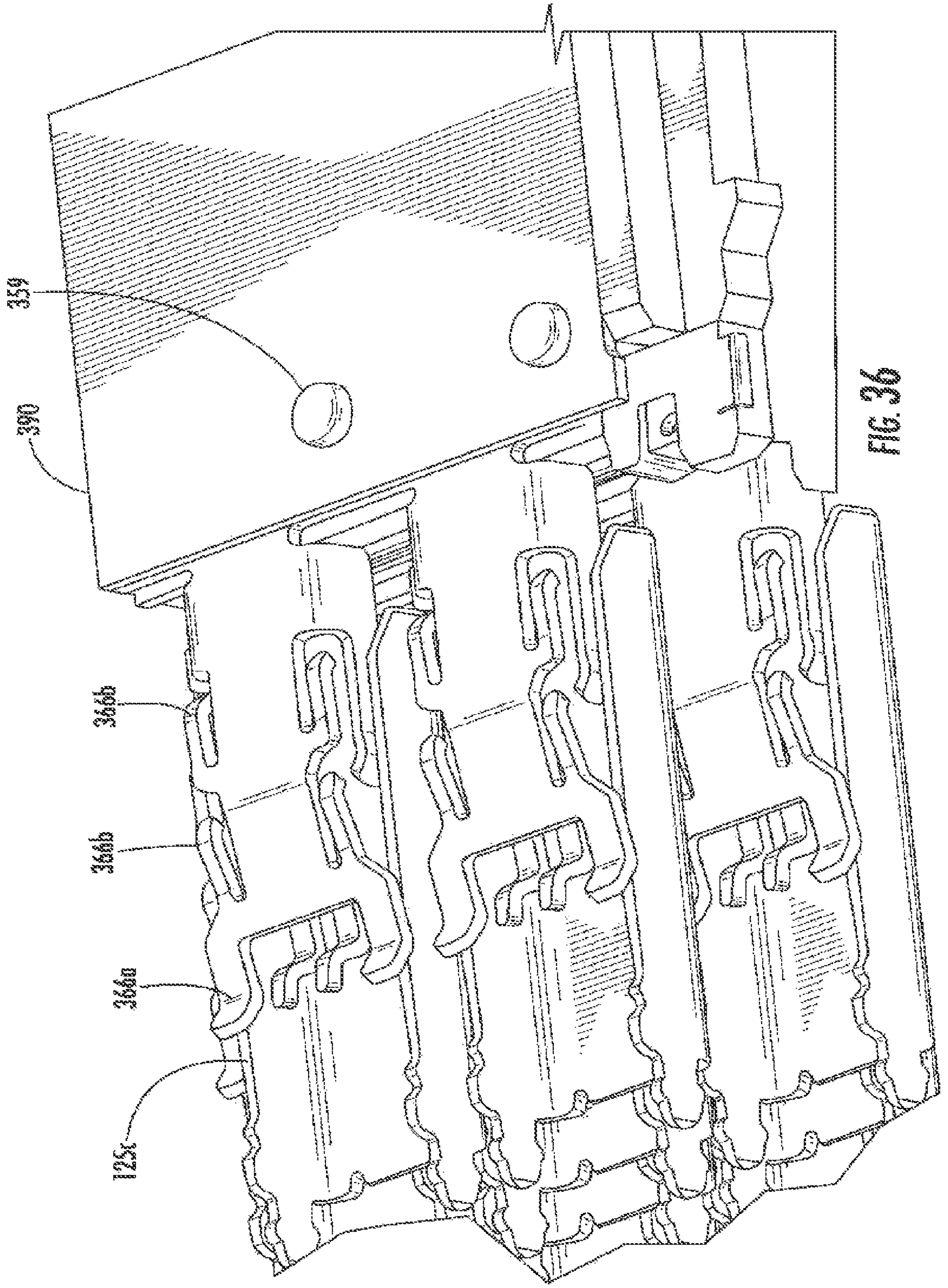
FIG. 36 illustrates a perspective view of an embodiment of a ground shield engaging a U-shield.
Figure 37:
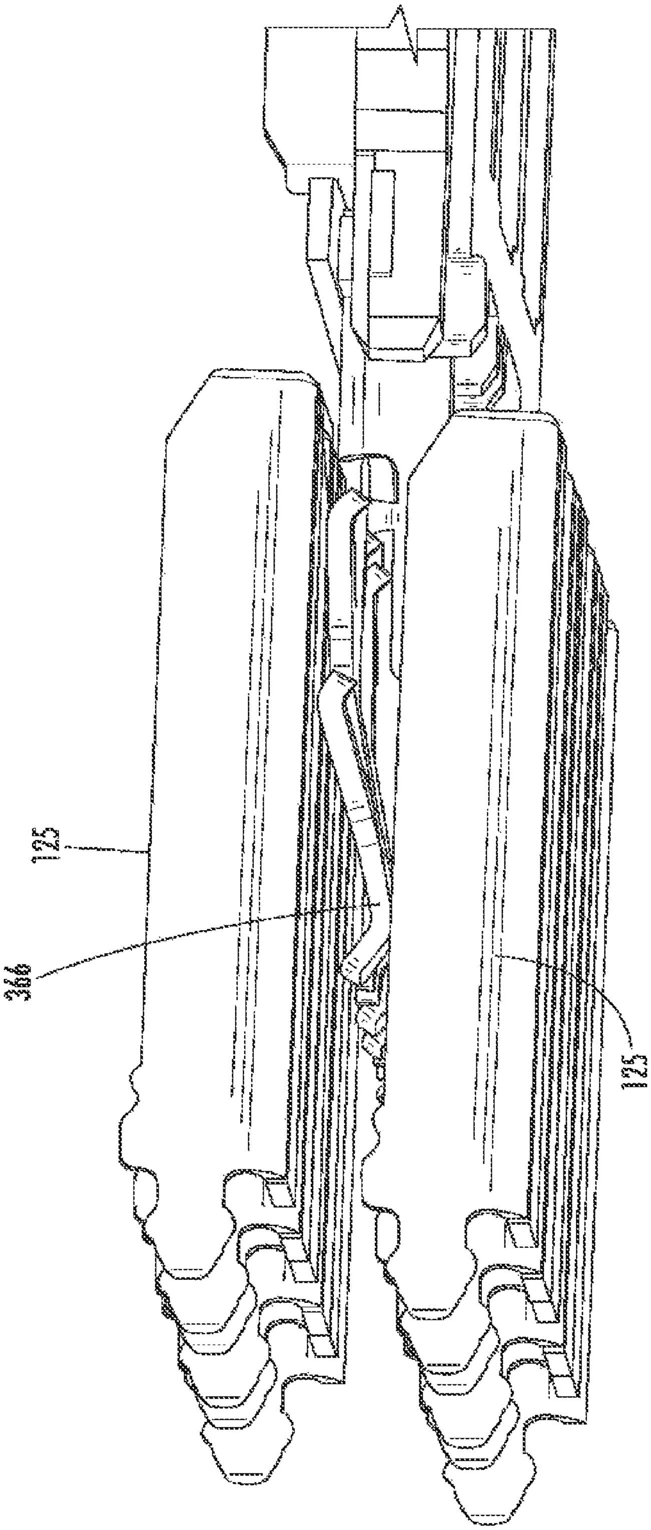
FIG. 37 illustrates a perspective simplified view of the embodiment depicted in FIG. 36.

Because of the offset stagger in the terminal pairs 370, every other signal wafer has some extra space at a top side of the connector (such as connector 100). In an embodiment the space may be filled with a single-ended terminal 410. The single-ended terminal 410 has a contact 415 and can use the ground shield 360 of an adjacent wafer as a reference ground and thus the depicted connector system provides a way to offer desirable electrical performance with the terminal pairs (which are intended to support up to 56 Gbps using NRZ encoding) and still provide single-ended terminals useful for low-speed signaling. One interesting feature of the depicted design, as can be appreciated by FIG. 34, is that a low-speed wafer 395 can be provided in the mating connector and the single-ended terminals 410 can use an edge-coupled terminal as the reference ground shield in the low-speed wafer. Thus, the system allows a single-ended communication link that goes from broad-side coupled to edge-coupled.

Figure 38:
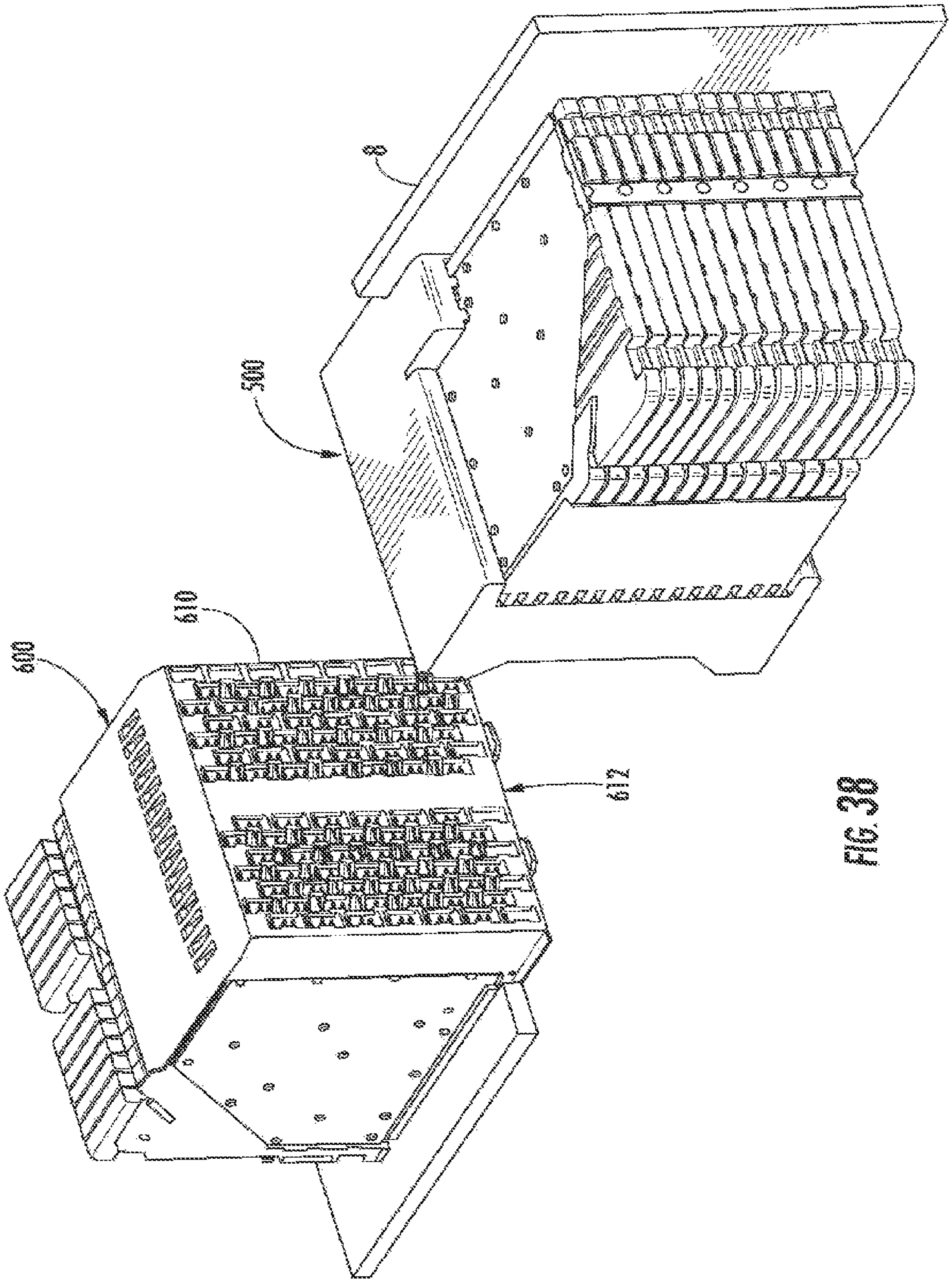
FIG. 38 illustrates a partially exploded perspective view of a connector system with separated transmit and receive signal terminals.
Figure 39:
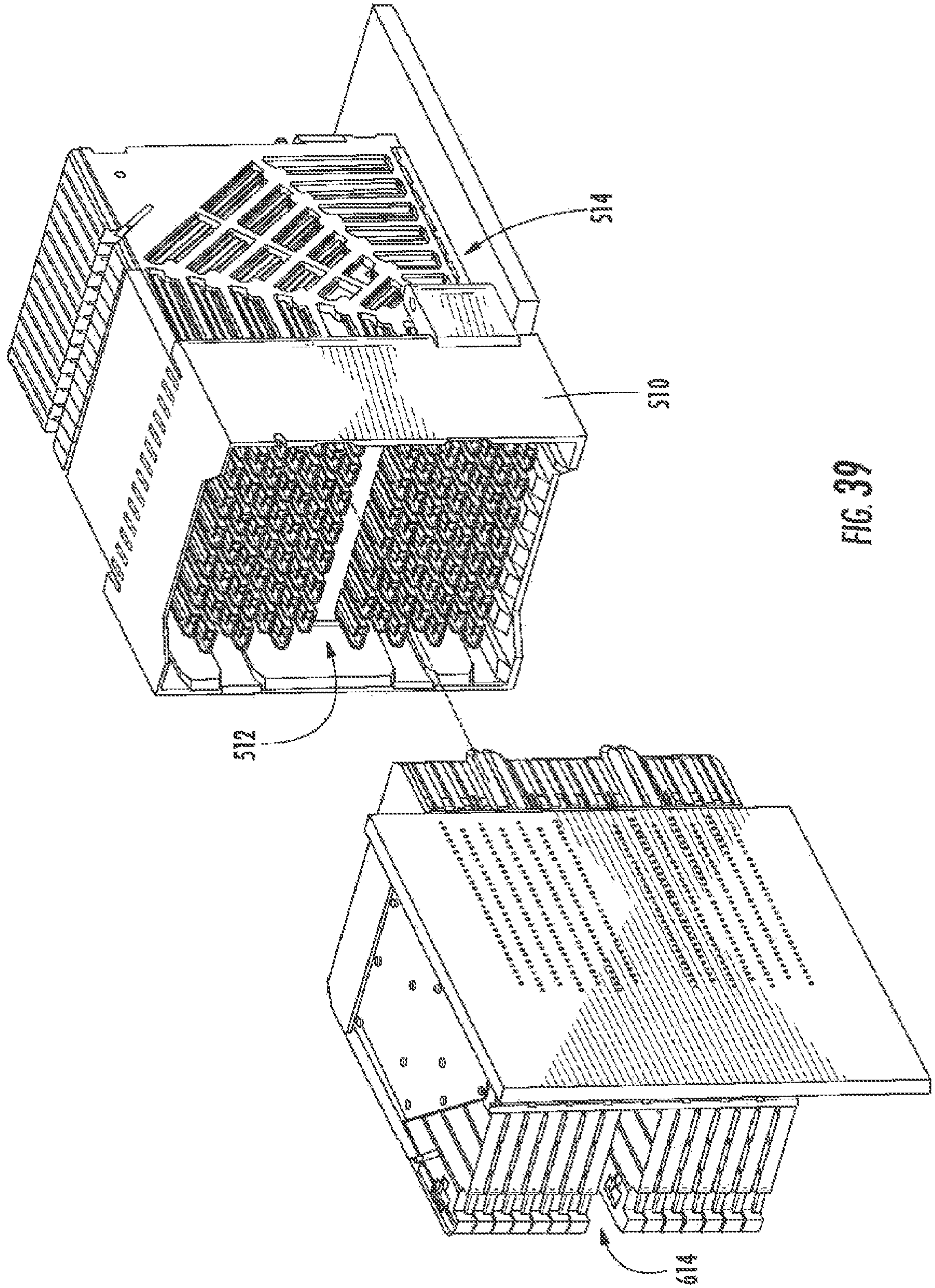
FIG. 39 illustrates another perspective view of the embodiment depicted in FIG. 38.
Figure 40:
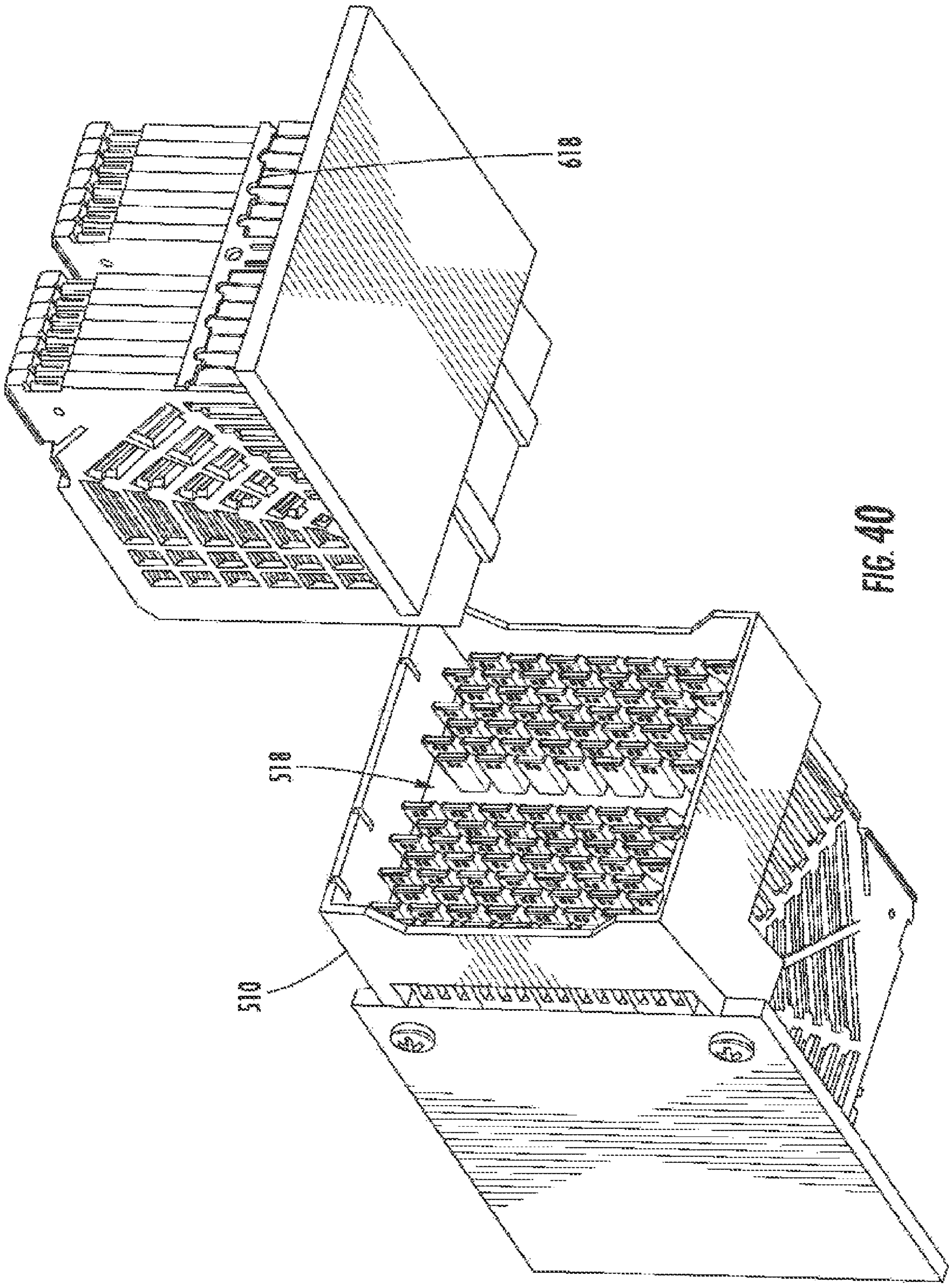
FIG. 40 illustrates another perspective view of the embodiment depicted in FIG. 38.
Figure 41:
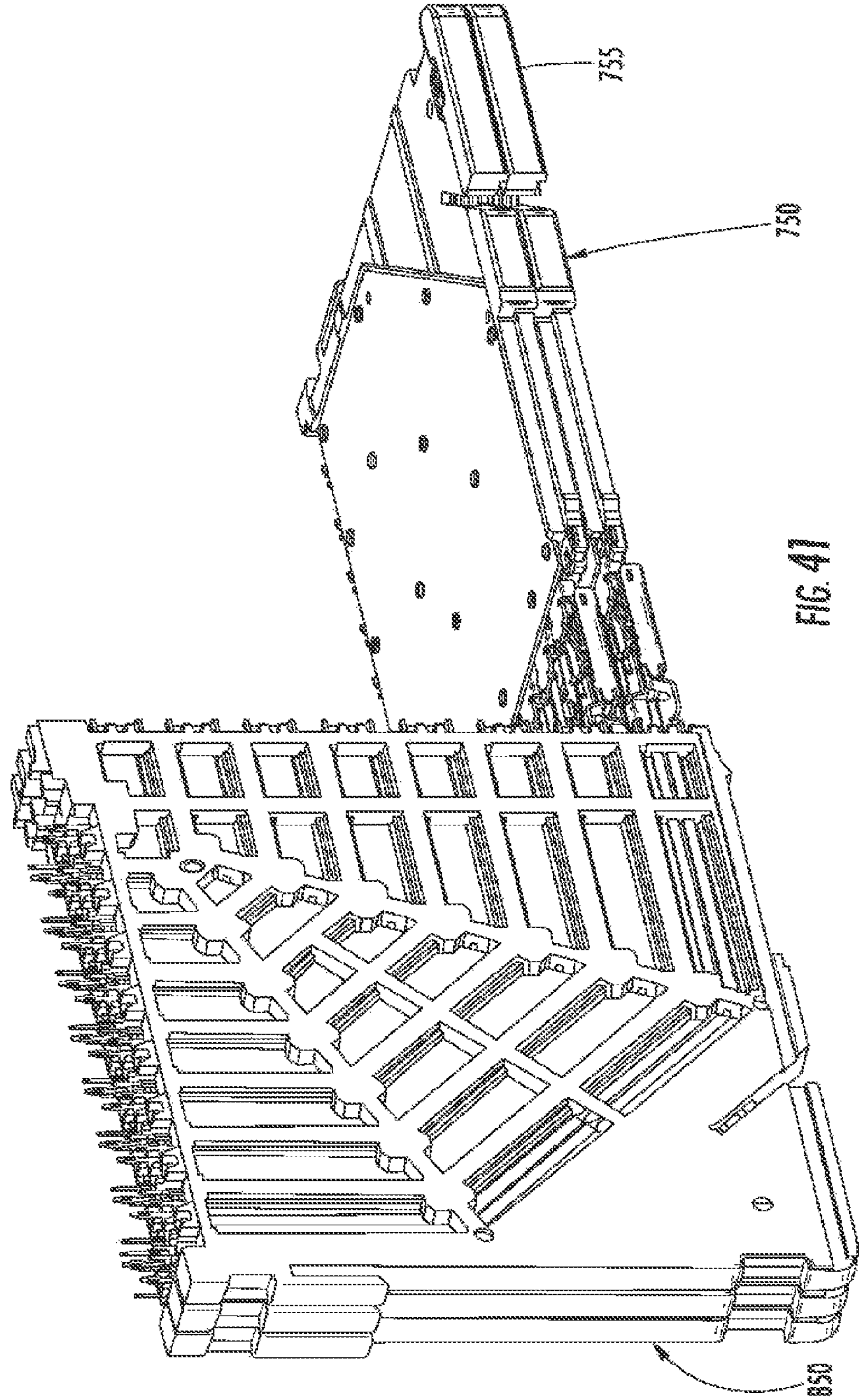
FIG. 41 illustrates a simplified perspective view of an embodiment of two wafers mated together.
Figure 42:
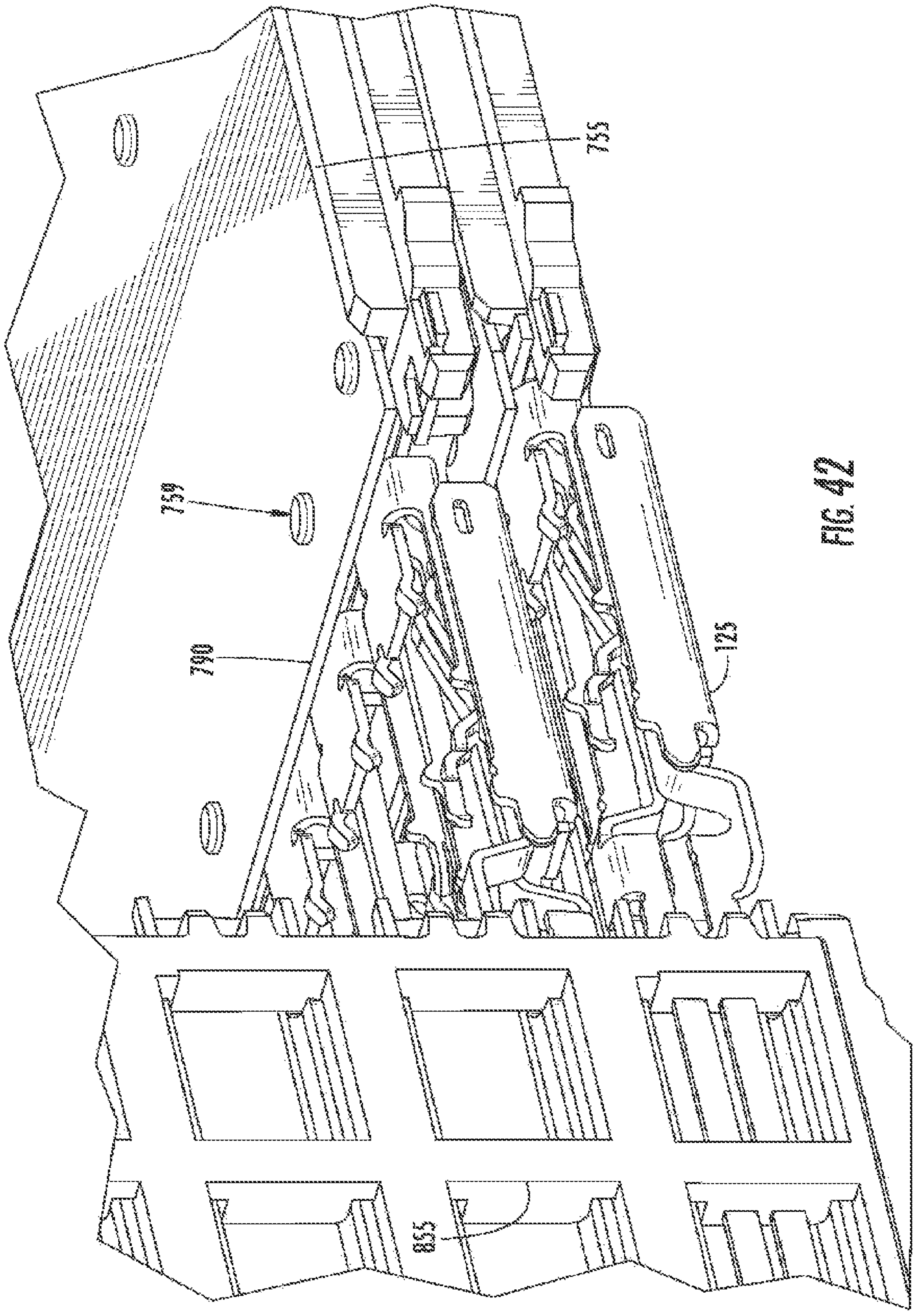
FIG. 42 illustrates an enlarged perspective view of the embodiment depicted in FIG. 41.
Figure 43:
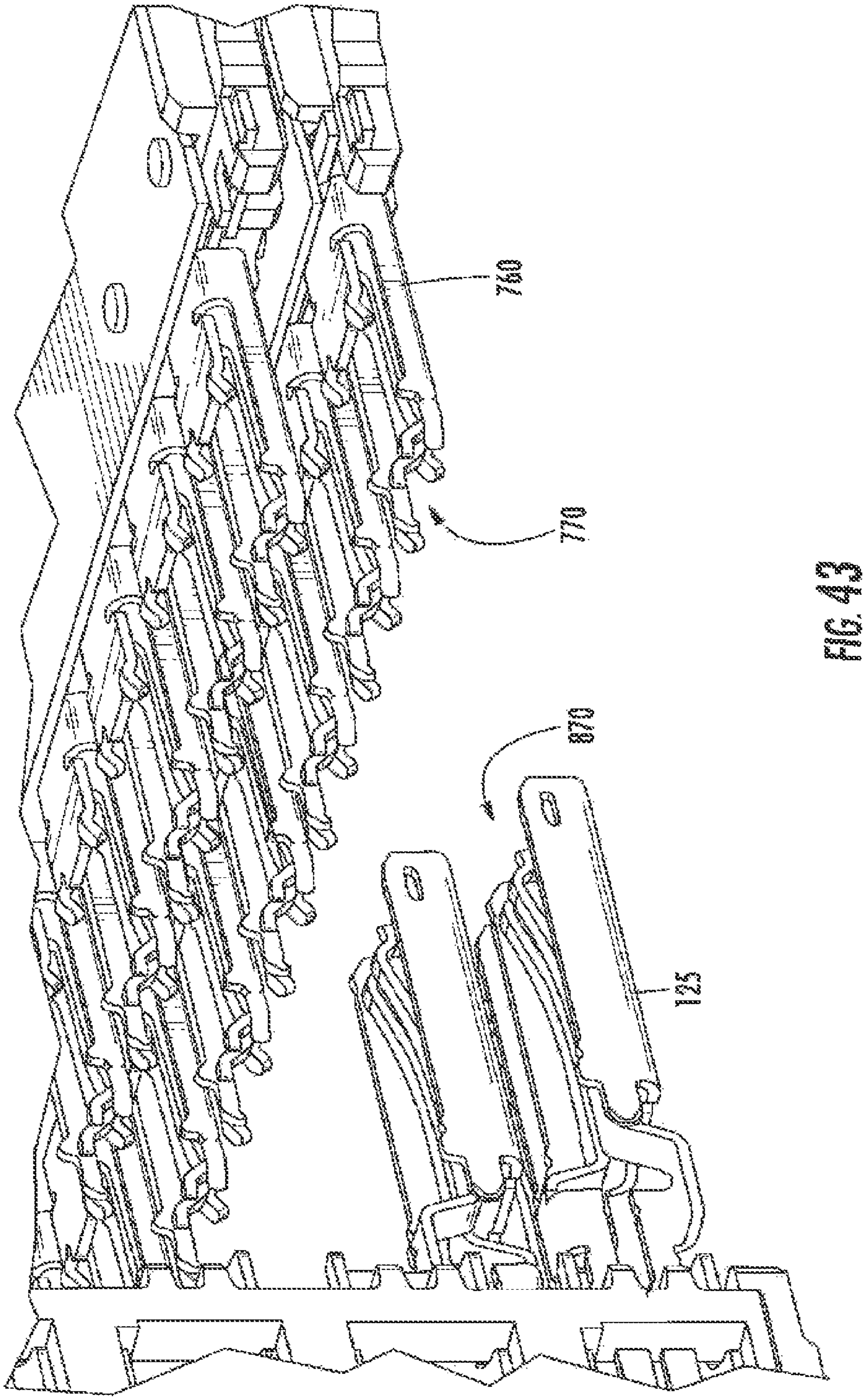
FIG. 43 illustrates a perspective view of the embodiment depicted in FIG. 41 with the wafers in an unmated configuration.
Figure 44:
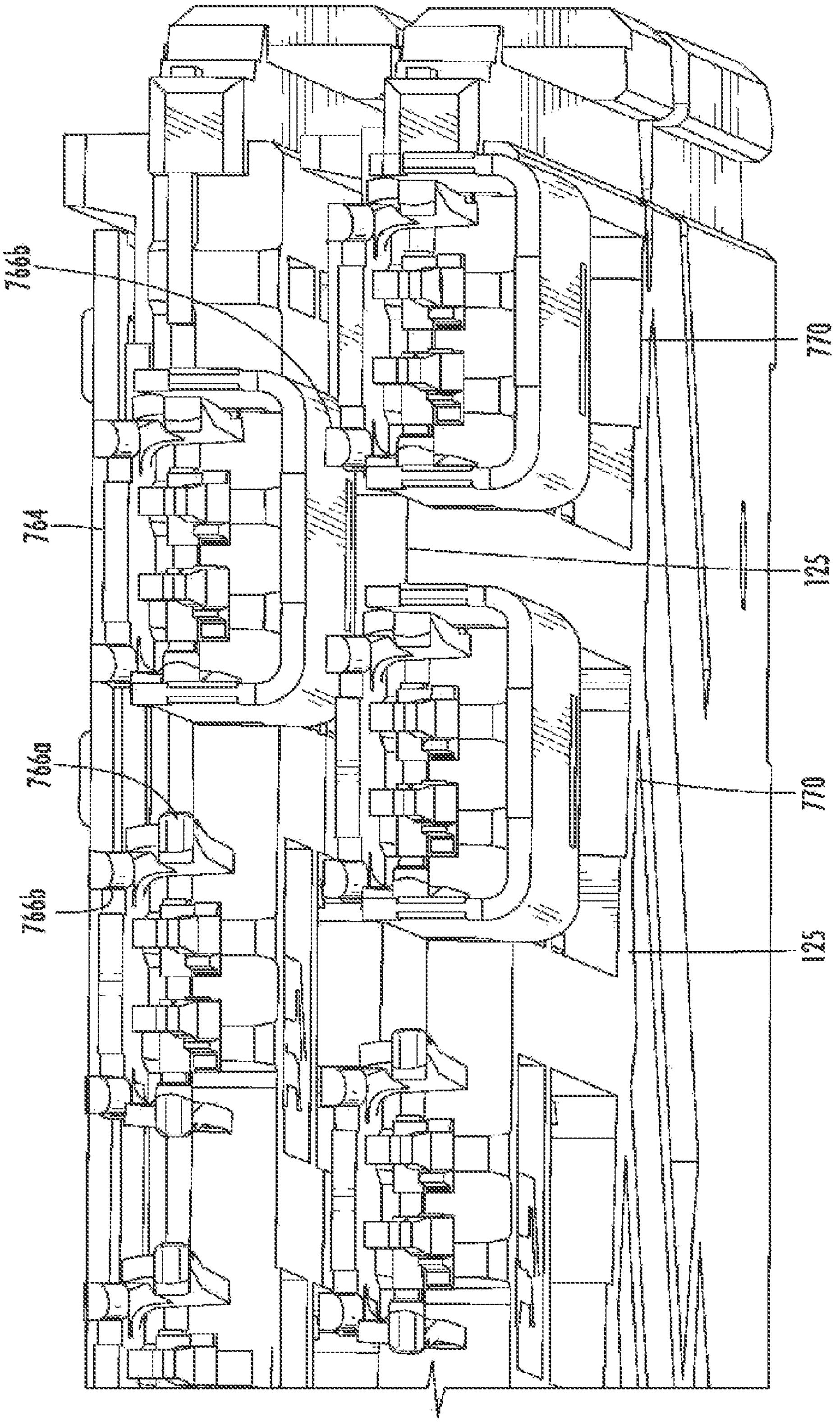
FIG. 44 illustrates a perspective view of an embodiment of two wafers positioned adjacent each other.
Figure 45:
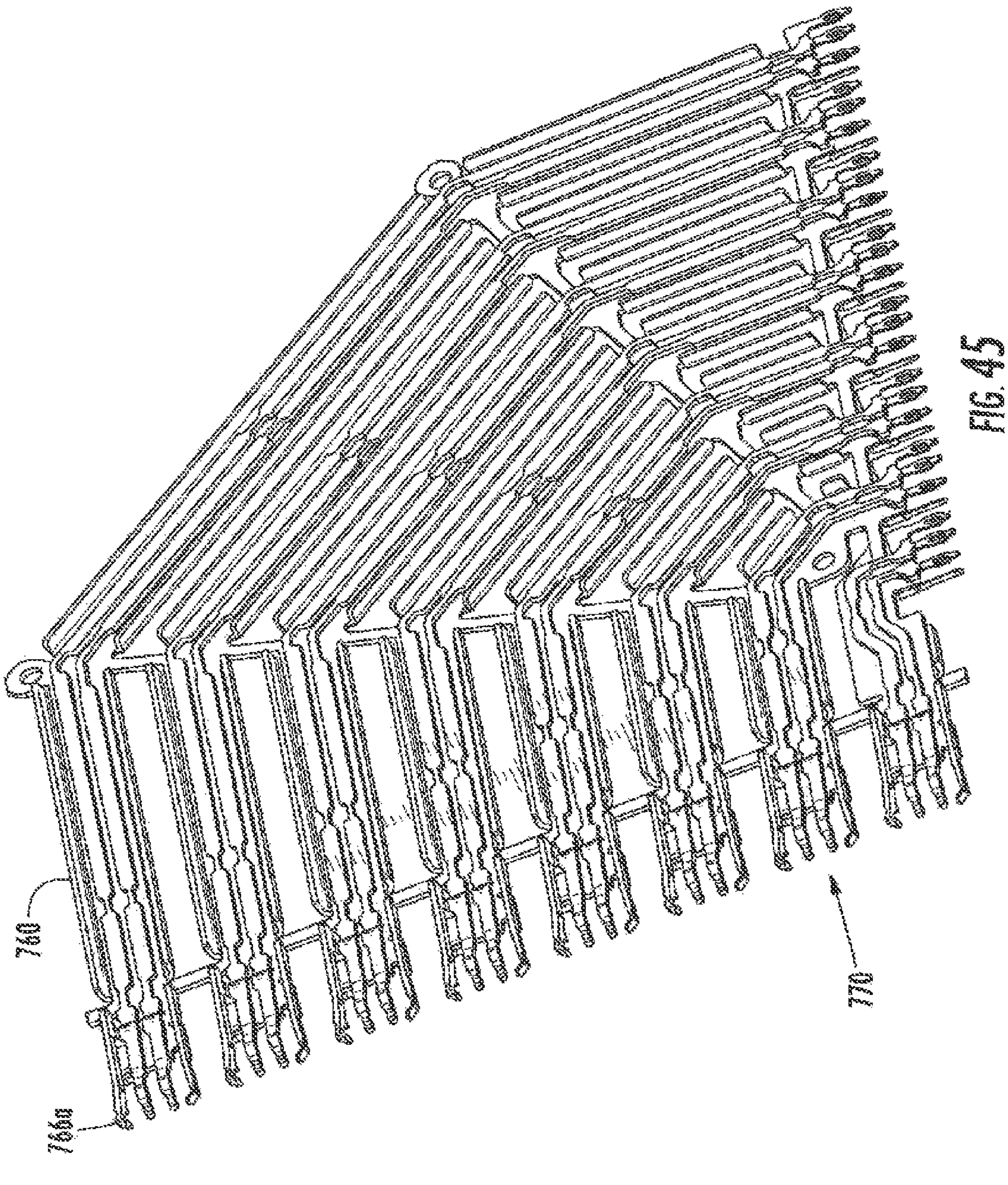
FIG. 45 illustrates a simplified perspective view of an embodiment of a wafer with the frame omitted for purposes of illustration.
Figure 46:
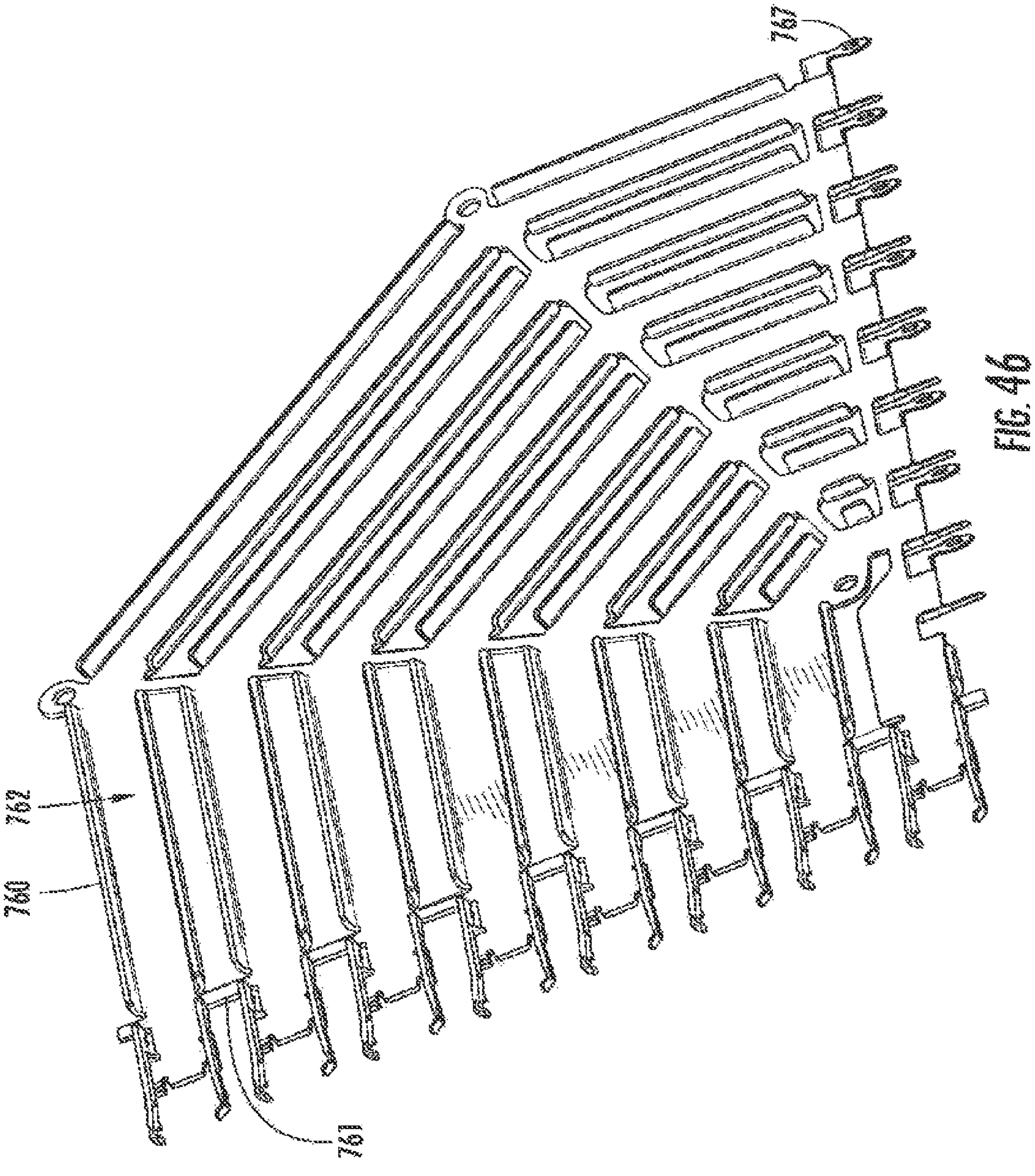
FIG. 46 illustrates a perspective view of the embodiment depicted in FIG. 45 with the signal terminals omitted for purposes of illustration.
Figure 47:
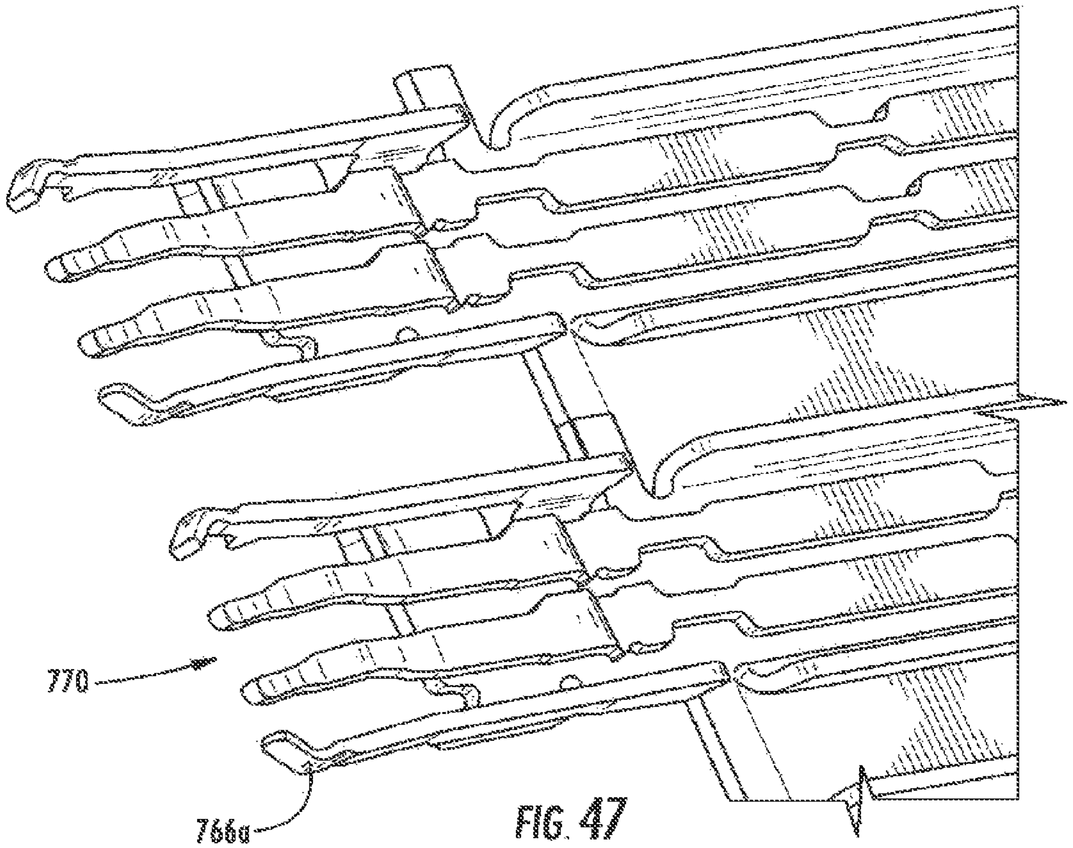
FIG. 47 illustrates an enlarged perspective view of the embodiment depicted in FIG. 45.
Figure 48:
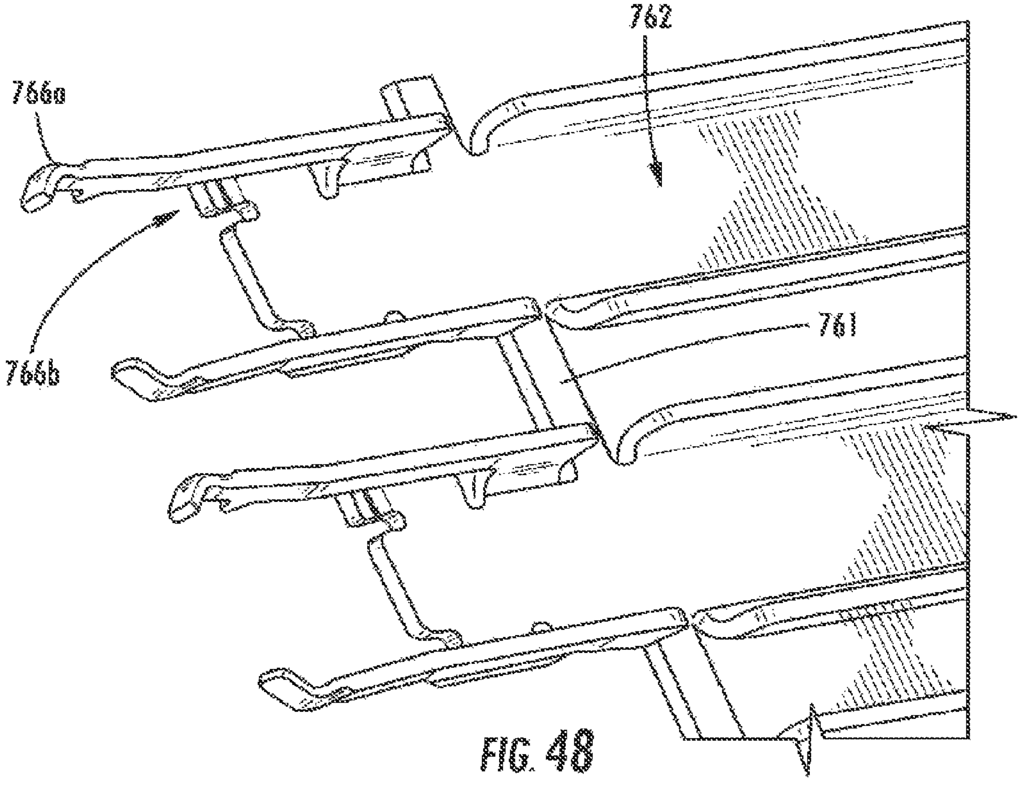
FIG. 48 illustrates an enlarged perspective view of the embodiment depicted in FIG. 46.
Figure 49:
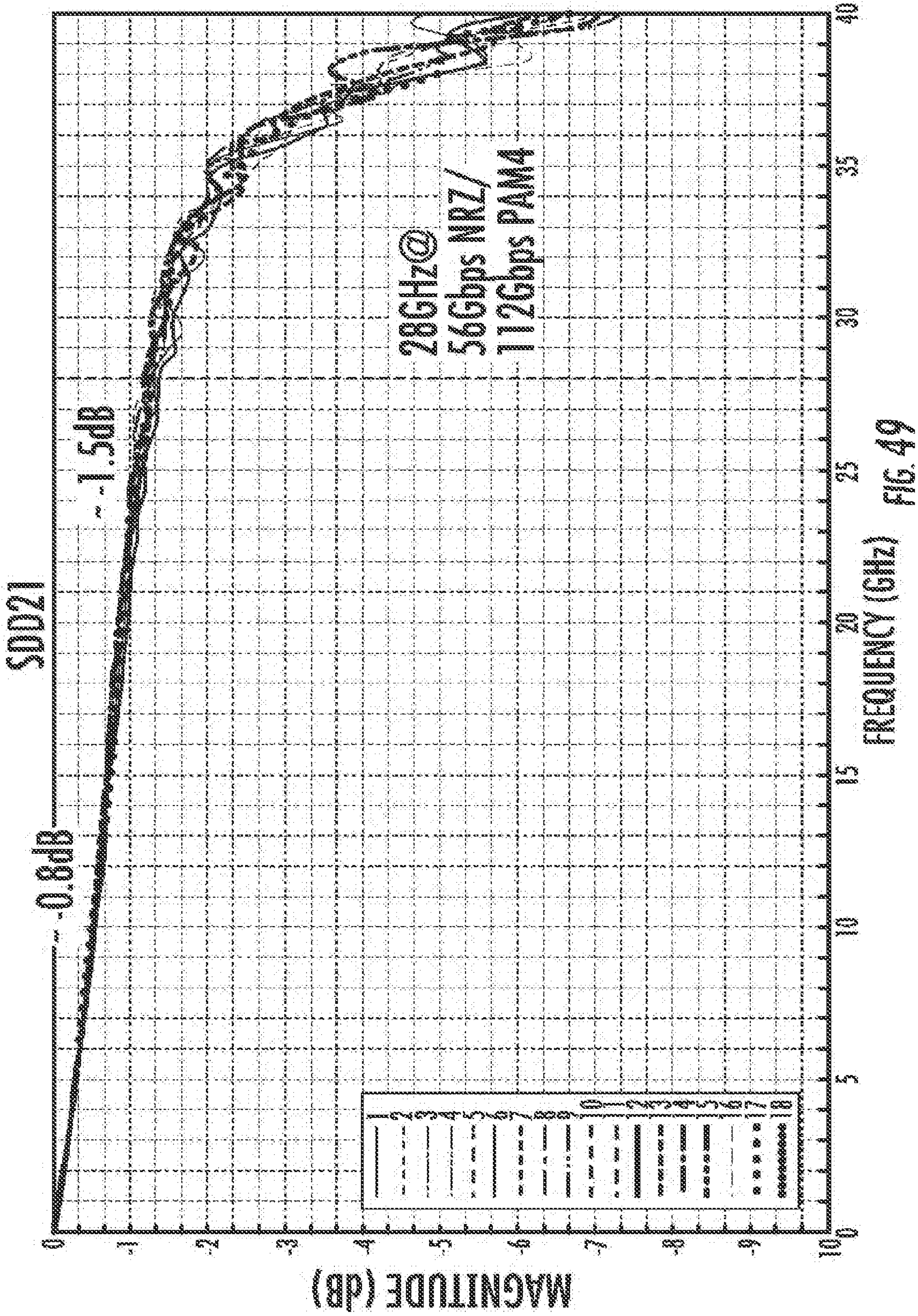
FIG. 49 illustrates a schematic representation of insertion loss at 28 GHz for an embodiment of a connector.
Figure 50:
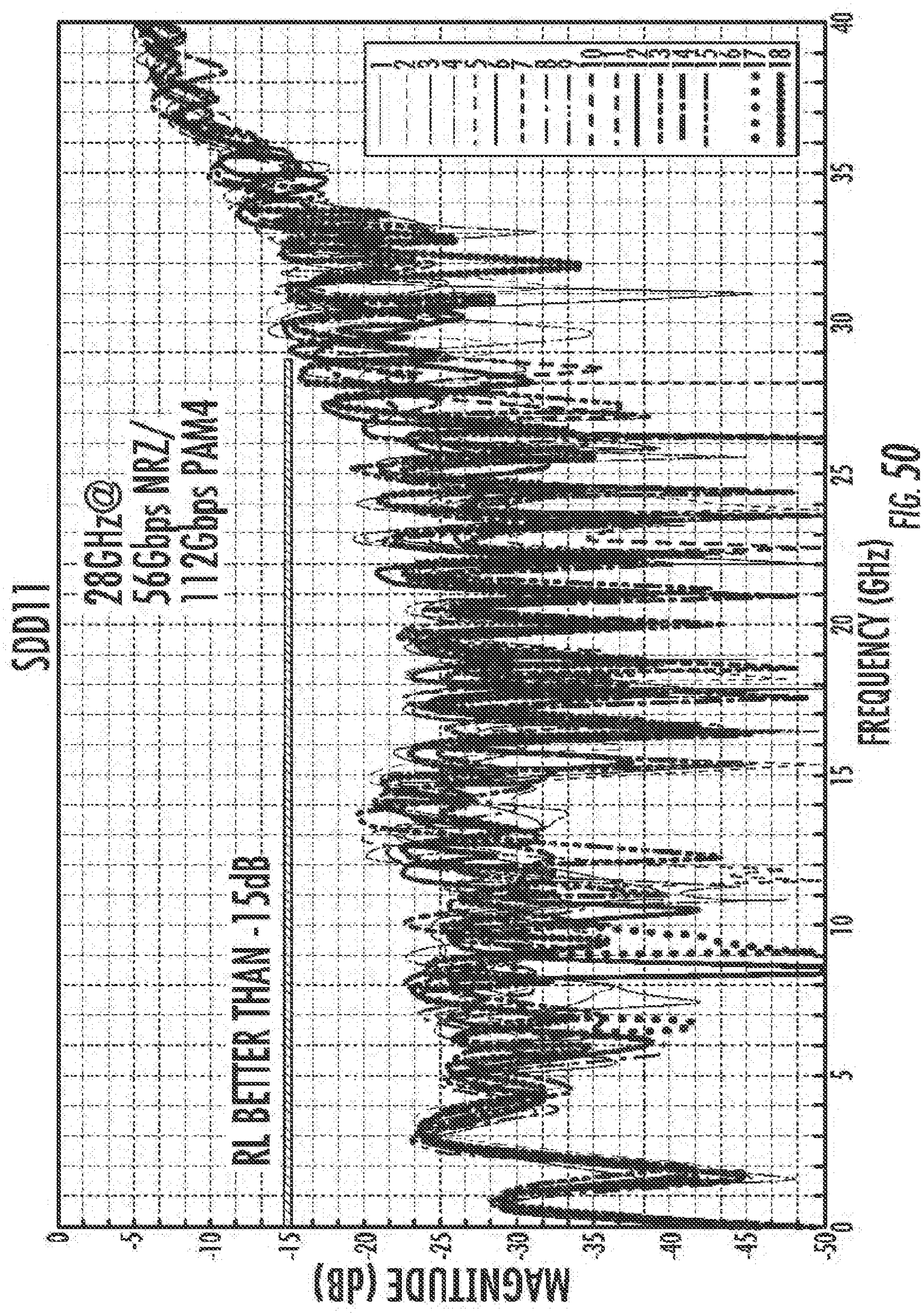
FIG. 50 illustrates a schematic representation of return loss at 28 GHz for an embodiment of a connector.
Figure 51:
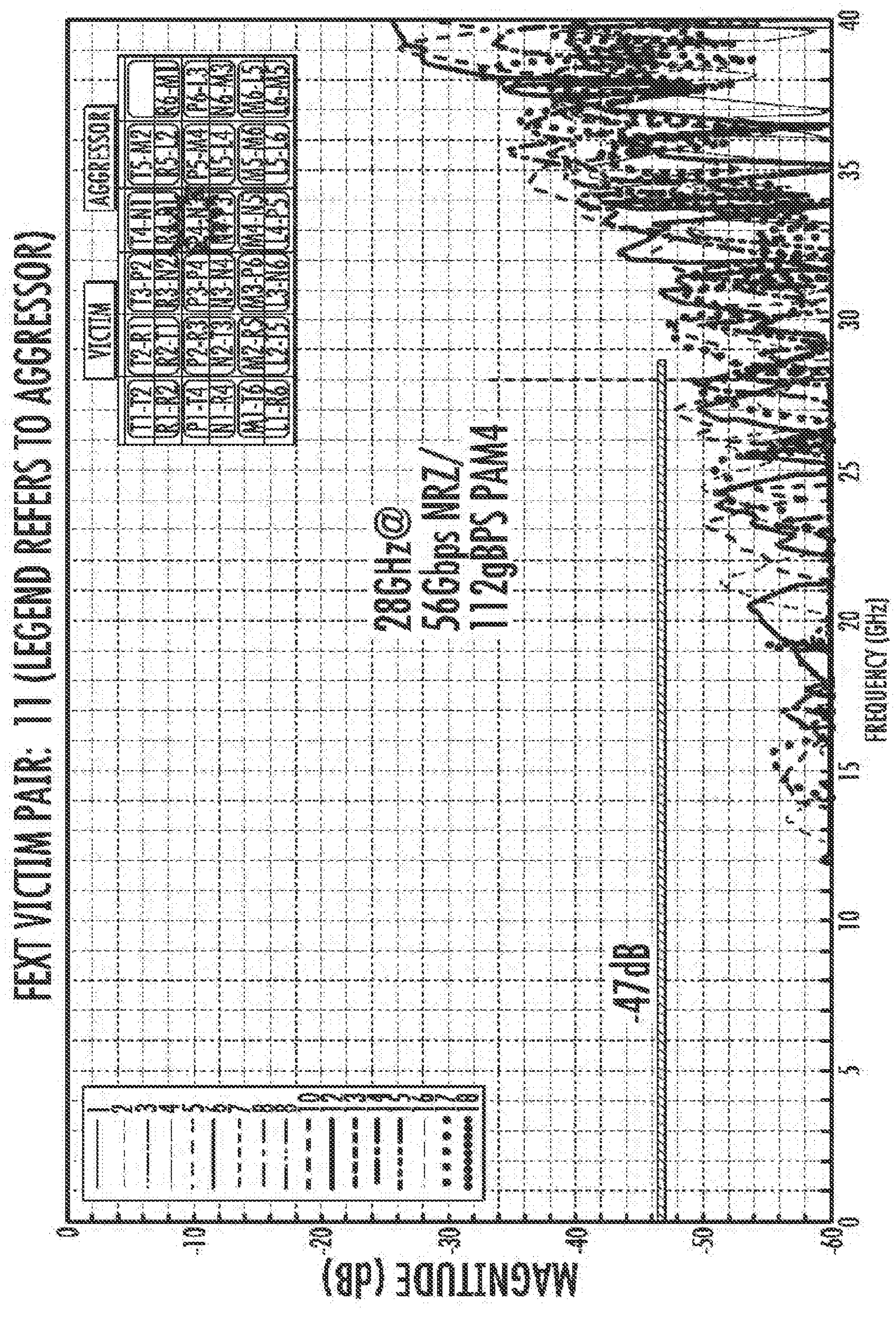
FIG. 51 illustrates a schematic representation of near end crosstalk (NEXT) at 28 GHz for an embodiment of a connector.
Figure 52:
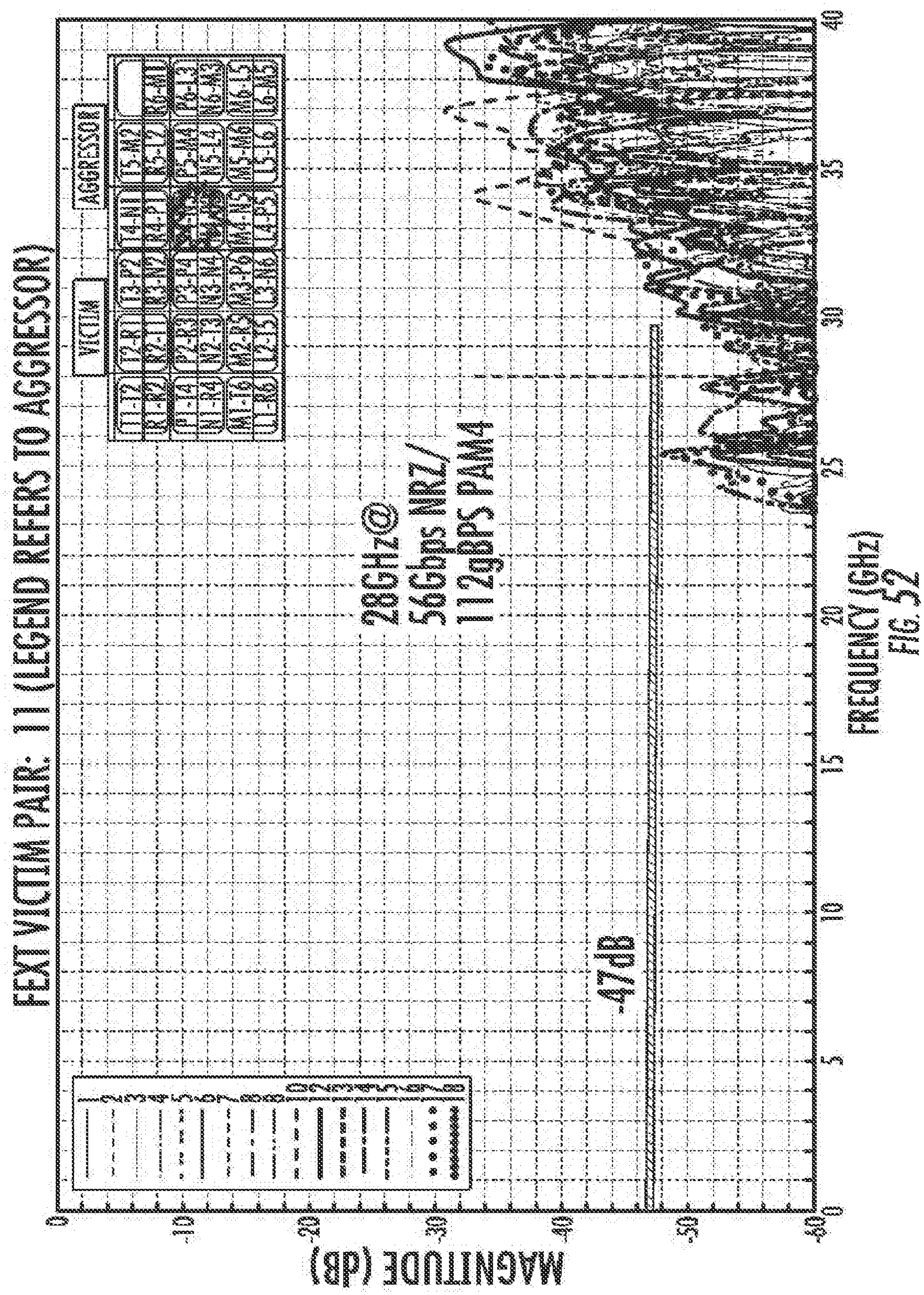
FIG. 52 illustrates a schematic representation of far end crosstalk at 28 GHz for an embodiment of a connector.

As can be appreciated from FIGS. 38-40, a connector configuration can be provided with connector 500 positioned on circuit board 8 mating with connector 600 positioned on circuit board 6. While connectors 500 and 600 can include the other features discussed herein, the corresponding connector system separates transmit and receive channels. In the interface a mating wall 612 is provided on the connector 600 while a corresponding gap 512 is provided in connector 500. The wafers can include a void 514 where no signal terminals are provided in the wafers that for the connector 500 while the connector 600 can provide a blank 614 (which can be a wafer without signal terminals or the omission of the wafer entirely). A shroud 510 can include a shoulder 518 that helps hold the connectors together while the connector 600 can include a T-shaped comb that supports terminals and also can be terminated to the circuit board 6. By spacing the transmit channels and the receive channels apart as depicted it has been determined that near end crosstalk (NEXT) can improved a significant amount, potentially about 5 dB.

FIGS. 41-48 illustrate an alternative configuration of the wafers that would be suitable for use in one of the connectors referenced above. Specifically, wafers 750 are configured to mate with wafers 850. Both wafers are similar to wafer 350 in that they can include a frame 755, 855 and may include a secondary shield, such as secondary shield 790 that is secured to the frame 755 via projections 759 (which can be staked as discussed above).

The wafers 850 supports terminals pairs 870 that mate with terminal pairs 770. As discussed above, U-shields 125 are provided to shield the mating interface and provide a return path. The primary difference is that the ground shield 760, which includes tails 767, U-channels 762 and connection frames 761 as discussed above, includes fingers 766*a* and 766*b*. The fingers 766*a* are configured to engage the side walls 125*b* of the U-shield 125 surrounding terminal pair the while the fingers 766*b* are configured to engage top walls 125*a* of adjacent U-shields 125. As noted above, this allows for commoning of the U-shields in the mating interface and helps improve the performance of the system.

As can be appreciated from FIGS. 49-52, the performance of the connector system, when looking only at two mated connectors from tail to tail, can be significant when using all the improvements and features depicted herein. Specifically, at 28 GHz signaling frequency the insertion loss (IL) can be less than −2 dB, return loss (RL) can be at least below −15 dB and both near end cross talk (NEXT) and far end cross talk (FEXT) can be at least below −47 dB. This provides at least a 45 dB insertion loss to crosstalk ratio (ICR) at 28 GHz. Naturally, if certain features are removed then the performance may be reduced and the 45 dB ICR might only exist at a lower frequency. For example, by removing the secondary shield one might get the above performance results only at up to 20 GHz.

It should be noted that the depicted embodiments illustrate an orthogonal configuration. If a simple right-angle to right-angle configuration is desired then the 90-degree rotation could be omitted. The same basic construction could also be used for vertical to vertical (e.g., mezzanine style) connectors. Thus, the depicted embodiments provide a technical solution that can be used for a wide range of connector configurations.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

The invention claimed is:

1. A backplane connector system, comprising:

a first connector configured to mount to a first circuit board;

a second connector configured to mount to a second circuit board and orthogonally mate with the first connector, wherein each of the first connector and the second connector comprise:

a frame;

a plurality of wafers supported by the frame comprising a plurality of signal terminals that form a plurality of terminal pairs, each of the signal terminals comprising a contact, a tail, and a body extending therebetween; and a ground shield electrically connected to a U-shield that provides a U-channel that extends along the body of the signal terminals, wherein each of the signal terminals in the first connector comprises a folded section that transitions from a vertical orientation to a horizontal orientation, and the U-shield of the first connector and the second connector cover the folded section.

2. The backplane connector system according to claim 1, wherein the first connector and the second connector do not include a ground terminal between adjacent ones of the terminal pairs.

3. The backplane connector system according to claim 1, wherein:

the first connector further comprises an insert that supports the U-shield of the first connector; and the second connector further comprises an insert that supports the U-shield of the second connector.

4. The backplane connector system according to claim 3, wherein the ground shield of the first connector comprises a mating end inserted into an aperture of the insert of the first connector, and the insert has a conductive element that provides electrical continuity between the ground shield and the U-shield of the first connector.

5. The backplane connector system according to claim 1, wherein:

the U-channel of the first connector and the second connector is one of a plurality of U-channels; and the ground shield of the first connector and the second connector each comprise a connection frame coupled to adjacent ones of the plurality of U-channels that electrically connects the adjacent ones of the plurality of U-channels.

6. The backplane connector system according to claim 1, wherein contacts of each of the signal terminals in the first connector and the second connector are arranged horizontally.

7. The backplane connector system according to claim 6, wherein the contacts of the first connector and the second connector are shielded by the U-shield on three sides.

8. The backplane connector system according to claim 7, wherein the U-channel of the first connector and the second connector shields the signal terminals thereof on three sides such that each pair of signal terminals is shielded on three sides a distance from the tail to the contact of the signal terminals.

9. A backplane connector, comprising a plurality of wafers each comprising an insulative frame that supports a terminal pair having signal terminals, each of the signal terminals having a contact, a tail, and a body extending therebetween;

a plurality of ground shields positioned in the plurality of wafers that provide a U-channel that extends along the body of the signal terminals;

a plurality of U-shields arranged to shield the contact of at least one of the signal terminals, wherein individual ones of the U-shields are electrically connected to the U-channel of individuals ones of the ground shields, wherein the individual ones of the U-shields comprise an aperture aligned with a stub of a respective contact of one of the signal terminals, wherein the aperture enables the respective contact to deflect without engaging a respective one of the U-shields; and a connection frame that electrically connects the U-channel of adjacent ones of the ground shields.

10. The backplane connector according to claim 9, wherein the signal terminal is one of a plurality of signal terminals, and adjacent ones of the signal terminals do not include a ground terminal disposed therebetween.

11. The backplane connector according to claim 9, further comprising an insert that supports the plurality of U-shields, wherein the plurality of ground shields comprise a mating end inserted into an aperture of the insert, and the insert has a conductive element that provides electrical continuity between the plurality of ground shields and the plurality of U-shields.

12. The backplane connector according to claim 9, wherein the signal terminal is one of a plurality of signal terminals, contacts of each of the signal terminals are arranged horizontally, and the contacts are shielded by the plurality of U-shields on three sides.

13. The backplane connector according to claim 12, wherein the U-channel shields the signal terminals on three sides such that each pair of signal terminals is shielded on three sides a distance from the tail to the contact of the signal terminals.

14. A backplane connector, comprising a plurality of wafers having a frame that supports a terminal pair having signal terminals, each of the signal terminals having a contact, a tail, and a body extending therebetween, and each of the signal terminals comprising a folded section that transitions from a vertical orientation to a horizontal orientation;

a plurality of ground shields positioned in the plurality of wafers that provide a U-channel that extends along the body of the signal terminals, wherein the U-channel has an end that extends past a front edge of a respective one of the plurality of ground shields such that a partial overlap between the U-channel and a corresponding one of the plurality of U-shields exists; and a plurality of U-shields arranged to shield the contact of at least one of the signal terminals, wherein individual ones of the U-shields are electrically connected to the U-channel of individuals ones of the ground shields.

15. The backplane connector according to claim 14, further comprising a connection frame that electrically connects the U-channel of adjacent ones of the ground shields.

16. The backplane connector according to claim 14, wherein each of the plurality of U-shields comprises a top wall, two opposing side walls, and a mating end, wherein the side walls have edges.

17. The backplane connector according to claim 14, wherein each of the plurality of U-shields comprises opposing side walls configured to engage with a plurality of fingers of another connector.

18. The backplane connector according to claim 14, further comprising an insert that supports the plurality of U-shields, wherein the plurality of ground shields comprise a mating end inserted into an aperture of the insert, and the insert has a conductive element that provides electrical continuity between the plurality of ground shields and the plurality of U-shields.

* * * * *